US009894009B2

(12) United States Patent
Bentley et al.

(10) Patent No.: US 9,894,009 B2
(45) Date of Patent: Feb. 13, 2018

(54) CLIENT DEVICE AND HOST DEVICE SUBSCRIPTIONS

(71) Applicant: Microsoft Technology Licensing, LLC, Redmond, WA (US)

(72) Inventors: Devlin David Bentley, Kirkland, WA (US); Katie Pope, Redmond, WA (US); Paul D. Shaffer, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 165 days.

(21) Appl. No.: 14/609,065

(22) Filed: Jan. 29, 2015

(65) Prior Publication Data

US 2016/0065491 A1  Mar. 3, 2016

Related U.S. Application Data

(60) Provisional application No. 62/044,114, filed on Aug. 29, 2014.

(51) Int. Cl.
| | | |
|---|---|---|
| G06F 15/173 | (2006.01) | |
| H04L 12/911 | (2013.01) | |
| G06F 9/44 | (2018.01) | |
| H04L 29/06 | (2006.01) | |

(52) U.S. Cl.
CPC ............ *H04L 47/78* (2013.01); *G06F 9/4445* (2013.01); *H04L 67/42* (2013.01)

(58) Field of Classification Search
CPC ..... H04L 47/78; H04L 67/42; H04L 12/2872; H04L 12/2887; H04L 12/2874; H04L 12/2861; G06F 9/4445

USPC .......................................................... 709/226
See application file for complete search history.

(56) References Cited

U.S. PATENT DOCUMENTS

| | | | | |
|---|---|---|---|---|
| 6,119,167 | A  * | 9/2000 | Boyle | ..................... H04L 12/18 709/203 |
| 6,629,149 | B1 * | 9/2003 | Fraser | ............... H04L 29/12066 709/220 |
| 6,704,785 | B1 * | 3/2004 | Koo | ........................ G06F 9/542 709/220 |
| 7,051,111 | B1 | 5/2006 | Scullin | |
| 7,085,814 | B1 * | 8/2006 | Gandhi | ............... H04L 29/1232 709/208 |
| 7,665,096 | B2 | 2/2010 | Weida | |

(Continued)

OTHER PUBLICATIONS

Quah, J. et al., "Push Selling—Multicast Messages to Wireless Devices Based on the Publish/Subscribe Model", Electronic Commerce Research and Applications, vol. 1, Issue 3-4, Jan. 1, 2002, 12 pages.

(Continued)

*Primary Examiner* — Philip Chea
*Assistant Examiner* — Wing Ma
(74) *Attorney, Agent, or Firm* — Alleman Hall Creasman & Tuttle LLP

(57) ABSTRACT

A client computing device establishes a plurality of subscriptions to store published data from data sources of the client device in a subscription buffer. In response to receiving, from a remote subscription dispatcher of a host computing device, a read request for data published by data sources of the client computing device, one or more data packets including published data stored in the subscription buffer are sent to the host computing device.

20 Claims, 27 Drawing Sheets

(56) References Cited

U.S. PATENT DOCUMENTS

| | | | | |
|---|---|---|---|---|
| 7,669,177 | B2* | 2/2010 | Gerber | G06F 9/44505 707/705 |
| 8,260,266 | B1* | 9/2012 | Amidon | H04M 3/42348 455/414.1 |
| 8,559,427 | B2 | 10/2013 | Shah | |
| 8,640,219 | B2 | 1/2014 | Zhang et al. | |
| 8,923,823 | B1* | 12/2014 | Wilde | H04L 51/30 370/432 |
| 2002/0035621 | A1* | 3/2002 | Zintel | H04L 12/2805 709/220 |
| 2002/0095399 | A1* | 7/2002 | Devine | G06F 17/3089 |
| 2003/0229900 | A1* | 12/2003 | Reisman | G06F 17/30873 725/87 |
| 2004/0002972 | A1* | 1/2004 | Pather | G06F 9/542 |
| 2004/0002988 | A1* | 1/2004 | Seshadri | G06F 17/30516 |
| 2004/0024774 | A1* | 2/2004 | Jain | G06F 17/30289 |
| 2004/0076155 | A1* | 4/2004 | Yajnik | H04L 45/306 370/389 |
| 2004/0181588 | A1* | 9/2004 | Wang | H04L 67/327 709/207 |
| 2005/0022210 | A1* | 1/2005 | Zintel | H04L 12/2803 719/318 |
| 2005/0182675 | A1* | 8/2005 | Huettner | G06Q 30/0258 705/14.56 |
| 2005/0203949 | A1* | 9/2005 | Cabrera | H04L 67/02 |
| 2005/0246716 | A1* | 11/2005 | Smith | G06F 9/465 719/315 |
| 2005/0261923 | A1* | 11/2005 | Brown | G06Q 10/10 709/232 |
| 2005/0267935 | A1* | 12/2005 | Gandhi | H04L 29/1232 709/203 |
| 2006/0271384 | A1 | 11/2006 | Munson et al. | |
| 2007/0022198 | A1* | 1/2007 | Messer | H04L 67/26 709/227 |
| 2007/0130078 | A1 | 6/2007 | Grzesek | |
| 2007/0192325 | A1* | 8/2007 | Morris | H04L 67/24 |
| 2008/0049787 | A1* | 2/2008 | McNaughton | H04L 12/66 370/468 |
| 2008/0052727 | A1* | 2/2008 | Todd | G06F 9/542 719/313 |
| 2008/0065688 | A1* | 3/2008 | Shenfield | G06F 17/3089 |
| 2008/0098093 | A1 | 4/2008 | Simon et al. | |
| 2008/0109528 | A1* | 5/2008 | Knight | G06F 8/71 709/217 |
| 2008/0120337 | A1* | 5/2008 | Fry | G06F 17/3089 |
| 2008/0168182 | A1* | 7/2008 | Frank | G06F 1/12 709/248 |
| 2008/0195664 | A1* | 8/2008 | Maharajh | G06F 17/30035 |
| 2008/0281798 | A1 | 11/2008 | Chatterjee et al. | |
| 2008/0294794 | A1* | 11/2008 | Darugar | G06F 17/3089 709/238 |
| 2008/0313329 | A1* | 12/2008 | Wang | G06Q 10/10 709/224 |
| 2009/0024817 | A1* | 1/2009 | Oved | G06F 13/28 711/170 |
| 2009/0055436 | A1* | 2/2009 | Ayeni | G06Q 30/02 |
| 2009/0117890 | A1* | 5/2009 | Jacobsen | G02B 27/017 455/419 |
| 2009/0125628 | A1* | 5/2009 | Dahlen | H04L 67/16 709/227 |
| 2009/0132731 | A1* | 5/2009 | Nakamura | H04N 1/00204 710/19 |
| 2009/0300227 | A1* | 12/2009 | Nochimowski | G06F 11/3409 710/18 |
| 2010/0049821 | A1* | 2/2010 | Oved | G06F 9/542 709/212 |
| 2010/0125671 | A1* | 5/2010 | Thubert | G06F 15/16 709/230 |
| 2010/0125735 | A1* | 5/2010 | Zapata | G06F 8/65 713/170 |
| 2010/0211784 | A1 | 8/2010 | Lagosanto et al. | |
| 2011/0040895 | A1* | 2/2011 | Griffin | H04L 67/1095 709/248 |
| 2011/0098583 | A1 | 4/2011 | Pandia et al. | |
| 2011/0173681 | A1* | 7/2011 | Qureshi | H04L 63/0823 726/4 |
| 2012/0197990 | A1* | 8/2012 | Li | H04L 12/5835 709/204 |
| 2012/0209951 | A1* | 8/2012 | Enns | H04L 29/08729 709/217 |
| 2012/0246295 | A1* | 9/2012 | Gonzalez-Banos | H04L 67/14 709/224 |
| 2012/0246337 | A1* | 9/2012 | Ross | H04L 45/308 709/238 |
| 2012/0275407 | A1 | 11/2012 | You | |
| 2012/0278386 | A1* | 11/2012 | Losacco | H04L 67/1078 709/204 |
| 2012/0311046 | A1* | 12/2012 | Grigoriev | H04W 4/12 709/206 |
| 2013/0047034 | A1* | 2/2013 | Salomon | H04W 4/00 714/18 |
| 2013/0084896 | A1* | 4/2013 | Barkie | H04W 12/02 455/466 |
| 2013/0268645 | A1* | 10/2013 | Shah | H04L 41/0273 709/223 |
| 2013/0346521 | A1* | 12/2013 | Arabo | H04L 29/08693 709/206 |
| 2014/0153457 | A1* | 6/2014 | Liu | H04W 52/0222 370/311 |
| 2014/0201289 | A1* | 7/2014 | Wheeler | H04L 12/58 709/206 |
| 2014/0324666 | A1* | 10/2014 | Doornebos | G06Q 10/10 705/37 |
| 2014/0335823 | A1* | 11/2014 | Heredia | H04L 12/5895 455/411 |
| 2014/0379651 | A1* | 12/2014 | Romatoski | G06F 17/30578 707/631 |
| 2014/0379852 | A1* | 12/2014 | Rajagopal | H04L 67/325 709/217 |
| 2015/0026325 | A1* | 1/2015 | Rheinheimer | H04L 41/0604 709/223 |
| 2015/0026356 | A1* | 1/2015 | Kaplinger | H04L 69/18 709/230 |
| 2015/0172901 | A1* | 6/2015 | Kasslin | H04W 8/005 370/328 |
| 2015/0220883 | A1* | 8/2015 | B'Far | G06Q 10/105 700/91 |
| 2015/0319062 | A1* | 11/2015 | Yip | H04L 41/042 709/224 |
| 2016/0029402 | A1* | 1/2016 | Backholm | H04W 76/02 370/329 |

OTHER PUBLICATIONS

Pohja, M., "Declarative Push on Web", In Proceedings of the Fourth International Conference on Web Information Systems and Technologies (WEBIST 2008), May 4, 2008, 7 pages.

Mesbah, A. et al., "A Component- and Push-Based Architectural Style for AJAX Applications", The Journal of Systems and Software, vol. 81, Issue 12, Available online Apr. 11, 2008, 16 pages.

Pohja, M., "Web Application User Interface Technologies", Doctoral Dissertation for the Degree of Doctor of Science in Technology, Aalto University, Presented for public examination on Feb. 4, 2011, Published May 2011, Espoo, Finland, 93 pages.

Shaeffer, J. et al., "A Middleware-Based Approach to the Design of Interconnected Sensor/Actuator Networks", IEEE 17th International Symposium on Object/Component/Service-Oriented Real-Time Distributed Computing (ISORC), Jun. 10, 2014, 6 pages.

ISA European Patent Office, International Search Report and Written Opinion Issued in Application No. PCT/US2015/047068, Dec. 9, 2015, WIPO, 12 Pages.

Fingas, Jon, "TomTom's new GPS watches track your heart rate without a chest strap (update: US pricing)", http://www.engadget.com/2014/04/03/tomtom-cardio-gps-watches/, Apr. 3, 2014, 10 pages.

(56) References Cited

OTHER PUBLICATIONS

Goode, Lauren, "Samsung's New Gear Fit Needs to Work on the "Fit" Part", http://recode.net/2014/04/08/samsungs-new-gear-fit-needs-to-work-on-the-fit-part/, Apr. 8, 2014, 10 pages.
"Samsung Gear Fit, Gear 2 and Gear 2 Neo go on sale worldwide", NDTV Gadgets, http://gadgets.ndtv.com/others/news/samsung-gear-fit-gear-2-and-gear-2-neo-go-on-sale-worldwide-507220, Apr. 11, 2014, 3 pages.
Poeter, Damon, "Meet Simband, Samsung's Next-Gen Health Tracker", http://www.pcmag.com/article2/0,2817,2458663,00.asp, May 28, 2014, 5 pages.
Caporuscio, et al., "Design and Evaluation of a Support Service for Mobile, Wireless Publish/Subscribe Applications", In IEEE Transactions on Software Engineering, vol. 29, Issue 12, Dec. 2003, 25 pages.

\* cited by examiner

CLIENT DEVICE AND HOST DEVICE SUBSCRIPTIONS

CROSS REFERENCE TO RELATED APPLICATION

This application claims priority to U.S. provisional patent application, Ser. No. 62/044,114, entitled "EXPOSING A SUBSCRIPTION BASED API" filed on Aug. 29, 2014, the entire disclosure of which is herein incorporated by reference.

BACKGROUND

Some computing devices (e.g., wearable computing devices) may have restricted local processing, data-storage, and energy-storage resources. Such localized restrictions may constrain an ability of a computing device to perform various operations.

DETAILED DESCRIPTION

In order to increase the perceived capabilities of a client computing device having localized processing, data-storage, and/or energy-storage restrictions, various operations may be outsourced from the computing device and processed by one or more remote computing devices. Due to such outsourcing, a communication volume between the client computing device and a remote computing device may increase significantly. Accordingly, the present disclosure relates to various approaches for facilitating data-efficient and energy-efficient communication between a client computing device and a remote computing device that allocates resources for the benefit of the client computing device.

In some implementations, the client computing device may lack wide area network connectivity to communicate directly with the remote computing device (e.g., via the Internet). However, the client computing device may have a local area network connection with a host computing device (e.g., via universal serial bus (USB), Bluetooth (BT), Bluetooth Low Energy (BTLE)), and the host computing device may communicate with the remote computing device via a wide area network connection (e.g., via the Internet). In such implementations, communication between the client computing device and the remote computing device may be relayed through the host computing device. Moreover, in some cases, the host computing device may perform some or all operations to further increase communication efficiency of the client computing device.

By increasing communication efficiency of the client computing device, the local resource restrictions of the client computing device may be hidden from the user.

Figure 1A:
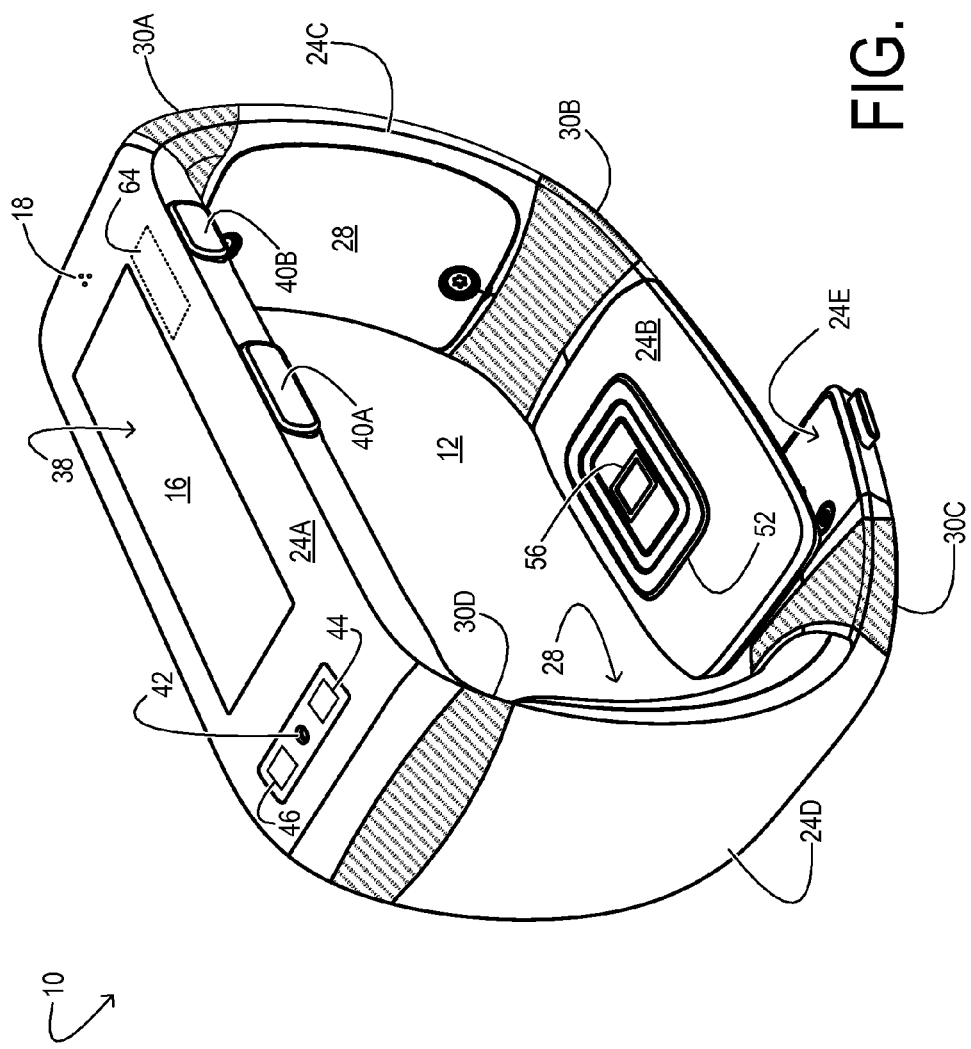
FIG. 1A shows aspects of an example wearable computing device.
Figure 1B:
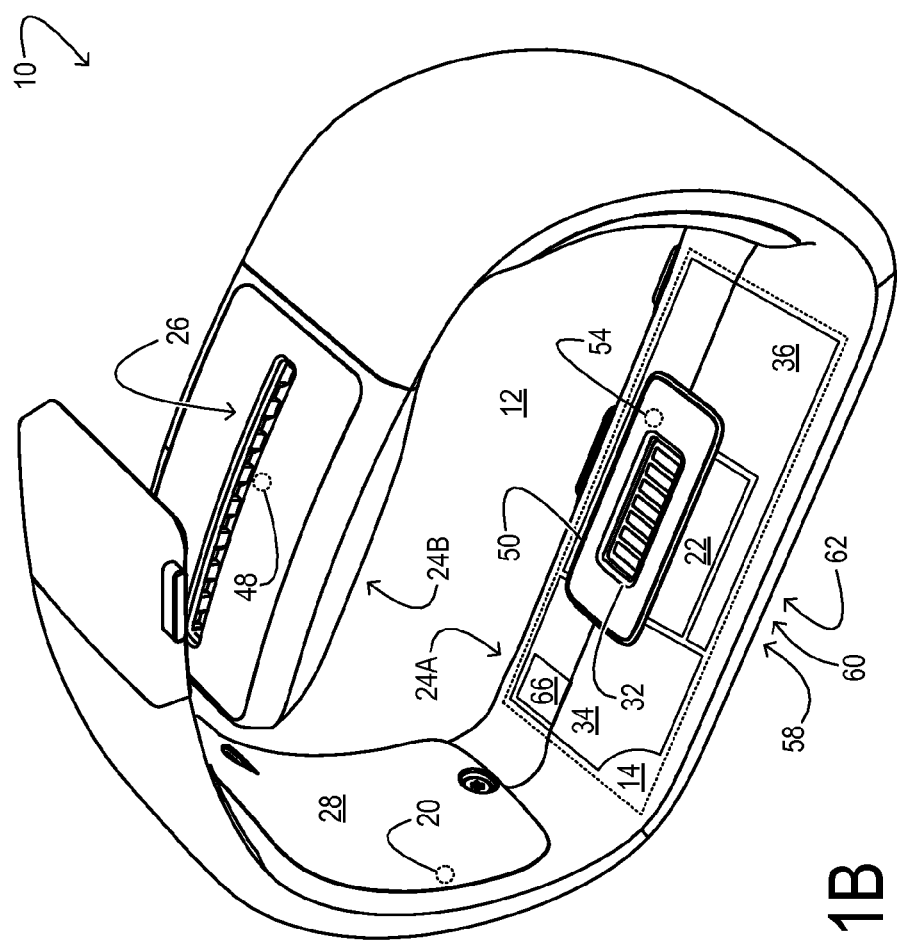
FIG. 1B shows additional aspects of the example wearable computing device.

The client computing device may take any suitable form without departing from the scope of the present disclosure. FIGS. 1A and 1B show aspects of an example client device in the form of a wearable computing device 10 that includes features to facilitate efficient communication. The illustrated device takes the form of a composite band 12. In one implementation, a closure mechanism enables facile attachment and separation of the ends of the composite band, so that the band can be closed into a loop and worn on the wrist. In other implementations, the device may be fabricated as a continuous loop resilient enough to be pulled over the hand and still conform to the wrist. Alternatively, the device may have an open-bracelet form factor in which ends of the band are not fastened to one another. In still other implementations, wearable computing devices of a more elongate band shape may be worn around the user's bicep, waist, chest, ankle, leg, head, or other body part. Accordingly, the wearable computing devices here contemplated include eye glasses, a head band, an arm-band, an ankle band, a chest strap, or any other wearable form factor. Furthermore, computing devices without wearable configurations may include plated contacts.

As shown in the drawings, wearable computing device 10 may include various functional electronic components: a computing system 14, display 16, loudspeaker 18, haptic motor 20, communication suite 22, and various sensors. In the illustrated implementation, the functional electronic components are integrated into the several rigid segments of the band—viz., display-carrier module 24A, pillow 24B, energy-storage compartments 24C and 24D, and buckle 24E. This tactic protects the functional components from physical stress, from excess heat and humidity, and from exposure to water and substances found on the skin, such as sweat, lotions, salves, and the like. In the illustrated conformation of wearable computing device 10, one end of composite band 12 overlaps the other end. Buckle 24E is arranged at the overlapping end of the composite band, and receiving slot 26 is arranged at the overlapped end.

The functional electronic components of wearable computing device 10 draw power from one or more energy-storage electronic components 28. A battery—e.g., a lithium ion battery—is one type of energy-storage electronic component. Alternative examples include super- and ultra-capacitors. To provide adequate storage capacity with minimal rigid bulk, a plurality of discrete, separated energy-storage electronic components may be used. These may be arranged in energy-storage compartments 24C and 24D, or in any of the rigid segments of composite band 12. Electrical connections between the energy-storage electronic components and the functional electronic components are routed through flexible segments 30 (e.g., 30A, 30B, 30C, 30D). In some implementations, the energy storage cells have a curved shape to fit comfortably around the wearer's wrist, or other body part. In some implementations, the energy storage cells may be flexible to accommodate coupling to a wearer.

In general, energy-storage electronic components 28 may be replaceable and/or rechargeable. In some examples, recharge power may be provided through a universal serial bus (USB) port 32. In other examples, the energy-storage electronic components may be recharged by wireless inductive or ambient-light charging. In still other examples, the wearable computing device may include electro-mechanical componentry to recharge the energy-storage electronic components from the user's adventitious or purposeful body motion.

In wearable computing device 10, computing system 14 is housed in display-carrier module 24A and situated below display 16. The computing system is operatively coupled to display 16, loudspeaker 18, communication suite 22, and to the various sensors. The computing system includes a data-storage machine 34 to hold data and instructions, and a logic machine 36 to execute the instructions.

In some implementations, a shared data buffer 66 may be located proximate to the data-storage machine 34 or included in the data-storage machine 34. The shared data buffer 66 may be configured to store data packets in preparation for transmission via any of a plurality of different communication I/O interfaces. In one particular example, the shared data buffer 66 stores data packets for transmission either via a wired communication I/O interface or a wireless communication I/O interface as will be discussed in further detail below.

Display 16 may be any suitable type of display, such as a thin, low-power light emitting diode (LED) array or a liquid-crystal display (LCD) array. Quantum-dot display technology may also be used. Electronic paper technology may also be used. Suitable LED arrays include organic LED (OLED) or active matrix OLED arrays, among others. An LCD array may be actively backlit. However, some types of LCD arrays—e.g., a liquid crystal on silicon, LCOS array—may be front-lit via ambient light. Although the drawings show a substantially flat display surface, this aspect is by no means necessary, for curved display surfaces may also be used. In some use scenarios, wearable computing device 10 may be worn with display 16 on the front of the wearer's wrist, like a conventional wristwatch.

Communication suite 22 may include any appropriate wired or wireless communications I/O interface componentry. In FIGS. 1A and 1B, the communications suite includes the USB port 32, which may be used for exchanging data between wearable computing device 10 and other computer systems, as well as providing recharge power. The communication suite may further include two-way BT, BTLE Wi-Fi, cellular, Ethernet, near-field communication, and/or other radios. In some implementations, the communication suite may include an additional transceiver for optical, line-of-sight (e.g., infrared) communication. Any suitable communication I/O interface componentry of the communication suite 22 may be employed to transmit machine-readable information via a digital communication channel. For example, a wireless digital communication channel may be established over Wi-Fi or BT to transmit data. In another example, a wired digital communication channel may be established over USB to transmit data.

In some implementations, in order to leverage the plurality of different communication I/O interfaces, the wearable computing device may employ the same three-stage protocol for communication over a plurality of different transport layers (e.g., USB, BT, BTLE). The three-stage protocol may include a command stage, a data stage, and a status stage. In particular, the command protocol may have a packet format that is the same for communication over all of the different transport layers. This unified implementation allows for a shared library of commands that can be sent over any of the different transport layers. The shared library of commands and the unified command protocol may increase communication efficiency, while reducing a memory footprint of the wearable computing device.

In wearable computing device 10, touch-screen sensor 38 is coupled to display 16 and configured to receive touch input from the user. Accordingly, the display may be a touch-sensor display in some implementations. In general, the touch sensor may be resistive, capacitive, or optically based. Push-button sensors (e.g., microswitches) may be used to detect the state of push buttons 40A and 40B, which may include rockers. Input from the push-button sensors may be used to enact a home-key or on-off feature, control audio volume, microphone, or another suitable operation.

FIGS. 1A and 1B show various other sensors of wearable computing device 10. Such sensors include microphone 42, visible-light sensor 44, ultraviolet sensor 46, and ambient-temperature sensor 48. The microphone provides input to computing system 14 that may be used to measure the ambient sound level or receive voice commands from the user. Input from the visible-light sensor, ultraviolet sensor, and ambient-temperature sensor may be used to assess aspects of the user's environment.

FIGS. 1A and 1B show a pair of contact sensors—charging contact sensor 50 arranged on display-carrier module 24A, and pillow contact sensor 52 arranged on pillow 24B. Each contact sensor contacts the wearer's skin when wearable computing device 10 is worn and may also include plated contacts. The contact sensors may include independent or cooperating sensor elements, to provide a plurality of sensory functions. For example, the contact sensors may provide an electrical resistance and/or capacitance sensory function responsive to the electrical resistance and/or capacitance of the wearer's skin. To this end, the two contact sensors may be configured as a galvanic skin-response sensor, for example. In the illustrated configuration, the separation between the two contact sensors provides a relatively long electrical path length, for more accurate measurement of skin resistance. In some examples, a contact sensor may also provide measurement of the wearer's skin temperature. In the illustrated configuration, a skin temperature sensor 54 in the form a thermistor is integrated into charging contact sensor 50, which provides direct thermal conductive path to the skin. Output from ambient-temperature sensor 48 and skin temperature sensor 54 may be applied differentially to estimate the heat flux from the wearer's body. This metric can be used to improve the accuracy of pedometer-based calorie counting, for example. In addition to the contact-based skin sensors described above, various types of non-contact skin sensors may also be included.

Arranged inside pillow contact sensor 52 in the illustrated configuration is an optical pulse-rate sensor 56. The optical pulse-rate sensor may include a narrow-band (e.g., green) LED emitter and matched photodiode to detect pulsating blood flow through the capillaries of the skin, and thereby provide a measurement of the wearer's pulse rate. In some implementations, the optical pulse-rate sensor may also be configured to sense the wearer's blood pressure. In the illustrated configuration, optical pulse-rate sensor 56 and display 16 are arranged on opposite sides of the device as worn. The pulse-rate sensor alternatively could be positioned directly behind the display for ease of engineering.

Wearable computing device 10 may also include motion sensing componentry, such as an accelerometer 58, gyroscope 60, and magnetometer 62. The accelerometer and gyroscope may furnish inertial data along three orthogonal axes as well as rotational data about the three axes, for a combined six degrees of freedom. This sensory data can be used to provide a pedometer/calorie-counting function, for example. Data from the accelerometer and gyroscope may be combined with geomagnetic data from the magnetometer to further define the inertial and rotational data in terms of geographic orientation.

Wearable computing device 10 may also include a global positioning system (GPS) receiver 64 for determining the wearer's geographic location and/or velocity. In some configurations, the antenna of the GPS receiver may be relatively flexible and extend into flexible segment 30A. In the configuration of FIGS. 1A and 1B, the GPS receiver is far removed from optical pulse-rate sensor 56 to reduce interference from the optical pulse-rate sensor.

The wearable computing device is merely one example of a client computing device that may off-load processing of operations to a remote computing device. The client computing device may take any suitable form.

Figure 2:
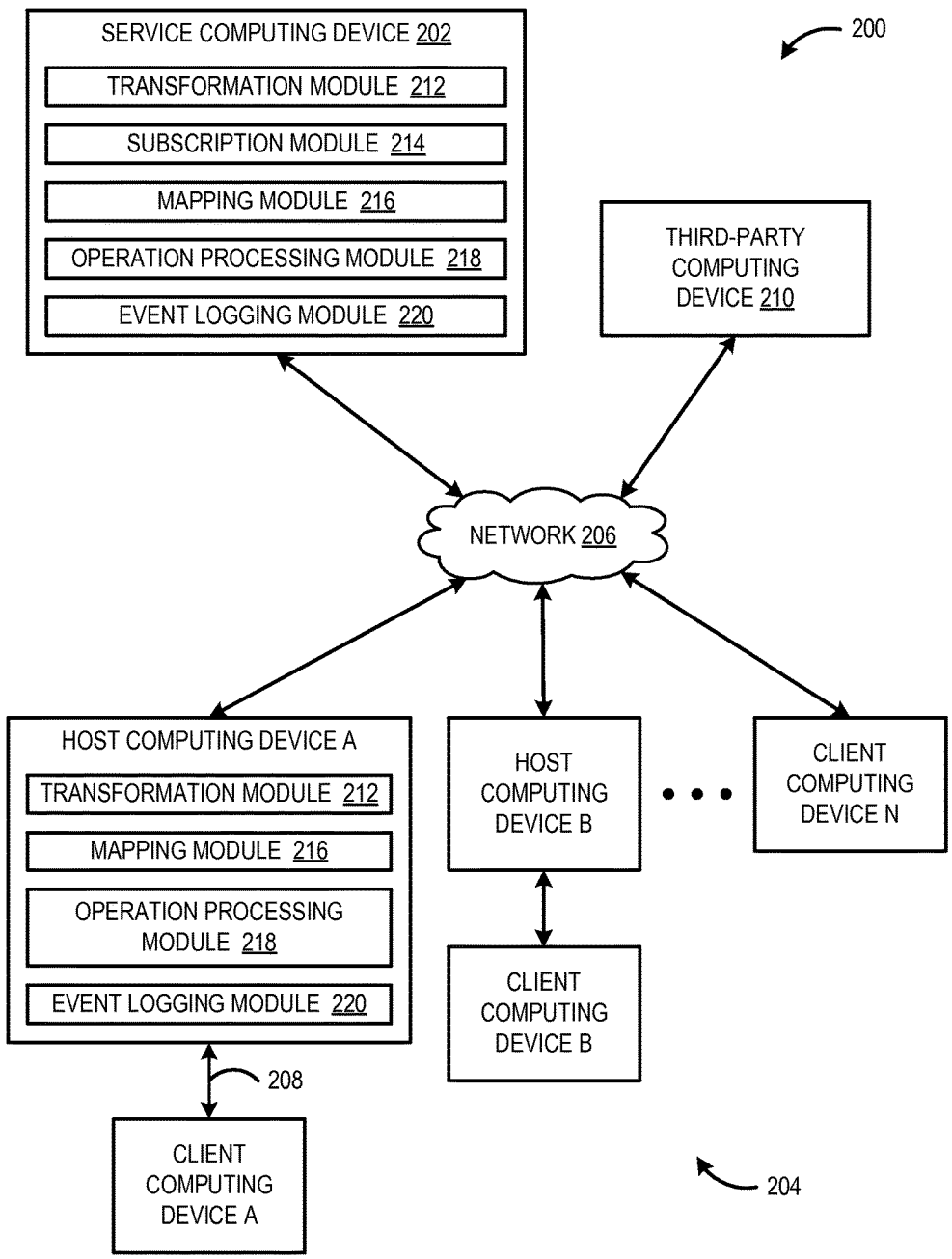
FIG. 2 shows an example computing environment.

FIG. 2 shows an example computing environment 200. The computing environment 200 may include a service computing device 202 configured to provide remote management and processing functionality for a plurality of client computing devices (e.g., CLIENT COMPUTING DEVICE A, CLIENT COMPUTING DEVICE B, CLIENT COMPUTING DEVICE N) 204. The service computing device 202 may be configured to perform operations related to any suitable aspect of any of the plurality of client computing devices. The service computing device 202 may provide processing resources for any suitable number of client computing devices. Moreover, the service computing device 202 may provide resources for any suitable type of client computing device. In some implementations, the service computing device may be representative of a plurality of different network-connected computing devices in a cloud-computing system.

Different client computing devices may be configured with different communication capabilities. Accordingly, the service computing device 202 may communicate with different client computing devices in different manners. In some cases, the service computing device 202 may directly communicate with a client computing device via a network 206, such as the Internet. Such client computing devices may be referred to as network-connected computing devices. In the illustrated example, the CLIENT COMPUTING DEVICE N is a network-connected computing device that directly communicates with the service computing device 202 via the network 206.

In some cases, a client computing device may not have a direct network connection with the service computing device 202. Instead, the client computing device may be configured to communicate with a host computing device via a local network connection (e.g., USB, Bluetooth, Bluetooth Low Energy). The local network connection may be a wired connection or a wireless connection. Such client computing devices may be referred to as non-network-connected computing devices. The service computing device 202 may communicate with a non-network-connected client computing device by relaying communications through a network-connected host computing device.

The network-connected host computing device may take any suitable form. For example, the host computing device may include a smartphone, laptop, desktop, tablet, entertainment console, dedicated hotspot, or another suitable computing device. In one particular example, a non-network-connected client computing device is a wearable computing device and the host computing device is a smartphone.

In some implementations, the client computing devices may include a plurality of communication I/O interfaces to communicate with the host computing device under different conditions. For example, the plurality of communication I/O interfaces may include a wired communication I/O interface configured to communicate with a host computing device and a wireless communication I/O interface configured to communicate with the host computing device. In one particular example, a client computing device may be configured to communicate with a host computing device via any of a USB link, a BT link, or a BTLE link.

In the illustrated example, the CLIENT COMPUTING DEVICE A is configured as a non-network-connected computing device that does not communicate directly with the service computing device 202 via the network 206. Rather, the CLIENT COMPUTING DEVICE A is configured to communicate with a HOST COMPUTING DEVICE A via a local network connection 208. In one example, the local network connection 208 may be a wired network connection via USB or Ethernet, for example. In another example, the local network connection 208 may be a wireless network connection via BT or BTLE, for example. Further, the HOST COMPUTING DEVICE A is configured to communicate with the service computing device 202 via the network 206. Accordingly, the service computing device 202 may be configured to send communications to the HOST COMPUTING DEVICE A, and the HOST COMPUTING DEVICE A may be configured to relay the communications to the CLIENT COMPUTING DEVICE A, and vice versa. Likewise, a HOST COMPUTING DEVICE B and a CLIENT COMPUTING DEVICE B may communicate in a similar manner.

Note that in some implementations, a host computing device may directly allocate resources for the benefit of an associated client device without involvement of the service computing device. For example, the host computing device may provide remote processing and management functionality to the client computing device instead of the service computing device. Moreover, the host computing device may be configured to serve all instances of all services to any suitable number of client computing devices.

Figure 3:
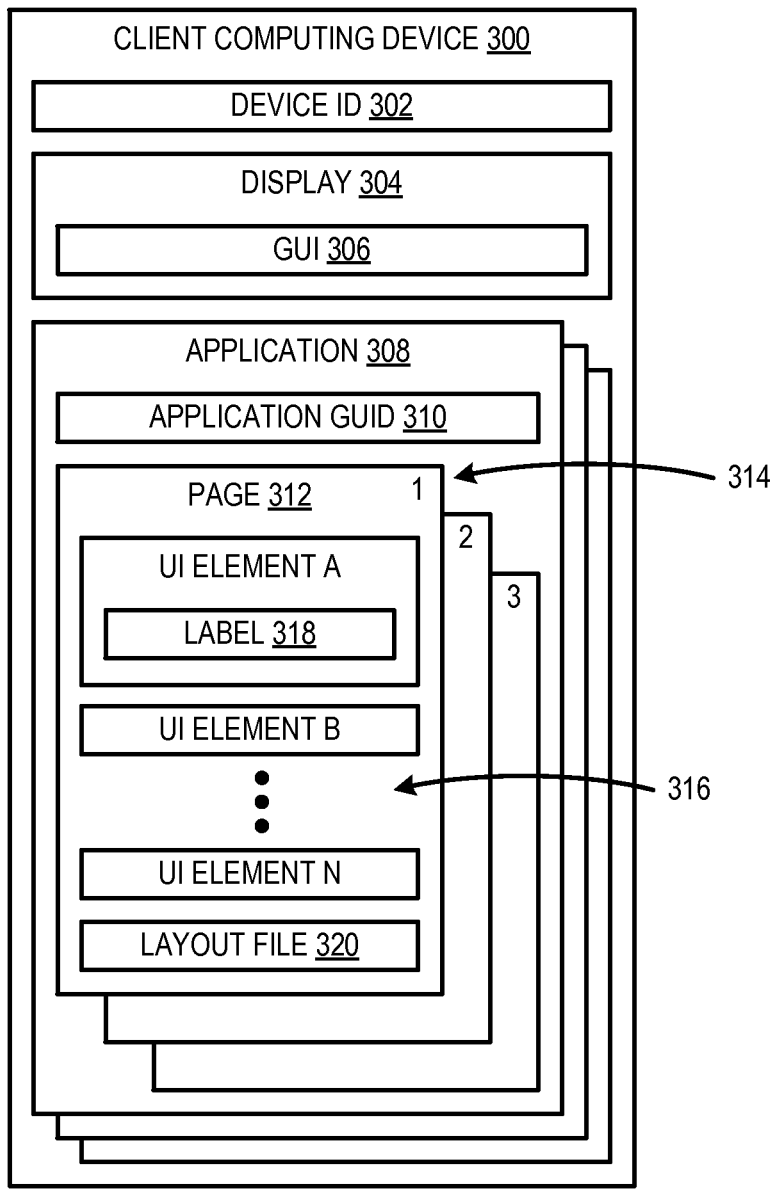
FIG. 3 shows aspects of an example client computing device.

FIG. 3 shows aspects of an example client computing device 300 in more detail. The client computing device 300 may be representative of any of the plurality of client computing devices 204 included in the computing environment 200 shown in FIG. 2. The client computing device 300 may include a device identifier 302. The device identifier 302 may distinguish the client computing device 300 from every other computing device in the computing environment 200. In one example, the device identifier 302 is a globally unique identifier (GUID). The device GUID may have any suitable uniqueness properties and probabilities. In one example, the device GUID is stored as a 128-bit value. In another example, the device identifier 302 is not a GUID, and instead is a serial number. The device identifier 302 may conform to any suitable addressing scheme. For example, the device identifier 302 may be included as part of an addressing scheme to identify communications sent from the client computing device 300 and communications received by client computing device 300.

The client computing device 300 may include a display 304 configured to visually present a graphical user interface (GUI) 306. The GUI 306 may present visual elements of an application installed on the client computing device 300, such as application 308. The application 308 may be one of a plurality of applications installed on the client computing device 300.

Note that an application may be installed or otherwise made available for use on a client computing device in any suitable manner. Moreover, an application may act as a conduit for receiving information from a remote source in any suitable manner. For example, an application may include a general purpose web browser that navigates to a website or other remote information source, and the web browser may present information received from the remote information source via the GUI.

Each application may include an application identifier. For example, application 308 includes an application identifier 310. The application identifier 310 may distinguish the application from every other application installed on the client computing device 300. In some implementations, the application identifier 310 may distinguish the application 308 from every other application in the computing environment 200. In some implementations, the application identifier 310 may be a GUID. The application GUID may have any suitable uniqueness properties and probabilities. In one example, the application GUID is stored as a 128-bit value. In some implementations, the application GUID distinguishes an application from other applications, but does not distinguish all instances or installations of the application. For example, two different instances of the same application may be installed on two different computing devices and each instance of the application may have the same application GUID.

Each application may include a plurality of pages. Each page may be addressed by a page index. For example, a page 312 includes a page index 314. The page index 314 may distinguish the page 312 from every other page included in the application 308. The plurality of pages in the application may be addressed in any suitable manner. In one example, each page of an application may have a linear position, and therefore an ordinal number that can be used as a page index for the page. Note that in this implementation, the GUI 306 may display a single page of an application at a time. In some implementations, the GUI may be configured to display more than one page at a time. The ordinal page numbering is just one example, and the pages may be identified in another suitable manner.

Note that a page may represent any spatial and/or logical grouping of different UI elements and is not limited to a spatial area that a display is capable of presenting at one time. For example, a page can be larger or smaller than a display area of a display.

Each page may include a plurality of user interface (UI) elements 316 (e.g., UI ELEMENT A, UI ELEMENT B, UI ELEMENT N). The plurality of UI elements included in a page may provide the visual content presented by the GUI 306. A UI element may take any suitable form. Non-limiting examples of different types of UI elements include text fields, buttons, text areas, checkboxes, radio buttons, drop-down lists, lists allowing single and multiple selections, panels to group visual components, images, videos, and other suitable UI elements.

Each UI element may include a UI element label that distinguishes the UI element from every other UI element included in the page. For example, UI ELEMENT A includes UI element label 318 that distinguishes UI ELEMENT A from every other UI element on the page 312. Note that a UI element label may include any suitable identifying characteristic including a number, a string, a code, or any other identifier.

In some implementations, the display 304 may be configured to detect touch input. The display may employ any suitable touch detection technology. In such implementations one or more of the plurality UI elements may be selectable via touch input. In some cases, selection of a UI element via touch input may trigger an event that initiates an operation to be performed either locally by the client computing device or remotely by a remote computing device (e.g., the host computing device paired with the client computing device or by the service computing device). Other input modalities may additionally or alternatively be selected or otherwise activated (e.g., voice, gesture, gaze, hardware control, and others).

As discussed above, the service computing device 202 shown in FIG. 2 may be configured to allocate processing resources for the benefit of the plurality of the client computing devices 204. For example, the service computing device 202 may be configured to perform different operations for the plurality of client computing devices 204. In one example, the service computing device 202 may be configured to remotely manage presentation of the GUI displayable by a client computing device. In order to manage presentation of the GUI in a communication efficient manner, the service computing device may implement an approach that separates formatting information of the UI elements presented in the GUI from binary data representative of the actual information presented via the UI elements (e.g., numbers and letters presented in a text field UI element). As such, when the service computing device 202 sends to a client computing device updated information to be displayed via one or more UI elements, the updated information need not include any formatting information.

In one example, the service computing device 202 may be configured to send a UI layout file 320 to the client computing device 300. The UI layout file 320 may define a visual layout of the UI elements presented in the GUI 306 without specifying the underlying data used to populate the UI elements. As an example, the UI layout may define a text box in a certain display location, and the layout file may specify that text displayed in the box will have 12 pt. Arial font, but the layout file will not specify the actual letters to display in this text box. In other implementations, the UI layout file define the visual layout of the UI elements presented in the GUI and may include an initial version of the underlying data used to populate the UI elements. In some implementations, the UI layout file 320 may define the visual layout of UI elements on a per-page basis, and the service computing device 202 may send a client computing device a UI layout file for each page of each application installed on the client computing device 300. In other embodiments, a UI layout file may be generated on a per-application basis, and the UI layout file may define the visual layout of UI elements on every page included in an application.

The UI layout file 320 may be generated by the service computing device 202 according to a predefined schema or in any other suitable manner. In one example, the UI layout file can be generated from an XML file. The XML file may provide an industry standard schema and validation tools to help ensure that the UI layout file is suitable for display by a client computing device.

In some cases, the service computing device 202 may generate the XML file. In some other cases, the service computing device 202 may receive the XML file from a third-party computing device 210. The third-party computing device 210 may be operated by any type of content producer, nonlimiting examples of which include a website host, a social network, a newsfeed host, or another suitable source of UI layout information.

The service computing device 202 may include a transformation module 212 configured to perform a transform of the XML file (or other layout source information) to a binary machine-readable format that may be more readily consumable by a client computing device. For example, the binary format of the transformed UI layout file may mirror the client computing device's direct memory representation of data. In particular, the binary data format of the UI layout file may include binary copies of data organized according to class structures. Moreover, in cases where the XML file is provided from the third-party computing device 210, the transformation operation can provide an opportunity for automated machine based transforms of a layout of the third-party computing device to be transformed into a layout suitable for display on the client computing device. For example, a format of a UI layout of the third-party computing device 210 may be configured for a different platform than the client computing device 300, and the service computing device 202 may be configured to convert the format information to be compatible with a platform of the client computing device.

Figure 4:
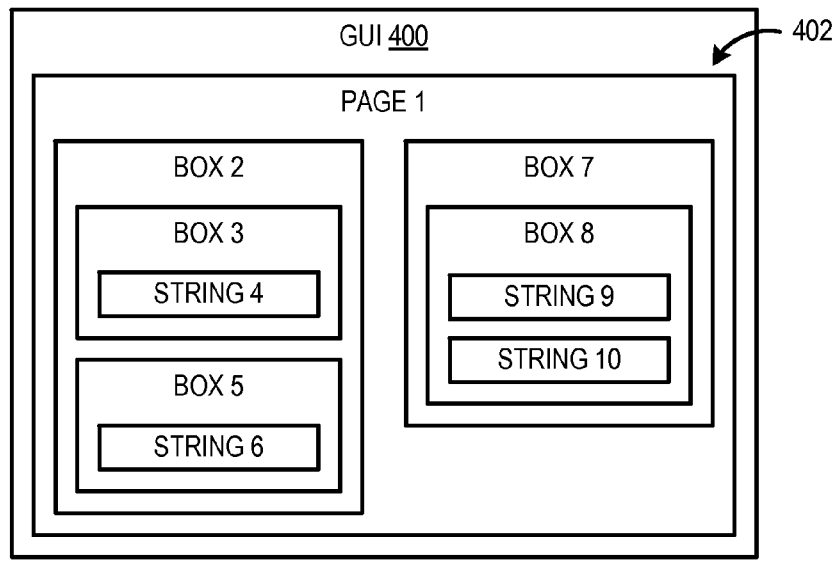
FIG. 4 shows an example graphical user interface (GUI) displayable by a client computing device.
Figure 5:
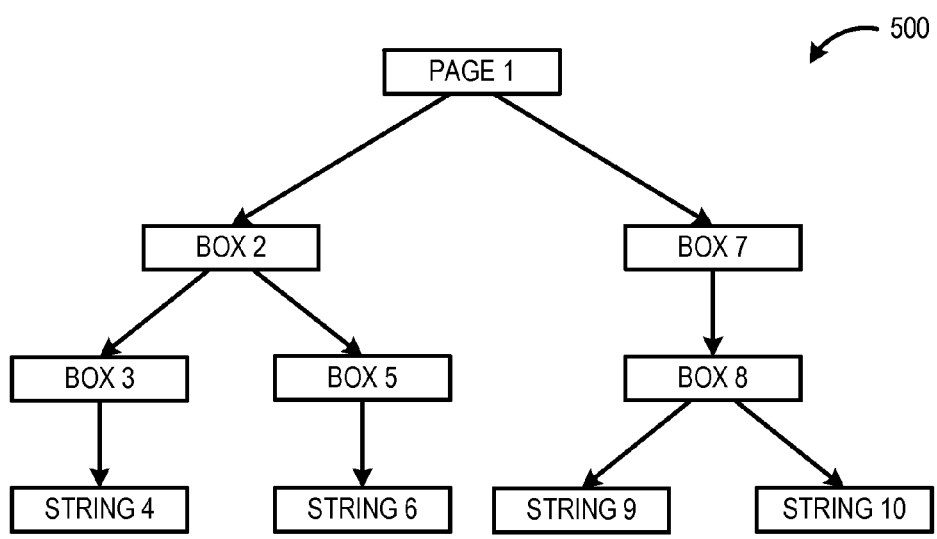
FIG. 5 shows an example user interface (UI) element tree representative of the example GUI of FIG. 4.
Figure 6:
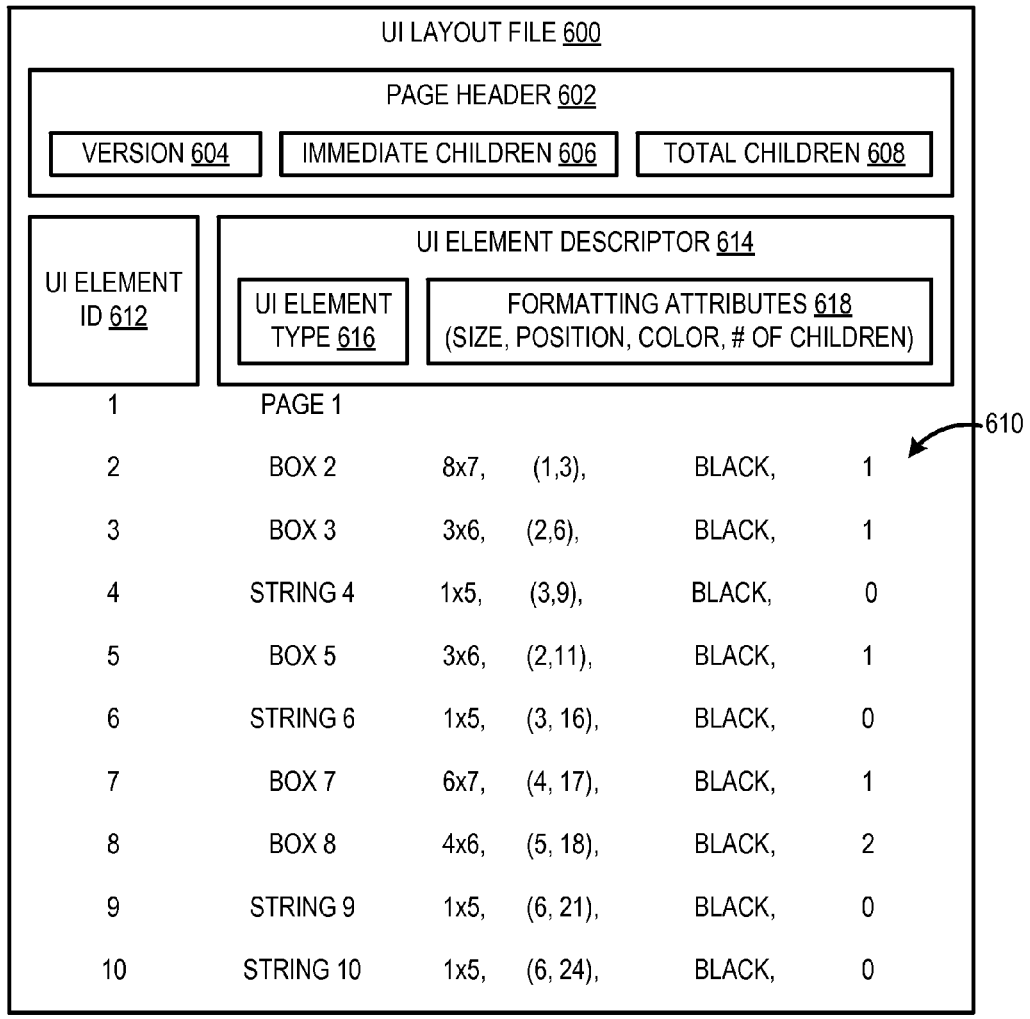
FIG. 6 shows an example UI layout file to generate the example GUI of FIG. 4.

FIGS. 4-6 show an example scenario in which a GUI may be generated from a UI layout file. FIG. 4 shows an example GUI 400 including a plurality of UI elements 402. The plurality of UI elements 402 may include different UI element types including pages, boxes, and strings. Note that the GUI 400 is merely one example, and a GUI may present any suitable type of UI element. In the GUI 400, some UI elements may be nested within other UI elements to form parent-child relationships.

FIG. 5 shows an example UI element tree structure 500 representative of the hierarchy of parent-child relationships of the plurality UI elements 402 included in the GUI 400. In particular, a PAGE 1 is the root element of the UI element tree structure 500. PAGE 1 has no parents, and a BOX 2 and a BOX 7 are the immediate children of PAGE 1. BOX 2 has a BOX 3 and a BOX 5 as immediate children. BOX 7 has a BOX 8 as an immediate child. BOX 3 has a STRING 4 as an immediate child. BOX 5 has a STRING 6 as an immediate child. BOX 8 has a STRING 9 and a STRING 10 as immediate children. STRING 4, STRING 6, STRING 9, and STRING 10 are leaf nodes that have no children.

FIG. 6 shows an example UI layout file 600 that may be generated from the tree structure 500. For example, the UI layout file 600 may be representative of the UI layout file 320 shown in FIG. 3. The UI layout file 600 includes a page header 602 that indicates a general structure of the page presented by the GUI.

For example, the page header 602 may include a version 604 of the UI layout file, a number of immediate children 606 of the root UI element (e.g., PAGE 1), and a total number of child UI elements 608 in the UI layout file (e.g., 9). The version 604 may indicate which UI layout file is currently in use in order to suitably determine UI element types when a UI element is updated.

The UI layout file 600 may include a plurality of UI elements 610. Each UI element may include a UI element identifier 612 and a UI element descriptor 614. The UI element identifier 612 may distinguish the UI element from every other UI element in the UI layout file 600. For example, the UI element identifier may be a unique numeric identifier. The UI element identifier may be used for data binding of both data update binary large objects (BLOBs) and single data update requests. Note that an update BLOB is one non-limiting example of an update object. Any suitable type of object may be employed to transmit update data. The UI element descriptor 614 may define a UI element type 616 and formatting attributes 618 of information displayed via the UI element. In the illustrated implementation the formatting attributes 618 include a memory size, a position, a color, font style, alignment, transparency, and a number of child UI elements. However, any suitable formatting attribute may be defined by the UI element descriptor.

The plurality of UI elements 610 optionally may be ordered in the UI layout file 600 according to a flattened version of the tree structure 500 shown in FIG. 5. In particular, the plurality of UI elements 610 may be ordered in the UI layout file 600 according to the parent-child relationships indicated by the tree structure 500. The flattened tree structure may be representative of a final memory format used by the client computing device to generate the GUI. By ordering the UI elements in the flattened tree structure and providing the number of children of each UI element as attributes, a position of a UI element within the parent-children hierarchy may be conveyed with a minimal amount of information. In other words, such a format may reduce an amount of data that is included in the UI layout file that is sent to the client computing device. Such an approach provides one example in which communication efficiency of a client computing device may be increased.

In one example, the UI layout file 600 has a binary machine-readable format that may be efficient to send to a client computing device. Note that a UI layout file may be sent to a client computing device once in order to inform the client computing device of the formatting attributes of every UI element in the UI layout file. However, in some cases, an updated UI layout file may be sent to the client computing device in order to change the visual layout of the GUI. Such an updated UI layout file may have a different version that may be tracked by the service computing device. For example, an updated UI layout file may change formatting attributes of a UI element, add a page, delete a page, add a UI element to a page, and/or delete a UI element from a page. Note that an updated UI layout file may update just the formatting attributes of UI elements and may be different from an update BLOB including updated information to be presented via a UI element.

Once the formatting attributes of the UI elements are known by the client computing device 300 from the UI layout file 320, the service computing device 202 may be configured to send subsequent update BLOBs to update information presented via one or more UI elements in the GUI 306.

Figure 7:
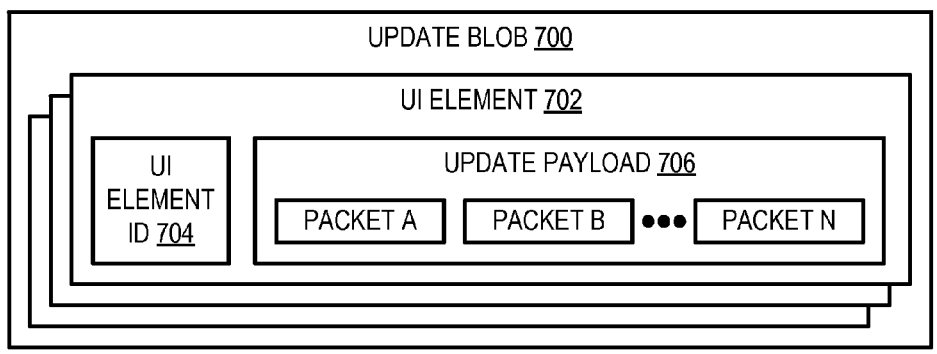
FIG. 7 shows an example update binary large object (BLOB) to update one or more UI elements in the example GUI of FIG. 4.

FIG. 7 shows an example update BLOB 700 to update one or more UI elements in a GUI. The update BLOB 700 may include a UI element identifier 704 of the UI element 702 to be changed and a payload 706 of updated information to be displayed via the UI element 702. The updated information may replace the information previously displayed via the UI element. For example, the updated information included in the payload 706 may be a direct binary machine-readable representation of the updated information. In some cases, UI element identifiers and updated information for a plurality of UI elements to be updated may be bundled into the same update BLOB. In other cases, only one UI element may be updated. This type of selected updating is efficient because data need not be sent for UI elements that are not to be updated.

Moreover, each payload may omit formatting attributes of the UI element to be changed, because the client computing device references such formatting attributes from the UI layout file. For example, a UI element type may be determined by looking up the type associated with the UI element identifier in the UI layout file. As such, the object type need not be communicated via the payload. All other aspects included in the UI layout file may be similarly left out of the payload, because these aspects can be looked up using the UI element identifier that is included in the update BLOB.

In one particular example, a UI element may be updated to present the number "7", and the corresponding update BLOB may merely include the UI element identifier and the binary representation of the number "7". Upon receiving the update BLOB, the client computing device may look up the UI element type of the binary data from the previously received UI layout file (e.g., integer). In other words, the UI element identifier may act as a binding mechanism for the binary data included in the payload. Similarly, the client computing device may look up the screen position and formatting characteristics for creating the desired visual representation of the number "7," even though such formatting is not communicated as part of the update BLOB.

In contrast to this approach, other communication formats (e.g., JSON, or XML) include a mapping from a data payload to an internal representation of the data within the BLOB itself. In one particular example, the update BLOB may include a string including the number seven and a mapping indicating that the string is an integer type UI element. Further, such approaches may include all of the formatting for displaying the underlying data. Such an approach may increase an amount of data included in the update BLOB relative to the approach in which the UI element type is determined from the UI layout file.

The updated information included in an update BLOB may be received by the client computing device from any suitable source. In some cases, the service computing device 202 may generate the updated information. In some cases, the service computing device 202 may receive the updated information from the third-party computing device 210. In one example, the service computing device 202 may subscribe to the information from the third-party computing device 210. In another example, the service computing device 202 may scrape the updated information from the third-party computing device 210. In some cases, the updated information may be received from the third-party computing device 210 in an XML format. The service computing device 202 may be configured to translate the XML data into a binary machine-readable format, via the transformation module 212, for example. In some cases, the service computing device 202 may receive the updated information from the third-party computing device 210 in a binary machine-readable format and transformation need not be necessary.

In some cases, the UI layout file and/or subsequent update BLOBs may be sent from the service computing device to a client computing device directly via a wide area network connection. For example, the service computing device may know a device identifier of the client computing device, and may send the communications to the client computing device (a.k.a., a push approach). In another example, a client computing device may request the UI layout file and/or update BLOBs from the service computing device, and the service computing device may send the communications responsive to receiving the requests (a.k.a., a pull approach). In some cases, a plurality of client computing devices may subscribe to the UI layout file and subsequent update BLOBs. The service computing device may have an awareness of subscribing client computing devices, and may broadcast communications to all subscribing client computing devices.

In some implementations, in cases where a client computing device communicates with the service computing device via an intermediary host computing device, some or all of the processing or management responsibilities for updating the GUI may be handled by the host computing device directly instead of the service computing device. In one example, the UI layout file may be generated by the service computing device, and/or subsequent update BLOBs corresponding to the UI layout file may be generated by the host computing device, or vice versa.

In another example, the service computing device may send an XML file representative of the GUI to the host computing device, and the host computing device may transform the XML file into the UI layout file having a binary machine-readable format. In such implementations, the host computing device may include the transformation module 212. In yet another example, the host computing device may handle all processing responsibilities for managing the GUI. In particular, the host computing device may generate the UI layout file and the subsequent update BLOBs without communicating with the service computing device.

In another example approach to increase communication efficiency, a remote computing device (e.g., the service computing device or a host computing device) may subscribe to events of a client computing device. Stated another way, the herein described approach may enable a client computing device to, in an efficient manner, communicate to a remote computing device processing and control requests to perform various operations. In one example, the remote computing device may subscribe to events associated with particular UI elements in a GUI displayed by a client computing device. In another example, the remote computing device may subscribe to events associated with components of a client computing device. For example, the remote computing device may subscribe to different sensors of a client computing device, and the client computing device may send sensor readings to the remote computing device responsive to different events. Note that any suitable event may trigger an operation to be performed to the benefit of a client computing device. Further, such operations may be associated with particular UI elements, via a mapping, for example. Moreover, this approach may provide further optimizations in communication efficiency for a non-network-connected client computing device requesting remote processing and control resources via an intermediary host computing device as will be described herein. Further, such an approach may allow a host computing device to provide remote processing and control resources directly to a client computing device without involvement of a service computing device.

In one example, the service computing device 202 may identify any instance of any UI element displayed on any client computing device in the computing environment 200. As discussed above, a GUI may present a page of an application including a plurality of UI elements. The application has an application identifier that distinguishes the application from every other application in the computing environment. A page index of the page being displayed in the GUI distinguishes the page from every other page included in the application. Each UI element included in the page has a UI element label that distinguishes the UI element from every other UI element included in the page.

Figure 8:
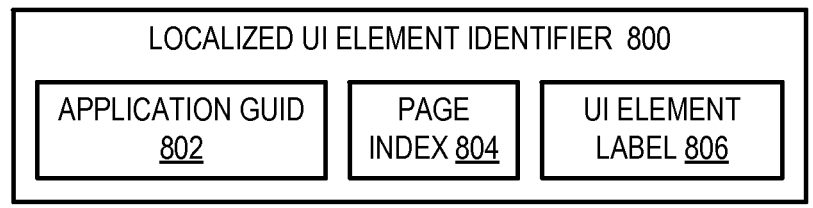
FIG. 8 shows an example localized UI element identifier.

As shown in FIG. 8, these addressing elements may be included in a localized UI element identifier 800 that can be used to identify any UI element across all applications installed on a client computing device. In other words, the localized UI element identifier distinguishes an instance of a UI element from every other instance of every UI element displayable in any application installed on a client computing device. In particular, the localized UI element identifier 800 may include an address triplet of an application identifier 802, a page index 804, and a UI element identifier 806. In one example, the application identifier 802 is representative of the application identifier 310, the page index 804 is representative of the page index 314, and the UI element label 806 is representative of the UI element label 318 all of which are shown in FIG. 3.

In one example, the application identifier is a GUID having a first memory size, and the page index and the UI element label are other types of identifiers each having a memory size that is less than the first memory size of the application GUID. The other identifiers may be smaller in order to save bandwidth of the client computing device when sending the localized UI element identifier to a remote computing device.

Figure 9:
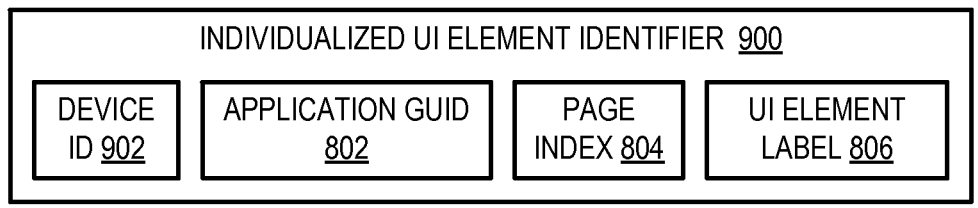
FIG. 9 shows an example individualized UI element identifier.

Furthermore, as shown in FIG. 9, the localized UI element identifier 800 may be converted into an individual UI element identifier 900 by adding a device identifier 902 to the address triplet. In particular, the individualized UI element identifier 900 may include the device identifier 902, the application identifier 802, the page index 804, and the UI element label 806. In one example, the device identifier 902 is representative of the device identifier 302 shown in FIG. 3. The individualized UI element identifier 900 can be used to identify any instance of a UI element across all applications installed on all client computing device within the computing environment 200.

Note that the different address elements of the localized UI element identifier and the individualized UI element identifier may be ordered in any suitable manner to form any suitable format variation of a UI element address.

The service computing device 202 and/or a host computing device may be configured to receive notifications of events from one or more computing devices. In one example, the service computing device 202 may receive notifications of events based on the service computing device subscribing to various UI elements on different client computing devices. In one example, the service computing device 202 includes a subscription module 214 that may be configured to generate, modify, and/or maintain a list of subscriptions to different instances of UI elements. The service computing device may subscribe to any suitable number of different instances of UI elements on different client computing devices. In some cases, a notification may be received directly from a network-connected client computing device. In some cases, a notification may be received from a host computing device on behalf of a non-networked-connected client computing device.

The service computing device may receive a notification of any suitable type of event. In one example, an event includes an instance of a UI element being selected via user input to a client computing device. In another example, an event includes an instance of a UI element being modified via user input to a client computing device. In another example, an event includes a physical button of a client computing device being depressed. Note that an event may be unrelated to a UI element. For example, an event may occur periodically. In another example, an event may occur responsive to another suitable operation of a client computing device.

Each notification received by the service computing device 202 may include an individualized UI element identifier. The service computing device 202 may be configured to identify an instance of a UI element based on the individualized UI element identifier included in the notification of the event.

In cases where a client computing device is a non-network-connected device, the client computing device may send a notification of an event to a host computing device. The notification of the event may include a localized UI element identifier. The host computing device may be configured to add a device identifier of the client computing device that sent the notification onto the localized UI element identifier to generate an individualized UI element identifier, and the host computing device may be configured to relay the notification including the individualized UI element identifier to the service computing device. By not prepending the device identifier onto the localized UI element identifier at the client computing device, an amount of data sent by the client computing device may be reduced, and efficiency of communication may be increased. Such an approach may be particularly beneficial in cases where the host computing device has significant processing resources and communication bandwidth relative to the client computing device. Such an approach also may be particularly beneficial in decreasing the energy consumed by communicating in battery-powered client computing devices.

In response to identifying the instance of the UI element, the service computing device 202 may be configured to perform an operation associated with the UI element. The service computing device 202 may include a mapping module 216 configured to generate, modify, and/or maintain a map of instances of UI elements to different operations. In one example, an instance of a UI element may be mapped to an individual operation. In another example, an instance of a UI element may be mapped to multiple different operations that may be conditionally performed based on various operating conditions.

The service computing device 202 may include an operation processing module 218 configured to perform an operation associated with an instance of a UI element identified as being involved in an event. In particular, the operation processing module 218 may be configured to manage processing and data-storage resources of the service computing device 202 in order to perform an operation. Further, the operation processing module 218 may be configured to, in some cases, generate commands sent to other remote computing devices to perform an operation on behalf of a requesting client computing device. For example, the service computing device 202 may act as an intermediary between a client computing device and other network-connected computing devices, such as the third-party computing device 210. In another example, the service computing device 202 may send commands to a host computing device, and the host computing device may be configured to perform an operation specified by the command. In yet another example, the service computing device 202 may send commands to a host computing device, and the host computing device may relay the commands to a client computing device paired or otherwise in communication with the host computing device. In some implementations, the host computing device may include an operation processing module. For example, the host computing device may include an operation processing module in implementations where the host computing device performs operations for client devices directly without involvement from the service computing device.

The service computing device 202 may include an event logging module 220. The event logging module 220 may be configured to create and maintain a log of events for UI elements to which the service computing device 202 subscribes. For example, the event logging module 220 may create a log entry each time the service computing device 202 receives a notification of an event. In one example, the log may be organized such that each client computing device has a list of events associated with UI elements associated with the client computing device. In another example, the log may be organized such that each UI element has a list of events that is agnostic to any particular client computing device. This type of organization may be useful for tracking interactions with a particular UI element across all instances of the UI element on different client computing devices. The log may track events for different UI elements in order to judge popularity, usage, or other suitable aspects of the UI elements. Such tracking may be applied to refining and developing various applications. Further, the log may collectively track usage or popularity of a UI element by a plurality of client computing devices that may be applied to different applications, such as polling, voting, or other suitable activities.

Furthermore, in some cases, a host computing device may process a notification and perform an operation directly without communicating with the service computing device. For example, the host computing device may perform an operation directly in order to reduce communications with the service computing device. In another example, the host computing device may perform an operation directly if the host computing device loses a network connection with the service computing device.

The host computing device may include the mapping module 216 in order to identify an operation associated with an instance of a UI element identified in a notification of an event. In some cases, a version of the map maintained on the host computing device may be truncated relative to a version of the map maintained on the service computing device. For example, the version of the map maintained on the host computing device may only include instances of UI elements of applications installed on the associated client computing device.

In some implementations, the host computing device may include the event logging module 220. The event logging module 220 may be configured to locally log events associated with UI elements of an associated non-network-connected client computing device.

Figure 10:
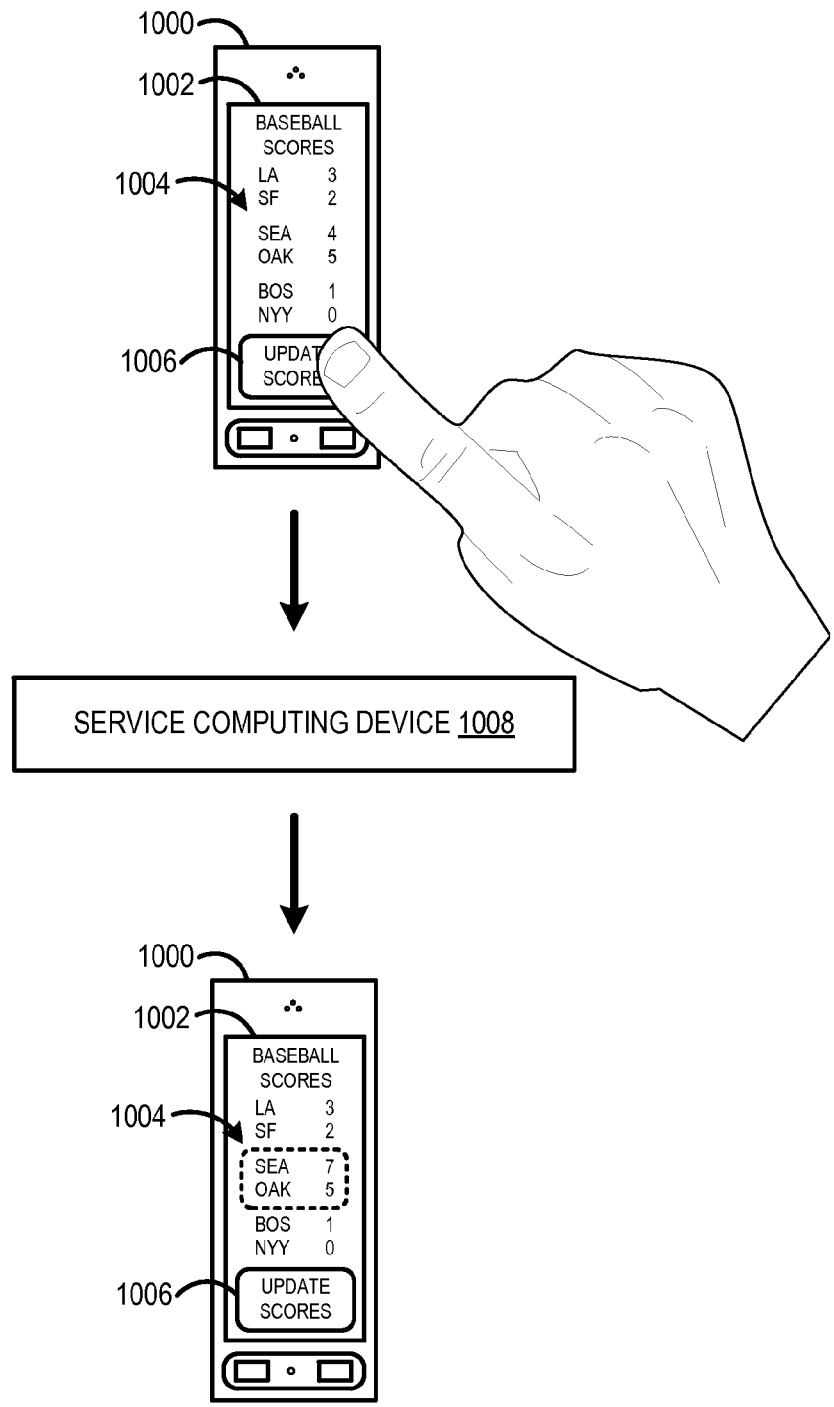
FIG. 10 shows an example scenario in which an event triggers a command, associated with a UI element of a client computing device, to adjust operation of the client computing device.
Figure 11:
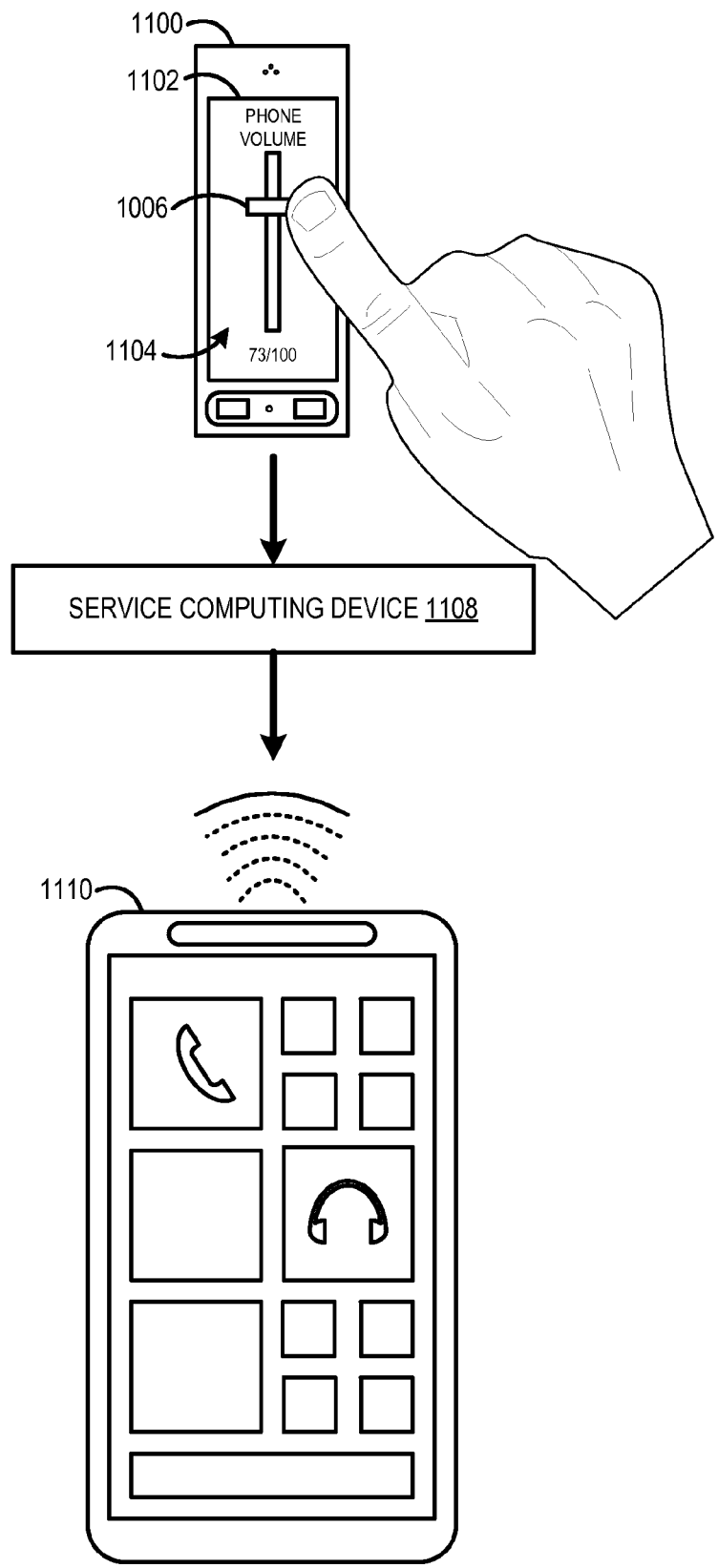
FIG. 11 shows an example scenario in which an event triggers a command, associated with a UI element of a client computing device, to adjust operation of a host computing device.
Figure 12:
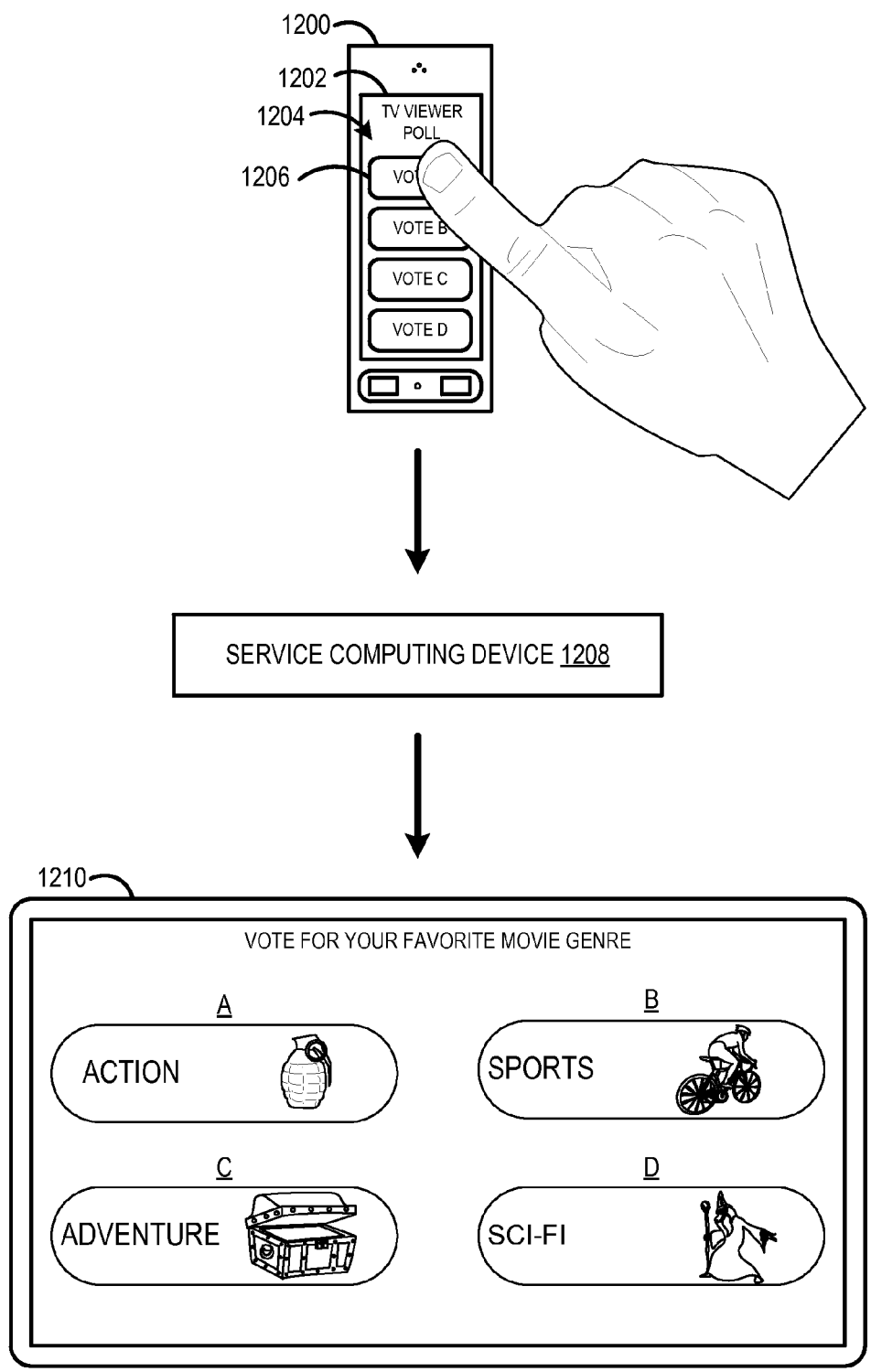
FIG. 12 shows an example scenario in which an event triggers a command, associated with a UI element of a client computing device, to adjust operation of a network-connected computing device.

The service computing device and/or the host computing device may be configured to perform any suitable operation for a client computing device. FIGS. 10-12 show example scenarios of different operations associated with an instance of a UI element being performed responsive to notification of an event.

FIG. 10 shows an example scenario in which an event triggers a command to adjust operation of the client computing device 1000. The command may be representative of an operation that is associated with a UI element of the client computing device 1000. In particular, a client computing device 1000 includes a touch display that generates a GUI 1002 presenting a BASEBALL SCORES page of a sports application installed on the client computing device 1000. The GUI 1002 includes a plurality of UI elements 1004 in the form of different teams matched up in different games, as well as scores associated with the different teams. Furthermore, the GUI 1002 includes an update-scores button 1006.

The client computing device 1000 may be configured to generate a notification of an event associated with the update-scores button 1006 in response to receiving touch input that selects the update-scores button 1006. In other implementations, the update-scores button 1006 is omitted and scores are periodically updated. In still other implementations, updates are pushed to the client computing device. Any suitable event may trigger an operation associated with an instance of a UI element to be performed.

The notification includes an individualized UI element identifier that identifies the instance of the update-scores button 1006 on the client computing device 1000, or otherwise identifies the appropriate trigger, even if it is a buttonless trigger. The client computing device 1000 sends the notification of the event to the service computing device 1008 either directly via a wide area network connection, or relayed through a network-connected host computing device. The service computing device 1008 identifies the update-scores button 1006 or another trigger based on the individualized UI element identifier and looks up an operation associated with the UI element. In this case, the operation includes sending to the client computing device 1000 a command to adjust operation of the client computing device. In particular, the service computing device 1008 sends an update BLOB to the client computing device 1000. The update BLOB includes updated information to be presented via the UI elements corresponding to updated scores in the GUI 1002.

The service computing device may send any suitable updated information or refreshed information to the client computing device to be displayed via the UI element responsive to an event. For example, if the score of only one team has changed since the last update, only that score need be included in the update BLOB. In the illustrated example, the score for SEA is the only UI element that has changed. As such, the update BLOB includes the UI element identifier for the UI element corresponding to the score of SEA and a data payload with the number "7." Note that this change is highlighted in FIG. 12, but in actuality the highlighting may be omitted from the GUI.

FIG. 11 shows an example scenario in which an event triggers a command to adjust operation of a host computing device. The command may be representative of an operation that is associated with a UI element of the client computing device. In particular, a client computing device 1100 includes a touch display that generates a GUI 1102 presenting a page of a phone volume application installed on the client computing device 1100. The phone volume application may allow a user to adjust a volume of a smartphone 1110 that is acting as a host computing device to the client computing device. The GUI 1102 includes a plurality of UI elements 1104 in the form of different text labels and a volume slider 1106.

The client computing device 1100 may be configured to generate a notification of an event associated with the volume slider 1106 in response to receiving touch input that adjusts a position of the volume slider 1106. The notification includes an individualized UI element identifier that identifies the instance of the volume slider 1106 on the client computing device 1100. The client computing device 1100 may send the notification of the event to the service computing device 1108 either directly via a wide area network connection, or relayed through a network-connected host computing device (e.g., smartphone 1110). The service computing device 1108 identifies the volume slider 1106 based on the individualized UI element identifier and looks up an operation associated with the UI element. In this case, the operation includes sending to the smartphone 1110 a command to adjust operation of the smartphone. In particular, the command may instruct the smartphone to adjust the volume of a speaker on the smartphone.

In another example, the client computing device 1100 is a non-network-connected computing device and the smartphone 1110 acts as a host computing device for the client computing device. In this example, the client computing device 1100 sends a notification of the event to the smartphone 1110. The notification includes a localized UI element identifier. The smartphone 1110 identifies the volume slider 1106 based on the localized UI element identifier, looks up an operation associated with the UI element, via a locally-stored map, for example. Further, the smartphone 1110 performs the operation to adjust the volume directly. In some implementations, the smartphone 1110 may not relay the notification to the service computing device as a bandwidth saving measure. In some implementations, the smartphone 1110 may relay the notification to the service computing device 1108 as part of an event logging function.

FIG. 12 shows an example scenario in which an event triggers a command to adjust operation of a network-connected computing device. The command may be representative of an operation that is associated with a UI element of the client computing device. In particular, a client computing device 1200 includes a touch display that generates a GUI 1202 presenting a TV VIEWER POLL page of a television viewing companion application installed on the client computing device 1200. The GUI 1202 includes a plurality of UI elements 1204 in the form of different voting buttons (e.g., VOTE A, VOTE B, VOTE C, VOTE D) corresponding to different genres of television programs displayed on a network-connected television 1210.

The client computing device 1200 may be configured to generate a notification of an event responsive to selection of one of the voting buttons via touch or other input. In this example, the user votes for the action genre by selecting a button 1206 via touch input to the client computing device 1200. The notification includes an individualized UI element identifier that identifies the instance of the button 1206 on the client computing device 1100. The client computing device 1200 sends the notification of the event to the service computing device 1208 either directly via a wide area network connection, or relayed through a network-connected host computing device. The service computing device 1208 identifies the button 1206 based on the individualized UI element identifier and looks up an operation associated with the UI element. In this case, the operation includes tracking the event in a log of UI element events, via the event logging module described above, for example. The log may track how many different client computing devices selected the different voting buttons in the GUI in order to provide polling/voting functionality. Further, the service computing device 1208 may be configured to send the results of the TV VIEWER POLL to be displayed on either the client computing device 1200 or the network-connected television 1210.

In some implementations, the service computing device may be configured to perform an operation for all instances of a UI element on different client computing devices. For example, the same television viewing companion application may be installed on a plurality of different client computing devices. In one example, as part of managing the GUI of the plurality of client computing devices, the service computing device may send an update BLOB to update information displayed via a poll results UI element. In particular, the update BLOB may include a localized UI element identifier of the poll results UI element to be updated and a payload including binary data representative of the poll results. In one example, the service computing device may broadcast the update BLOB to all client computing devices. If the application is installed on a client computing device, then the client computing device may update the information displayed via the poll result UI element specified by the localized UI element identifier. If the application is not installed on a client computing device, then the client computing device may disregard the update BLOB.

In another example, an application for controlling the network-connected television 1210 may be installed on the client computing device 1200, such as a virtual remote control application. The virtual remote control application may include UI elements that are selectable to adjust operation of the network-connected television 1210. For example, the UI elements may include volume controls, channel controls, DVR controls, or another suitable television control. The client computing device may send to the service computing device 1208 and/or the network-connected television 1210 a notification of an event responsive to selection of one of these remote-control type UI elements via user input. Further, the service computing device 1208 may send a command associated with the UI element to the network-connected television 1210 to adjust operation of the network-connected television. For example, the command may change the channel, adjust the volume, record a television show, or perform another suitable action. The client computing device may be used to adjust any suitable parameter of the network-connected television in this manner.

According to the above described approach, a remote computing device (e.g., a service computing device, a host computing device, a third-party computing device, or another suitable computing device) may be informed of an event that triggers an operation associated with any UI element displayed in a GUI of any client computing device to be performed merely by the client computing device (or an associated host computing device) providing a notification including an individualized UI element identifier of the UI element. In other words, such an addressing scheme may allow for the client computing device to communicate processing requests to the remote computing device in a data-efficient manner.

In yet another example approach to increase communication efficiency, the client computing device may be configured to communicate with a remote computing device over both a wired communication I/O interface and a wireless communication I/O interface using the same protocol. In general, this protocol may be used with any number of different transport layers (e.g., USB, BT, and BTLE). A packet format of the protocol may be exactly the same over all transport layers of the different communication I/O interfaces. Moreover, the client computing device-side of the protocol may have a single unified implementation for all transport layers. In one example, the protocol may expose features of a client computing device, such as UI elements, sensor signals, and other component information to a remote computing device in the same manner over the plurality of different transport layers. Such uniformity may allow for a shared library that may be compatible with the different transport layers. Accordingly, the shared implementation may reduce a memory footprint on the client computing device and may increase communication efficiency.

In one example, the protocol may be a three-stage protocol that includes a command stage, a data stage, and a status stage. During the command stage, a command packet may be sent from a remote computing device to a client computing device. The command packet may specify a command to be serviced by the client computing device. During the data stage, optionally one or more data packets may be transferred between the remote computing device and the client computing device based on the command specified in the command packet. During the status stage, the client computing device may send a status code to the remote computing device indicating whether or not the command was successfully serviced by the client computing device.

In one example, the three-stage protocol may be a command protocol that includes a plurality of different commands. More particularly, the command protocol may define three different command types. A first command type specifies that the remote computing device sends data to the client computing device during the data stage. In one example of the first command type, a command to set a sensitivity level of a backlight of the client computing device may include a desired intensity level of the backlight. The desired intensity value may be sent from the remote computing device to the client computing device during the data stage.

A second command type specifies that the remote computing device receives data from the client computing device during the data stage. In one example of the second command type, a command to request the current intensity level of the backlight of the client computing device may result in the client computing device sending the current intensity level of the backlight to the remote computing device.

A third command type specifies that no data is exchanged between the remote computing device and the client computing device during the data stage. In one example of the third command type, a command to turn on the backlight may be sent from the remote computing device to the client computing device.

In some implementations, all commands of the command protocol may be initiated by the remote computing device (e.g., the service computing device or the host computing device). By initiating all commands from the remote computing device, the client computing device may be allowed to have less processing power and still implement the command protocol.

Figure 13:
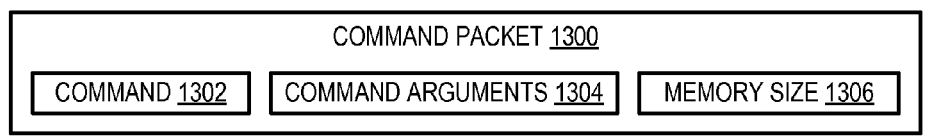
FIG. 13 shows an example command packet received by a client computing device during a command stage of a three-stage protocol.

FIG. 13 shows an example command packet 1300 that may be sent from the remote computing device to the client computing device during the command stage of the three-stage command protocol. The command packet 1300 may include a command or command identifier 1302, command arguments 1304, and a memory size 1306. The command 1302 may be selected from a library of commands compatible with the different transport layers of the different communication I/O interfaces. In particular, the library of commands may be shared by the wired communication I/O interface and the wireless communication I/O interface. The command arguments 1304 may be selected from a plurality of command arguments that can be processed by command handlers of the client computing device to service the command. The command arguments may be optionally included in the command packet based on the type of command that is selected to be processed. The format of the command arguments may be implicitly known between the host computing device and the command handler of the client computing device that performs the command. The command arguments may be used to setup or initialize the client computing device before data is sent from the host computing device during the data stage to perform the command. The memory size 1306 may specify a total memory size of data transmitted during the data stage of the three-stage command protocol.

In one example, each command handler on the client computing device may be defined by three functions. The first function may be an argument setup function that may be optionally performed based on the type of command specified by the command packet. In particular, this optional function may be registered by the command handler to perform setup operations on the client computing device when the command packet is received. The second function may be a transmit function that may be registered and executed when the command handler services a command in which data is sent from the client computing device to the remote computing device. The third function may be a receive function that may be registered and executed when the command handler services a command in which data is received by the client computing device from the remote computing device.

Figure 14A:
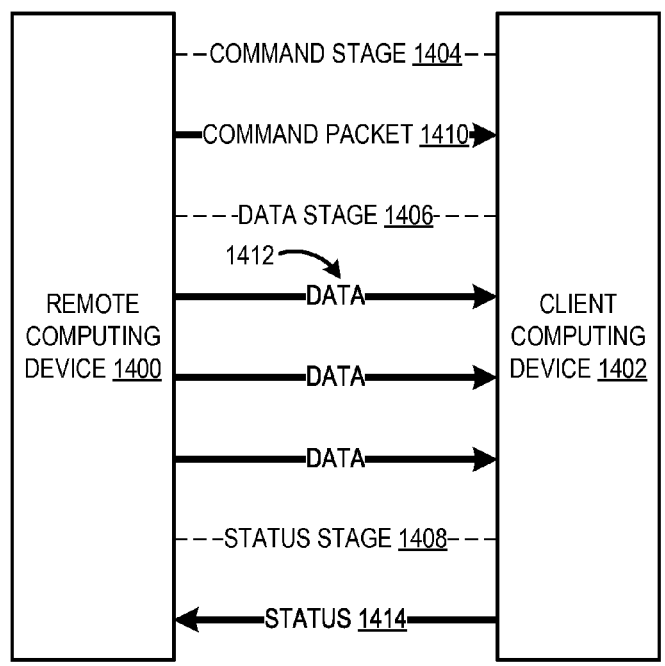
FIG. 14A shows an example scenario in which a remote computing device sends data packets to a client computing device during a data stage of a three-stage protocol.
Figure 14C:
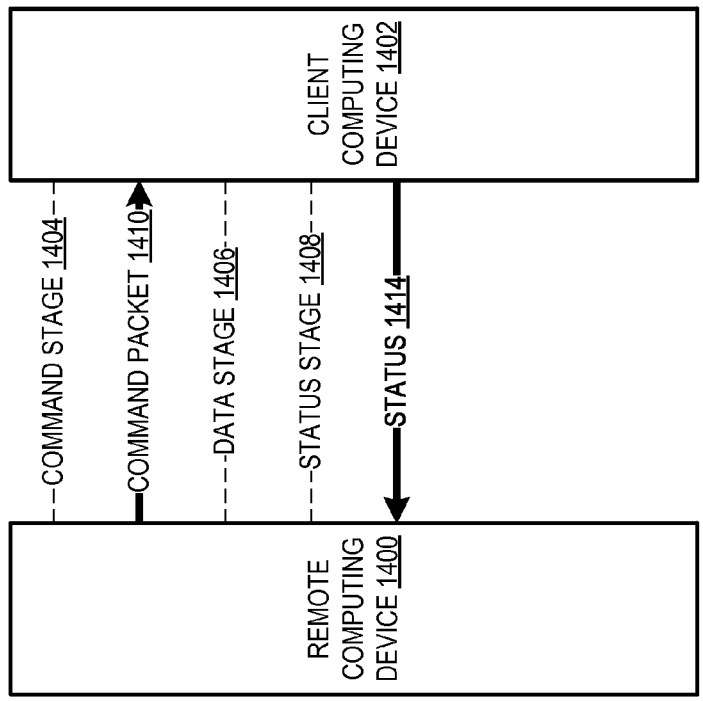
FIG. 14C shows an example scenario in which no data packets are sent between a remote computing device and a client computing device during a data stage of a three-stage protocol.
Figure 14B:
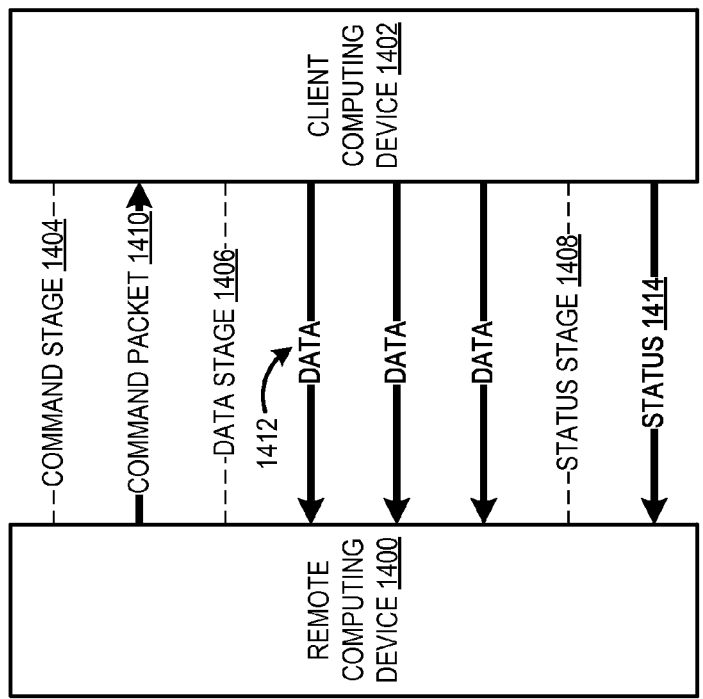
FIG. 14B shows an example scenario in which a client computing device sends data packets to a remote computing device during a data stage of a three-stage protocol.

FIGS. 14A-14C show example scenarios of communications between a remote computing device 1400 and a client computing device 1402 according to the three-stage command protocol. In particular, the three-stage command protocol may include a command stage 1404, a data stage 1406, and a status stage 1408. During the command stage 1404, a command packet 1410 may be sent from the remote computing device 1400 to the client computing device 1402. Based on the type of command specified by the command packet 1410, data packet(s) may or may not be sent during the data stage 1406. If the command specifies that data packet(s) are sent during the data stage 1406, then the command may further specify a direction in which the data packet(s) are to be sent. In one example, the direction may be implicitly encoded in a command identifier. In particular, the data packet(s) are either sent from the remote computing device 1400 to the client computing device 1402 or the data packet(s) are sent from client computing device 1402 to the remote computing device 1400 during the data stage. In some implementations, the data stage may be configured for one-way communication on a per-command basis.

FIG. 14A shows an example scenario where a command specifies that the remote computing device 1400 sends a plurality of data packets 1412 to the client computing device 1402 during the data stage 1406. FIG. 14B shows an example scenario where a command specifies that the client computing device 1402 sends a plurality of data packets 1412 to the remote computing device 1400. FIG. 14C shows an example scenario where a command specifies that no data packets are transmitted between the remote computing device 1400 and the client computing device 1402 during the data stage 1406. Any suitable number of data packets may be sent or received during the data stage 1406.

In some implementations, the data stage 1406 may be optimized for efficient, high-bandwidth communication. In one example, the plurality of data packets 1406 may be configured without any special headers or flags in order to reduce an amount of data transmitted between devices.

In another example, a size of the data packets 1406 may be dynamically selected to correspond to a maximum transmission unit (MTU) of the communication I/O interface through which the data packets are being sent. In particular, if the data packets are sent via the wired communication I/O interface then the packets may be sized according to an MTU of the wired communication I/O interface. If the data packets are sent via a wireless communication I/O interface, then the data packets may be sized according to an MTU of the wireless communication I/O interface. Note that the different communication I/O interfaces each may have different MTUs.

As discussed above, in some implementations, a client computing device may include a shared buffer, such as the shared buffer 66 shown in FIG. 1B. The shared buffer may be a storage machine configured to hold machine-readable data packets either sent via the wired communication I/O interface or sent via the wireless communication I/O interface. In other words, the shared buffer may act as a cue for outgoing data packets sent during the data stage 1306. In some implementations, any particular command may be served over only one transport protocol at a time (e.g., when a command is running over USB, commands on BT/BTLE are blocked). Once a command is sent, then a next command may be processed. In one example, each transport layer may support one blocked command, and the blocked commands of the transport layers may be stored in the shared buffer.

In one example, the shared buffer may have a size corresponding to a largest MTU of an MTU of the wired communication I/O interface and the MTU of the wireless communication I/O interface. In cases where there is a plurality of different wireless and/or wired communication I/O interfaces having different MTUs, the shared buffer may be sized according to the largest MTU of the plurality of different MTUs. Accordingly, the shared buffer may be designed to facilitate operation in the same manner for communication over different communication I/O interfaces.

During the status stage 1408, the client computing device 1402 may send a status code 1414 to the remote computing device. The status code 1414 may indicate whether or not the command was successfully serviced by a command handler. In one example, every command in the command protocol may finish with the status code 1414 being sent to the remote computing device. In some implementations, if the command was not successfully serviced by the client computing device 1402, then the status code 1414 may indicate a type of error that occurred while servicing the command. In one example, if an error is reported in the middle of a data stage over USB, then the error may be indicated by stalling a USB pipe on which the data transfer was taking place. In another example, if an error is reported in the middle of a data stage over BT/BTLE, then the error may be indicated by disconnecting a socket connection on which the data was being transferred. If an error occurs during a last portion of the data stage or directly before the status stage, then the error may be indicated by sending an error status message.

By increasing communication efficiency according to the above described approaches, the local resource restrictions of a client computing device may be hidden.

Figure 15:
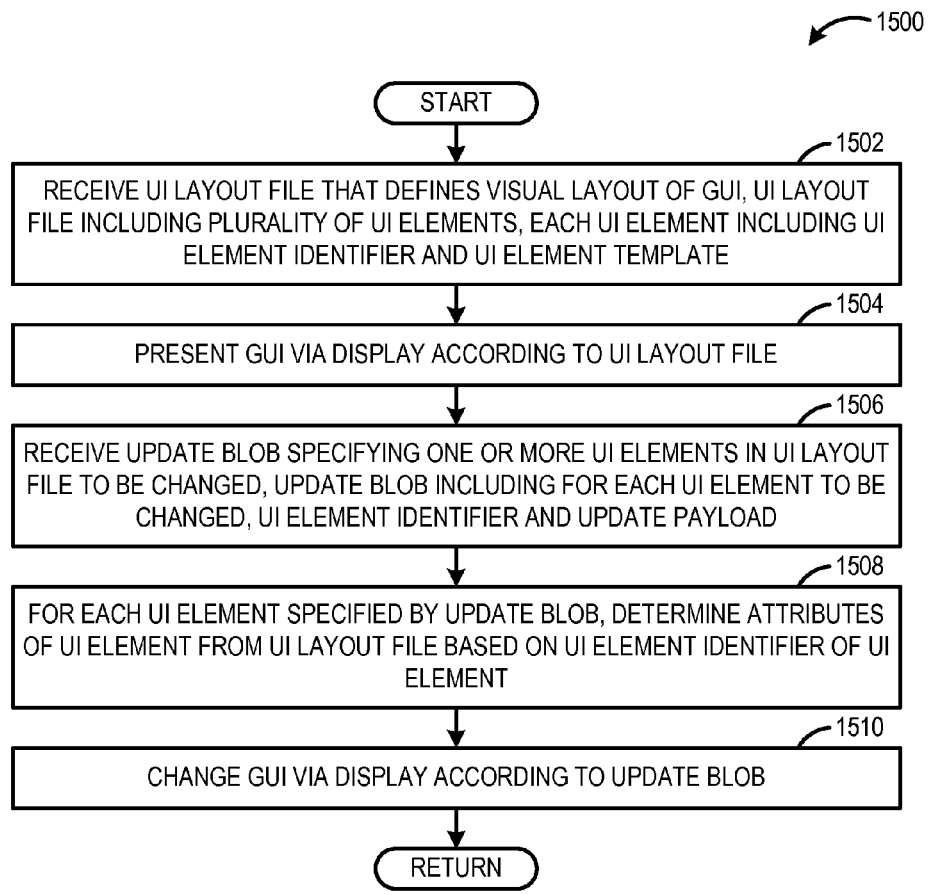
FIG. 15 shows an example method for managing presentation of a GUI displayable by a client computing device.

FIG. 15 shows an example method 1500 for managing presentation of a GUI displayable by a client computing device. For example, the method 1500 may be performed by a client computing device, such as client computing devices A-N shown in FIG. 2.

At 1502, the method 1500 may include receiving a UI layout file that defines a visual layout of a GUI. The UI layout file may include a plurality of UI elements. Each UI element may include a UI element identifier and a UI element descriptor. The UI element identifier may distinguish the UI element from every other UI element in the UI layout file. The UI element descriptor may define attributes of information displayed via the UI element. For example, the attributes may include one or more of an UI element type, a memory size, a position, a color, a number of child UI elements, and/or other suitable attributes.

In some implementations, the UI layout file may have a flattened tree structure in which the plurality of UI elements are ordered in the UI layout file according to parent-child relationships. In some implementations, the UI layout file may include a page header that indicates a version of the UI layout file, a number of immediate children of a root UI element, and a total number of UI elements in the UI layout file. In some implementations, the UI layout file may have a binary machine-readable format.

The UI layout file may be received via a digital communication channel. In some cases, the UI layout file may be received from a service computing device over a wide area network connection. In some cases, the client computing device may not directly communicate with a service computing device via a wide area network connection. Instead, the computing device may be configured to communicate with a host computing device via a first local area network connection. Further, the host computing device may be configured to communicate with the service computing device via a second wide area network connection. The service computing device may be configured to send the UI layout file to the host computing device, and the host computing device may be configured to relay the UI layout file to the client computing device such that the UI layout file may be received from the host computing device. In other words, the UI layout file may be received from the service computing device via a host computing device relay.

At 1504, the method 1500 may include presenting via a display of the client computing device the GUI according to the UI layout file.

At 1506, the method 1500 may include receiving an update BLOB. The update BLOB may specify one or more UI elements in the UI layout file to be changed. The update BLOB may include for each UI element to be changed, the UI element identifier of the UI element and an update payload including updated information to be displayed via the UI element.

In some cases, the update BLOB may be received from the service computing device. In some cases, the update BLOB may be received from the host computing device. In some implementations, the update BLOB may have a binary machine-readable format.

At 1508, the method 1500 may include for each UI element specified by the update BLOB, determining the attributes of the UI element from the UI layout file based on the UI element identifier of the UI element.

At 1510, the method 1500 may include changing via the display the GUI according to the update BLOB.

Figure 16:
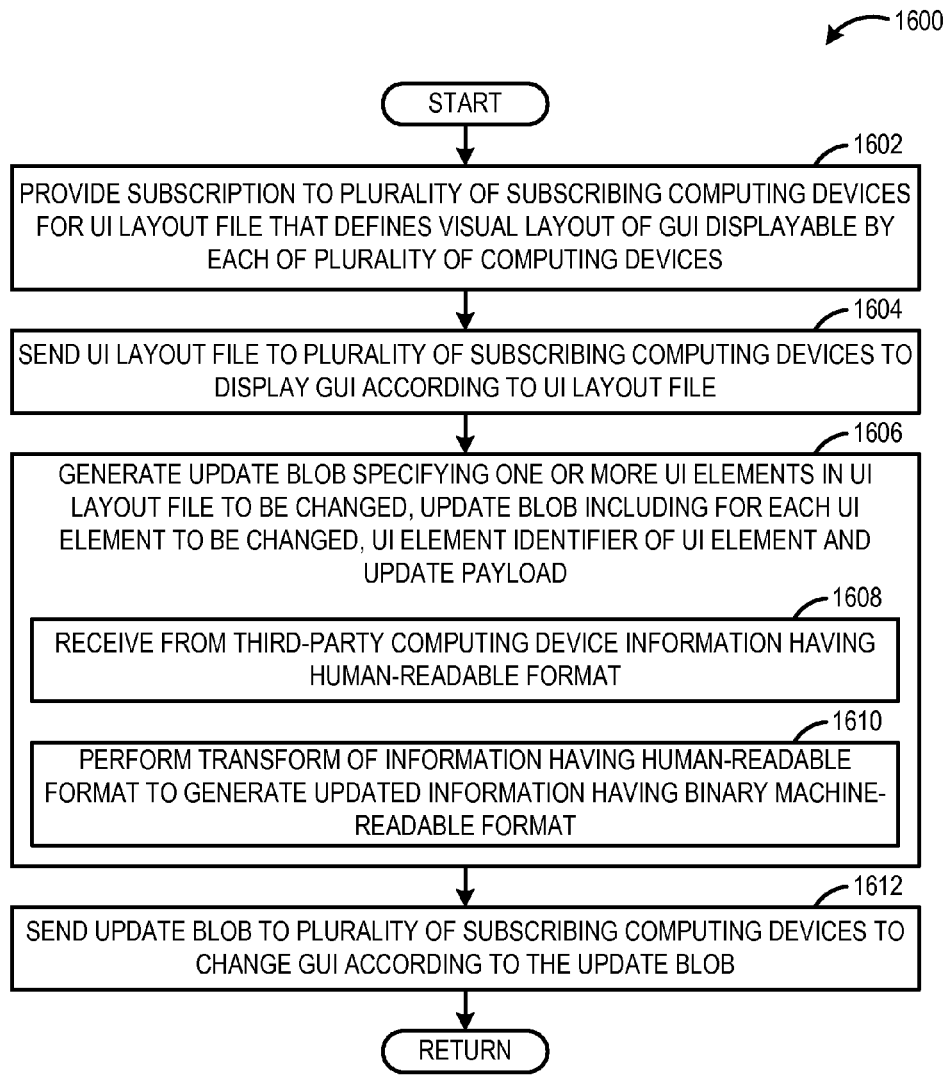
FIG. 16 shows an example method for providing subscription-based data to a plurality of client computing devices to manage presentation of a GUI displayable by the plurality of client computing devices.

FIG. 16 shows an example method 1600 for providing subscription-based data to a plurality of client computing devices to manage presentation of a GUI displayable by the plurality of client computing devices. For example, the method 1600 may be performed by a service computing device or a host computing device, such as service computing device 202 or host computing devices A and B shown in FIG. 2.

At 1602, the method 1600 may include providing a subscription to a plurality of subscribing computing devices for a UI layout file.

The UI layout file may define a visual layout of a GUI displayable by each of the plurality of computing devices. The UI layout file may include a plurality of UI elements. Each UI element may include a UI element identifier and a UI element descriptor. The UI element identifier may distinguish the UI element from every other UI element in the UI layout file. The UI element descriptor may define attributes of information displayed via the UI element. In some implementations, the UI layout file may have a binary machine-readable format.

At 1604, the method 1600 may include sending the UI layout file to the plurality of subscribing computing devices to display the GUI according to the UI layout file.

At 1606, the method 1600 may include generating an update BLOB specifying one or more UI elements in the UI layout file to be changed. The update BLOB may include for each UI element to be changed, the UI element identifier of the UI element and an update payload including updated information to be displayed via the UI element.

In some implementations, the update information included in the updated BLOB may be generated by the service computing device. In other implementations, the updated information may be received from another source. Accordingly, at 1608, the method 1600 optionally may include receiving from a third-party computing device information having a human-readable format.

At 1610, the method 1600 optionally may include performing a transform of the information having the human-readable format to generate the updated information having a binary machine-readable format. The updated information may be included in update BLOB.

At 1612, the method 1600 may include sending the update BLOB to the plurality of subscribing computing devices to change the GUI according to the update BLOB. In some implementations, the update BLOB has a binary machine-readable format. In some cases, the UI layout file and the update BLOB may be sent to a subscribing computing device over a wide area network connection. In other cases, the UI layout file may be sent to a subscribing computing device via a host computing device relay.

Figure 17:
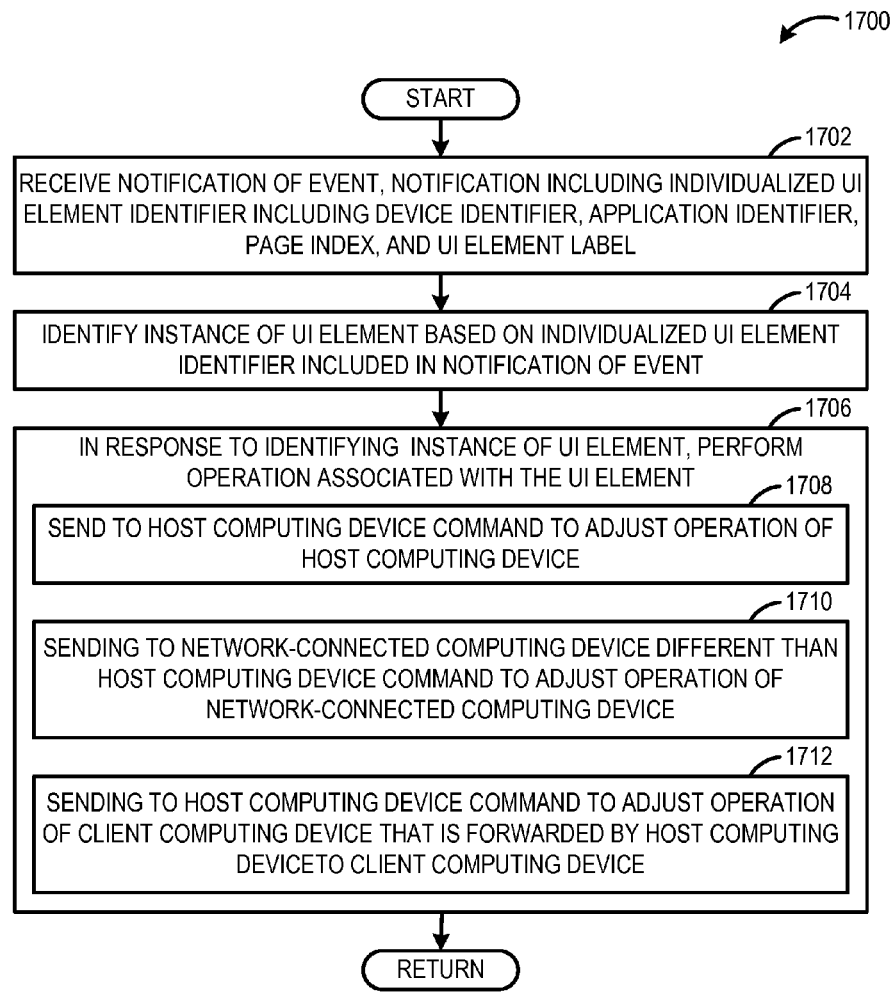
FIG. 17 shows an example method for remotely providing resources to a client computing device responsive to receiving notification of an event.

FIG. 17 shows an example method 1700 for remotely providing resources to a client computing device responsive to receiving notification of an event associated with a UI element of the client computing device. For example, the method 1700 may be performed by a service computing device or a host computing device.

At 1702, the method 1700 may include receiving a notification of an event. The notification may include an individualized UI element identifier that distinguishes an instance of a UI element from every other instance of any UI element. The individualized UI element identifier may include a device identifier, an application identifier, a page index, and a UI element label. The device identifier may distinguish a client computing device from every other computing device. The application identifier may distinguish an application from every other application. The page index may distinguish a page on which the instance of the UI element is located from every other page included in the application. The UI element label may distinguish the UI element from every other UI element included in the page.

Any suitable event may trigger a notification to be sent to the remote computing device. In one example, the event may include an instance of a UI element being selected or otherwise interacted with via user input to the client computing device. In another example, the event may be triggered by another operation of the client computing device. In yet another example, the event may be triggered repeatedly, such as periodically.

At 1704, the method 1700 may include identifying the instance of the UI element based on the individualized UI element identifier included in the notification of the event.

At 1706, the method 1700 may include in response to identifying the instance of the UI element, performing an operation associated with the instance of the UI element. In one example, each individualized UI element identifier may be mapped to one or more operations, and the operation may be identified by performing a look up of a map. The operation may include any suitable type of operation. In one example, at 1708, the method 1700 may include sending to the host computing device a command to adjust operation of the host computing device. In another example, at 1710, the method 1700 may include sending to a network-connected computing device different than the host computing device a command to adjust operation of the network-connected computing device. In yet another example, at 1712, the method 1700 may include sending to the host computing device a command to adjust operation of the client computing device. In this case, the host computing device may be configured to forward the command to the client computing device.

Figure 18:
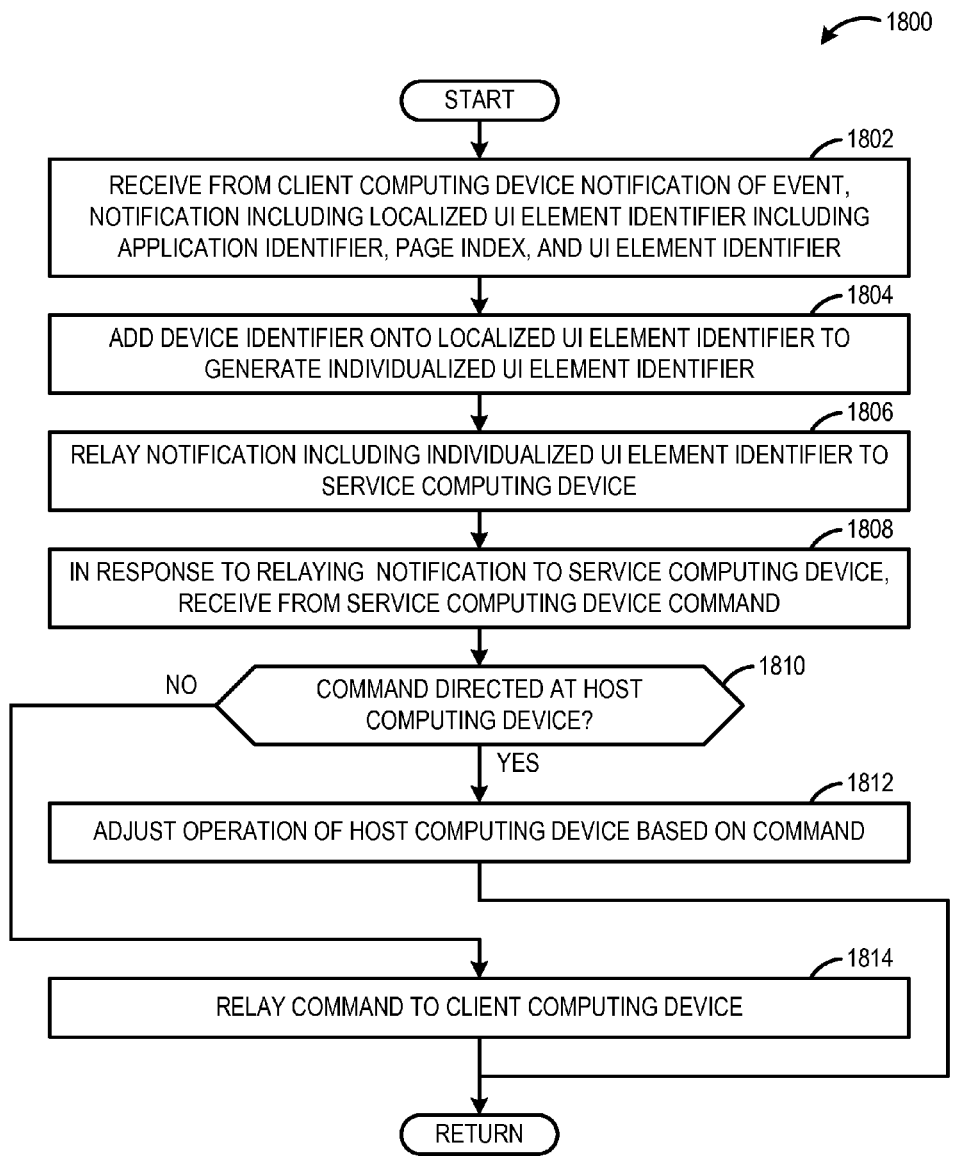
FIG. 18 shows an example method for efficiently relaying a communication between a client computing device and a service computing device.

FIG. 18 shows an example method 1800 for efficiently relaying a communication between a client computing device and a service computing device. For example, the method 1800 may be performed by a host computing device that may be paired with a client computing device, such as the host computing devices A and B shown in FIG. 2.

At 1802, the method 1802 may include receiving a notification of an event from a client computing device. The notification may include a localized UI element identifier that distinguishes an instance of a UI element from every other instance of every UI element displayable in any application of the client computing device. The localized UI element identifier may include an application identifier, a page index, and a UI element label. The application identifier may distinguish an application from every other application. The page index may distinguish a page on which the instance of the UI element is located from every other page included in the application. The UI element label may distinguish the UI element from every other UI element included in the page. The notification of the event may be received via a digital communication channel. The digital communication channel may be wired or wireless. The digital communication channel may take any suitable form of communication channel to transfer machine-readable data.

At 1804, the method 1800 may include adding a device identifier onto the localized UI element identifier to generate an individualized UI element identifier. The device identifier may distinguish the client computing device from every other computing device.

At 1806, the method 1800 may including relaying the notification including the individualized UI element identifier to a service computing device.

Depending on a type of operation associated with the instance of the UI element, the service computing device may send a command to either the host computing device or the client computing device. Accordingly, at 1808, the method 1800 optionally may include in response to relaying the notification to the service computing device, receiving from the service computing device a command to adjust operation of the computing device, the operation being associated with the instance of the UI element. In other cases, the service computing device may send a command to a different network-connected device. In yet other cases, the service computing device may perform an operation without sending a command to another computing device.

At 1810, the method 1800 optionally may include determining whether the command is directed at the host computing device or the command is directed at the client computing device. If the command is directed at the host computing device, the method 1800 may move to 1812. Otherwise, the method 1800 may move to 1814.

At 1812, the method 1800 optionally may include adjusting operation of the computing device according to the command.

At 1814, the method 1800 optionally may include relaying the command to the client computing device.

Figure 19:
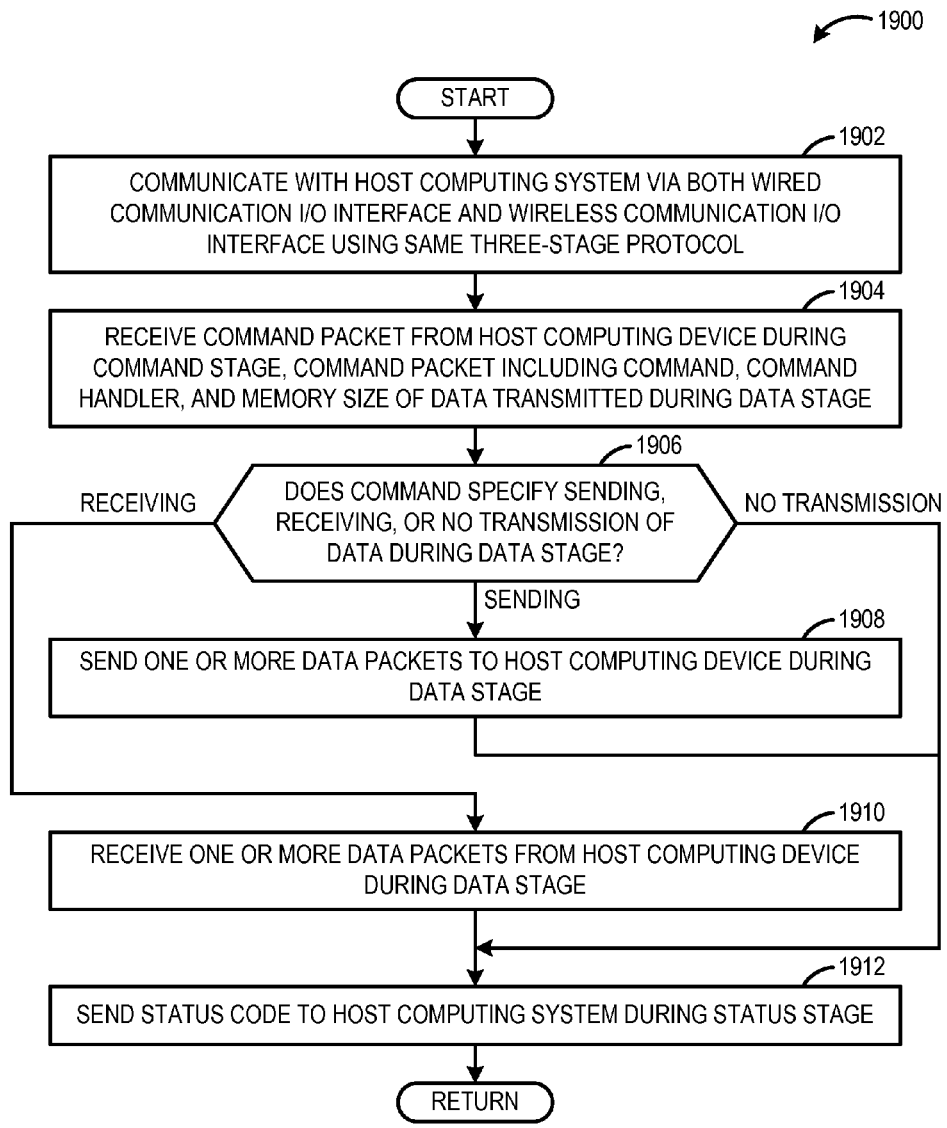
FIG. 19 shows an example method for communicating with a remote computing device over different communication I/O interfaces using the same three-stage protocol.

FIG. 19 shows an example method 1900 for communicating with a remote computing device over different communication I/O interfaces using the same three-stage protocol. For example, the method may be performed by a client computing device, such as the client computing devices A-N shown in FIG. 2.

At 1902, the method 1900 may include communicating with a remote computing device via both a wired communication I/O interface and a wireless communication I/O interface using the same three-stage protocol. The three-stage protocol may include a command stage, a data stage, and a status stage.

At 1904, the method 1900 may include receiving a command packet from the host computing device during the command stage. The command packet may include a command, command arguments, and a memory size. The command may be selected from a library of commands shared by the wired communication I/O interface and the wireless communication I/O interface. The command arguments may be selected from a plurality of command arguments processed by command handlers of the computing device to service the command. The memory size may specify a total memory size of data transmitted during the data stage.

At 1906, the method 1900 may include determining whether the command included in the command packet specifies sending data from the client computing device during the data stage, receiving data at the client device during the data stage, or transmitting no data during the data stage. If the command specifies sending data from the client computing device during the data stage, then the method moves to 1908. Else if the command specifies receiving data at the client computing device during the data stage, the method 1900 moves to 1910. Otherwise, the method 1900 moves to 1912.

At 1908, the method 1900 may include sending one or more data packets to the remote computing device during the data stage.

At 1910, the method 1900 may include receiving one or more data packets from the remote computing device during the data stage.

At 1912, the method 1900 may include sending a status code to the host computing device during the status stage. The status code may indicate whether or not the command was successfully serviced by a command handler. In some implementations, if the command was not successfully serviced by the wearable device, then the status code may indicate a type of error that occurred while servicing the command.

In some implementations, a first command packet may be received via the wired I/O interface. As such, first one or more data packets may be sent or received as specified by the command from the first command packet. Since the first command packet was received via the wired I/O interface, the first one or more data packets may also be sent or received via the wired I/O interface. Further, a second command packet may be received via the wireless I/O interface. As such, second one or more data packets may be sent or received as specified by the command from the second command packet. Since the second command packet was received via the wireless I/O interface, the second one or more data packets may also be sent or received via the wireless I/O interface.

Some computing devices may implement a publisher/subscriber-based approach in which a subscriber module subscribes to a publisher module or other data source. In such an approach, when the data source publishes data, the data source notifies the subscriber module (and every other module subscribing to the data source) of the published data.

A limitation of this approach is that a publishing data source is relied upon to actively notify a subscriber module when data is published. When running within the confines of a single computing device, such a limitation is not a concern. However, if a data source is located on a different computing device than a subscriber module, then notification issues can arise. For example, in some cases, bandwidth restrictions may delay published data or other information from being sent/received in a timely manner. As another example, duplicate requests for the same published data by different subscribing modules may cause the same information to be transmitted between devices repeatedly, which consumes power. In still another example, a data source may be located on a client computing device and a subscribing module may be located on a host computing device that mediates communication with the client computing device. In other words, the host computing device may initiate all communication between the client computing device and the host computing device. For example, the client computing device may only send data to the host computing device responsive to receiving a request from the host computing device. In such an example, the client computing device may have no mechanism by which to inform subscribers on the host computing device that new data is available.

Accordingly, in some implementations, an approach may be implemented that completely hides from subscribers that a data source is located on a remote computing device. Moreover such an approach may enable a "push" communication model for communication protocols that do not independently enable push communication, such as a host-mediated communication implementation.

Figure 20:
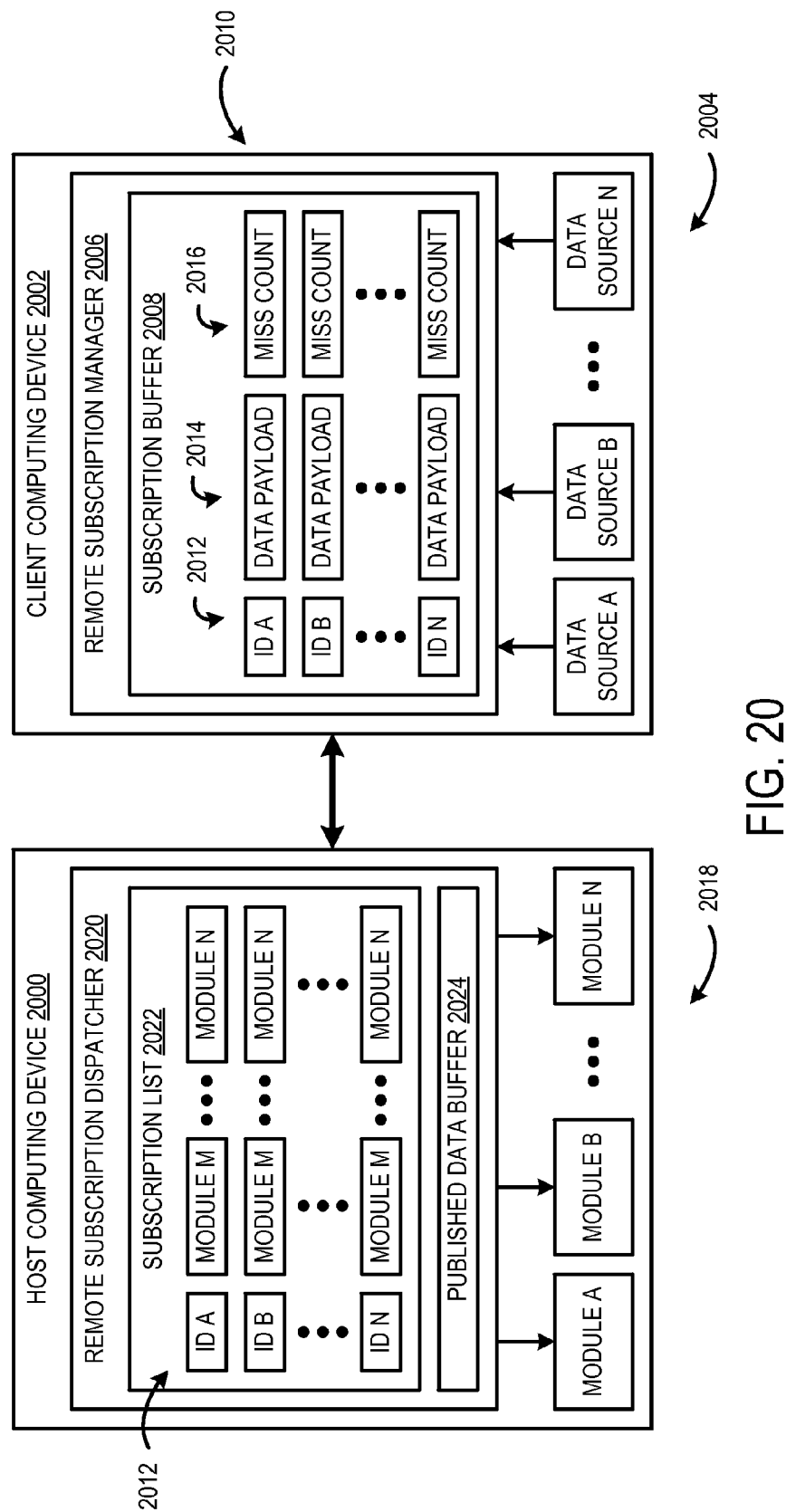
FIG. 20 shows an example host computing device in communication with a client computing device.

FIG. 20 shows an example host computing device 2000 in communication with a client computing device 2002. The host computing device 2000 and the client computing device 2002 may take any suitable form. In one particular example, the host computing device 2000 is a smartphone and the client computing device 2002 is a wearable computing device.

The client computing device 2002 includes a plurality of data sources 2004. Each of the plurality of data sources 2004 may be configured to publish data. A data source may publish any suitable type of data in any suitable manner at any suitable rate. In some cases, a data source may publish data within a designated period and/or according to a designated schedule. In some cases, a data source may publish data responsive to a trigger or condition.

In one example, a data source may include a sensor that measures a physical parameter. In one particular example where the client computing device 2002 is a wearable computing device, a data source may include a sensor that measures a physical parameter of a wearer of the wearable computing device. In another example, a data source may include a module that outputs data derived from input data received from another intermediate module or a sensor. The client computing device 2002 may include any suitable number and/or type of data sources.

The client computing device 2002 may include a remote subscription manager 2006 configured to manage data published by the plurality of data sources 2004, as well as configured to manage subscriptions to the published data provided by the plurality of data sources 2004. For example, the remote subscription manager 2006 may be configured to establish a subscription to each of the plurality of data sources 2004. Accordingly, when a data source of the plurality of data sources 2004 publishes data, the remote subscription manager 2006 may receive that data through the subscription to the data source.

The remote subscription manager 2006 may include a subscription buffer 2008 configured to store published data provided by the plurality of data sources 2004. The subscription buffer 2008 may be a physical storage machine configured to store published data (e.g., data packets) in preparation for distribution to modules that subscribe to the published data. The subscription buffer 2008 may include a plurality of data slots 2010 to store published data. In the depicted example, the subscription buffer 2008 includes a data slot corresponding to each subscription. Such a configuration may allow for only a most recent version of published data provided by a data source to be stored in the subscription buffer. Such an implementation may be suitable for client computing devices having limited storage resources. In another example, the subscription buffer 2008 may include a plurality of data slots corresponding to each subscription in order to store a plurality of versions of published data provided by a data source.

In some implementations, each data source may be identified by an individualized data source identifier 2012. In the depicted example, the plurality of data slots 2010 of the subscription buffer 2008 may be organized according to the data source identifiers of the data sources to which a subscription has been established. In other words, the data source identifier may be used to address a corresponding data slot in the subscription buffer 2008. A data payload 2014 of published data may be stored in each of the plurality of data slots 2010.

In some implementations, communication between the client computing device 2002 and the host computing device 2000 may be mediated by the host computing device 2000. In other words, the client computing device 2002 can only send published data to the host computing device 2000 responsive to receiving a request from the host computing device 2000. In such implementations, there may be occasions where a data source publishes multiple versions of data in between receiving requests from the host computing device 2000. Accordingly, in some such implementations, a missed sample count 2016 corresponding to each data source may be stored in the subscription buffer 2008. The missed sample count 2016 may indicate a number of times the data source has published data since a last read request was received from the host computing device 2000. For example, if new data is published from a data source before the host device has requested a data read, then the missed sample count 2016 may be incremented for each data source that has unread data that has not been previously sent to the host computing device 2000. The missed sample count 2016 may be sent to the host computing device 2000 and may be used by the host computing device 2000 to adjust a frequency at which requests for published data are sent to the client computing device 2002.

The host computing device 2000 includes a plurality of modules 2018 that subscribe to published data and/or a data source that provides the published data. A module may subscribe to any suitable type of published data and/or any suitable type of data source, including data sources located on the host computing device 2000 and/or data sources located on the client computing device 2002. A module may have a plurality of subscriptions to different types of published data provided by different data sources. Multiple modules may subscribe to the same type of published data and/or the same data source.

The host computing device 2000 may include a remote subscription dispatcher 2020 configured to manage subscriptions and distribute published data locally to the plurality of modules 2018 of the host computing device 2000.

In some cases, the remote subscription dispatcher 2020 may act as a local data publisher that is a proxy for data sources of the client computing device 2002 that provide published data.

The remote subscription dispatcher 2020 includes a subscription list 2022 of modules that subscribe to published data and/or data sources that provide the published data. The remote subscription dispatcher 2020 may refer to the subscription list 2022 when published data is received from the remote subscription manager 2006 in order to distribute the published data to the appropriate modules of the host computing device 2000 that subscribe to receive the published data. In one example, the subscription list 2022 may be organized according to data source identifiers 2012 of data sources to which subscriptions have been established. For example, when the remote subscription dispatcher 2020 receives a request from a module to subscribe to a data source, the remote subscription dispatcher 2020 may check the subscription list 2022 to see if a subscription has been established for that data source. If no previous subscription has been established, then the remote subscription dispatcher 2020 adds a new entry for the data source into the subscription list 2022. Otherwise, if a subscription has been previously established for the data source, then the remote subscription dispatcher 2020 adds the module to a list of modules that subscribe to receive published data provided by the data source.

The subscription list 2022 may be organized in this manner in order to prevent redundant requests for the same published data to be sent from the host computing device 2000 to the client computing device 2002. Accordingly, data transmitted between the host computing device 2000 and the client computing device 2002 may be reduced. In another example, each subscription request received from a module may be forwarded by the remote subscription dispatcher 2020 to the remote subscription manager 2006 of the client computing device 2002.

In some implementations, a module may send a subscription request that includes a data source identifier 2012 to the remote subscription dispatcher 2020. In other implementations, a module may send a subscription request that does not include a data source identifier 2012 to the remote subscription dispatcher 2020. For example, the request may merely identify a type of data that the module desires to receive. In such implementations, the remote subscription dispatcher 2020 may add the data source identifier 2012 to the subscription request via a proxy function. Using such a proxy function provides transparency to the modules that allows the subscription requests to be made in the same manner regardless of whether a data source is located locally on the host computing device 2000 or remotely on the client computing device 2002.

Furthermore, the remote subscription dispatcher 2020 may be configured to manage communication with the remote subscription manager 2006 of the client computing device 2002. In particular, the remote subscription dispatcher 2020 may be configured to periodically send a read request to the client computing device 2002. Any suitable periodic interval may be employed. In one example, the read request is for all remote published data stored in the subscription buffer 2008. In this case, the read request may be a single command which has no awareness itself of what data is to be read. In another example, the read request may target published data from specific data sources, and the read request may include specific data source identifiers that correspond to published data that the remote subscription dispatcher desires to receive.

In response to receiving a read request from the remote subscription dispatcher 2020, the remote subscription manager 2006 may be configured to send all published data stored in the subscription buffer 2008 to the remote subscription dispatcher 2020. The published data may be grouped for transmission in any suitable manner. In one example, the remote subscription manager 2006 may send a plurality of data packets of published data. Each data packet corresponding to a data source may include a data payload of published data 2014 that is wrapped in a header that indicates the data source identifier 2012 of the data source that provided the published data. Further, each data packet optionally may include the missed sample count 2016. For example, the missed sample count 2016 may be omitted in implementations where communication is not host-mediated.

The client computing device 2002 may send the published data to the host computing device 2000 in any suitable manner. For example, the plurality of data packets may be sent over a wired communication I/O interface and/or a wireless communication I/O interface. The same communication protocol may be used for both wired and wireless communication. In one example, the communication protocol may include a host-mediated transport layer protocol in which only the host computing device 2000 initiates communication between the client computing device 20002 and the host computing device 2000.

In response to receiving the plurality of data packets from the remote subscription manager 2006, the remote subscription dispatcher 2020 may store the published data in a published data buffer 2024. The published data buffer 2024 may be a physical storage machine configured to store published data for distribution to subscribing modules of the host computing device 2000. Further, the remote subscription dispatcher 2020 may be configured to identify a data source identifier in each data packet received from the remote subscription manager 2006. The data source identifier may identify a data source that provided the published data included in the data packet. For example, the data source identifier may be located in a header of the data packet. Further, the remote subscription dispatcher 2020 may be configured to lookup, in the subscription list 2022, modules that subscribe to receive published data from the data source corresponding to the identified data source identifier, and distribute the data packet to those modules.

In some implementations, the remote subscription dispatcher 2020 may be configured to remove the data source identifier 2012 and the missed sample count 2016 from a data packet before sending the data packet to a subscribing module. In other words, the remote subscription dispatcher 2020 may be configured to send just the data payload 2014 of published data to the subscribing module. In such implementations, data packets received through remote subscriptions may appear the same as data packets provided through local subscriptions from a point of view of the subscribing module.

Due to the nature of sending read requests periodically (also referred to as polling for published data), if the polling interval is too low, published data samples will be missed (as indicated by the missed samples count). Accordingly, intelligent schemes for determining a sampling rate or adjusting the periodic interval may be employed to increase a likelihood of receiving all published data. In one example, a read request frequency may be set at twice a frequency of a data source that publishes data most frequently. As subscriptions are activated on the client computing device 2002 that each publish at differing periodic rates, the remote subscription dispatcher 2020 may be configured to dynamically adjust a rate at which the remote subscription dispatcher 2020 sends a read request. For example, the rate may be dynamically adjusted to comply with a most frequently publishing data source. As such, the remote subscription dispatcher 2020 may not send a read request any more than necessary, which can save on bandwidth, processing, and/or power resources.

In some implementations, the sampling rate may be dynamically changed based on the missed sample count of a data source. For example, if the missed sample count of a data source is less than a threshold value, then the sampling rate may be sufficient to catch enough of the data being published. As such, the sampling rate may be dynamically lowered until the missed sample count reaches the threshold value in order to reduce an amount of data transmitted between the host computing device 2000 and the client computing device 2002. On the other hand, if the missed sample count of the data source is greater than the threshold value, then the sampling rate may be dynamically increased until the missed sample count is less than the threshold value in order to catch a suitable amount of data being published by the data source.

Figure 21:
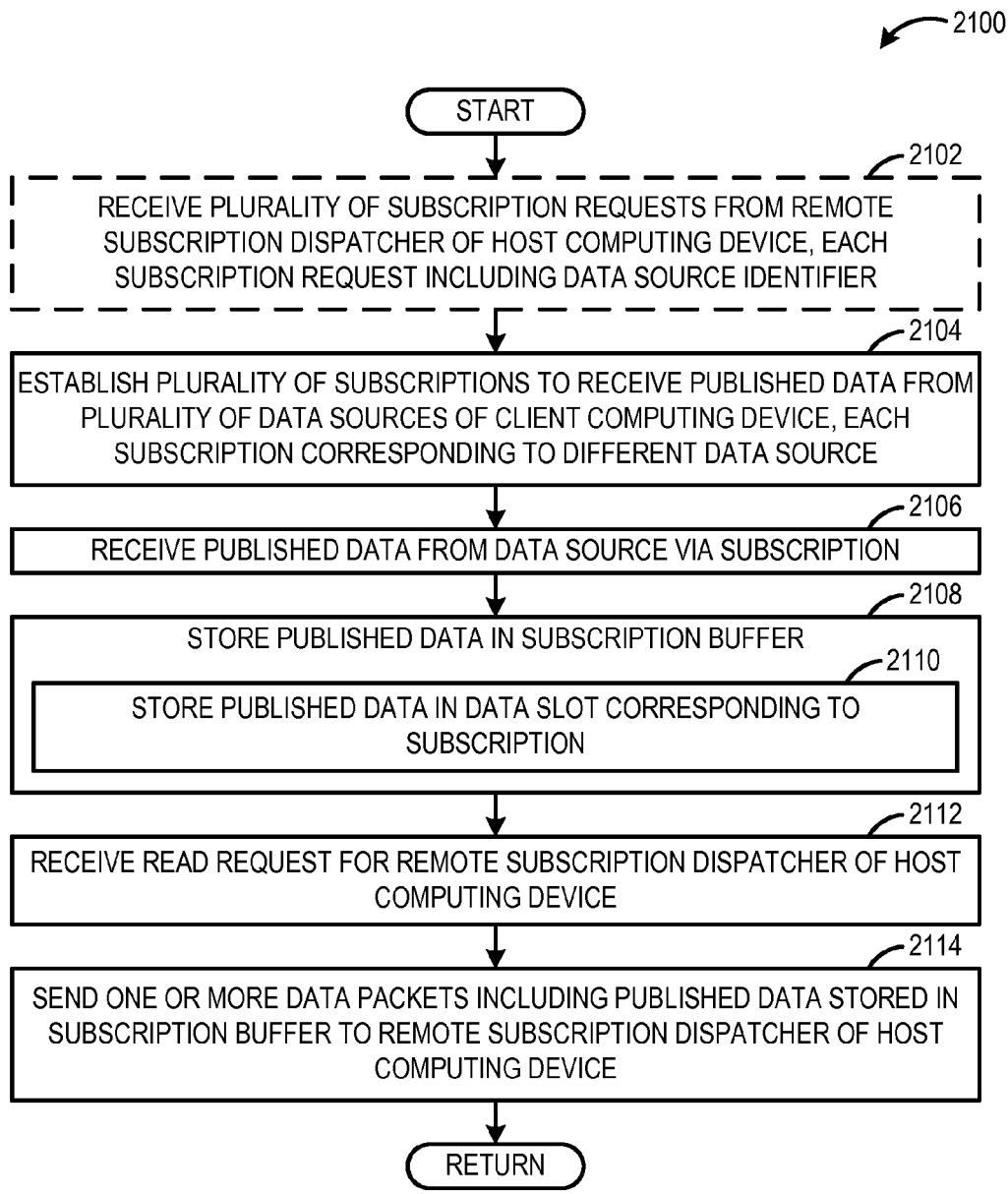
FIG. 21 shows an example method for providing published data produced by data sources of a client computing device to a host computing device in accordance with subscriptions.

FIG. 21 shows an example method 2100 for providing published data produced by data sources of a client computing device to a host computing device in accordance with a plurality of subscriptions. For example, the method 2100 may be performed by a remote subscription manager, such as the remote subscription manager 2006 of the client computing device 2002 shown in FIG. 20. In one particular example, the remote subscription manager 2006 is located on a wearable computing device including data sources that publish data that is subscribed to by modules located on a smartphone. The remote subscription manager 2006 communicates with the remote subscription dispatcher 2020 of the smartphone to simulate a push communication protocol that allows data published by the data sources of the wearable computing device to be received by subscribing modules of the smartphone. In another example, the method 2100 may be performed by the wearable computing device 10 shown in FIGS. 1A and 1B, one of the plurality of client computing devices 204 shown in FIG. 2, the client computing device 300 shown in FIG. 3, the client computing device 1402 shown in FIGS. 13 and 14, or the computing system 2900 shown in FIG. 29. In any case, the computing device that performs the method 2100 may act as a client computing device.

At 2102, the method 2100 optionally may include receiving, from a remote subscription dispatcher of a host computing device, a plurality of subscription requests. Each subscription request may include a data source identifier that identifies a data source of the client computing device.

At 2104, the method 2100 may include establishing a plurality of subscriptions to receive data published by a plurality of data sources of the client computing device. Each subscription may correspond to a different data source.

In some implementations, the plurality of subscriptions may be established responsive to receiving the plurality of subscription requests from the remote subscription dispatcher of a host computing device. In other implementations, the plurality of subscriptions may be established responsive to receiving a plurality of subscription requests from another source, such as a remote service computing system. In some cases, such requests may be relayed by the host computing device 2000. In some implementations, the client computing device may establish the plurality of subscriptions without receiving any subscription requests.

Further, in some implementations where the client computing device comprises a wired communication I/O interface configured to communicate with the host computing device and a wireless communication I/O interface configured to communicate with the host computing device, the method may include communicating with the host computing device via both the wired communication I/O interface and the wireless communication I/O interface. In one example, communicating may include using a host-mediated transport layer protocol in which only the remote computing device initiates communication between the client computing device and the host computing device. In other words, because the host computing device initiates all communication between the host computing device and the client computing device, the plurality of subscriptions may be established to increase a likelihood that published data is available to be sent to the host computing device, when the host computing device initiates communication with the client computing device.

At 2106, the method 2100 may include receiving published data from a data source of the client computing device via a subscription.

At 2108, the method 2100 may include storing the published data in a subscription buffer. For example, the subscription buffer may be a storage machine configured to store published data provided by data sources of the client computing device. In some implementations, any time a data source to which a subscription has been established publishes data, that published data may be stored in the subscription buffer.

In some implementations, the subscription buffer may include a data slot corresponding to each subscription that has been established. The data slot may be configured to store only one instance of published data provided by a data source. As such, if a data source provides a new instance of published data, then the new instance may replace the older instance of the published data in the data slot. The subscription buffer may be configured in such a manner in order to limit storage resources dedicated to storing published data. Such a configuration may be desirable in an implementation of the client computing device that has limited storage resources, such as a wearable computing device. In such implementations, at 2110, the method 2100 may include, in response to receiving published data from a data source via a subscription, storing the published data in the data slot corresponding to the subscription. In other implementations, the subscription buffer may include a plurality of data slots corresponding to each subscription, and a plurality of instances of published data provided by a data source may be stored in the plurality of data slots.

At 2112, the method 2100 may include receiving, from the remote subscription dispatcher of the host computing device, a read request. In some implementations, the read request may be a request for all published data stored as a result of subscriptions by the remote subscription manager. In some implementations, the read request may be a single command that has no awareness itself of what data is to be read. Such a configuration may reduce an amount of data transmitted between the host computing device and the client computing device, which may be desirable in implementations where a communication link between the host computing device and the client computing device has limited transmission bandwidth. In some implementations, the read request may be received from the host computing device on a periodic interval. In some implementations, the read request may be a targeted read request that includes a data source identifier of a data source, and the targeted read request may be a request for published data provided by the data source.

At 2114, the method 2100 may include, in response to receiving the read request from the remote subscription dispatcher of the host computing device, sending to the host computing device one or more data packets including published data stored in the subscription buffer. In some implementations, published data provided by all data sources to which a subscription has been established is sent in response to receiving the read request. In one example, only a most recently published version of published data provided by each data source is sent to the host computing device. In another example, all versions of published data provided by each data source that are stored in the subscription buffer are sent to the host computing device. For example, the data packets may include published data stored in the data slots corresponding to the plurality of subscriptions. In other implementations, only published data stored in the subscription buffer and provided from a data source identified in the read request may be sent to the host computing device.

In some implementations, each data packet may include a data source identifier that identifies a data source that provided the published data included in the data packet. In some implementations, each data packet may include a missed sample count indicating a number of times a data source has published data since a last read request was received from the remote subscription dispatcher of the host computing device.

Figure 22:
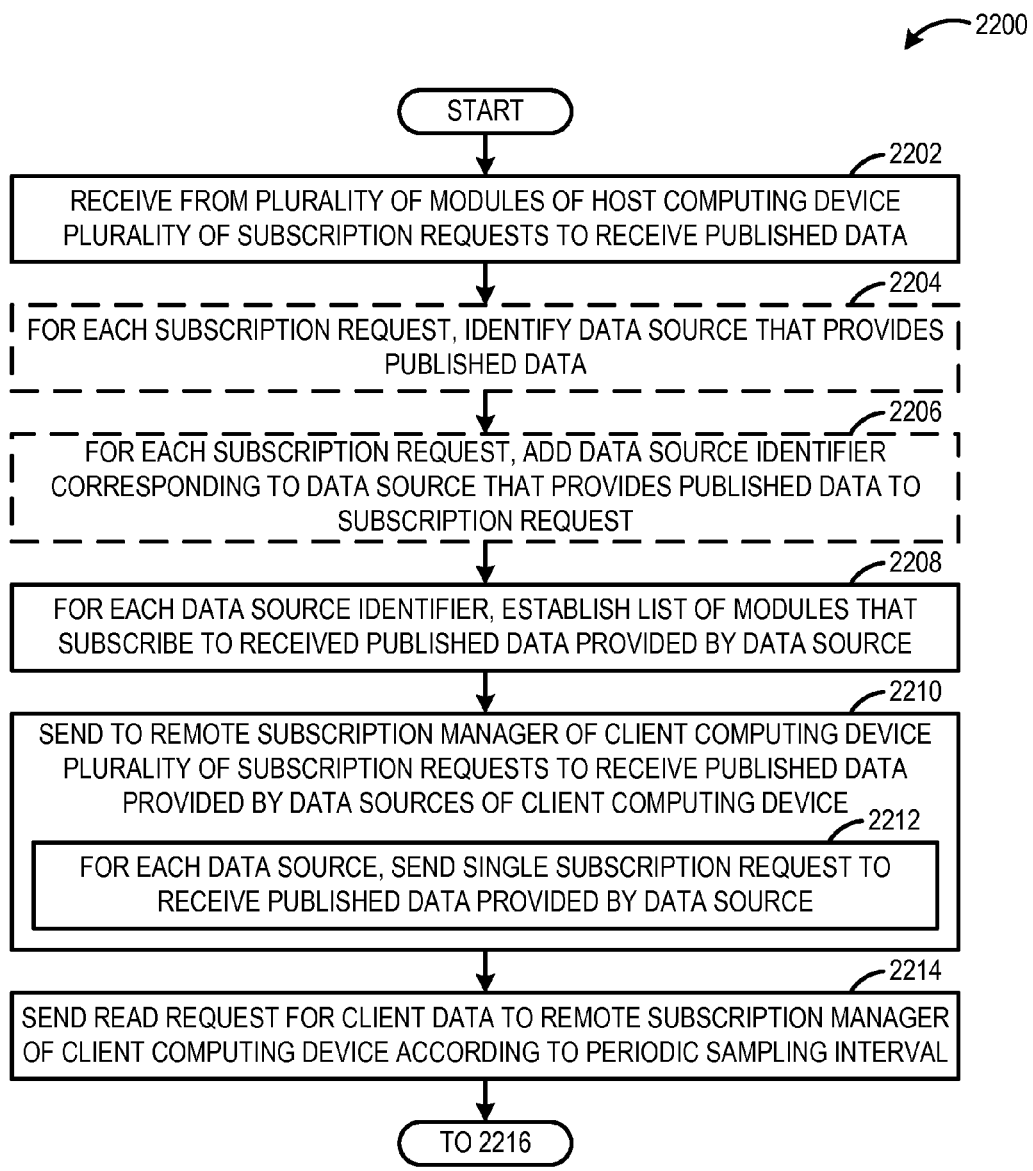
FIGS. 22 and 23 show an example method for distributing published data provided by data sources of a client computing device to modules of a host computing device in accordance with subscriptions.
Figure 23:
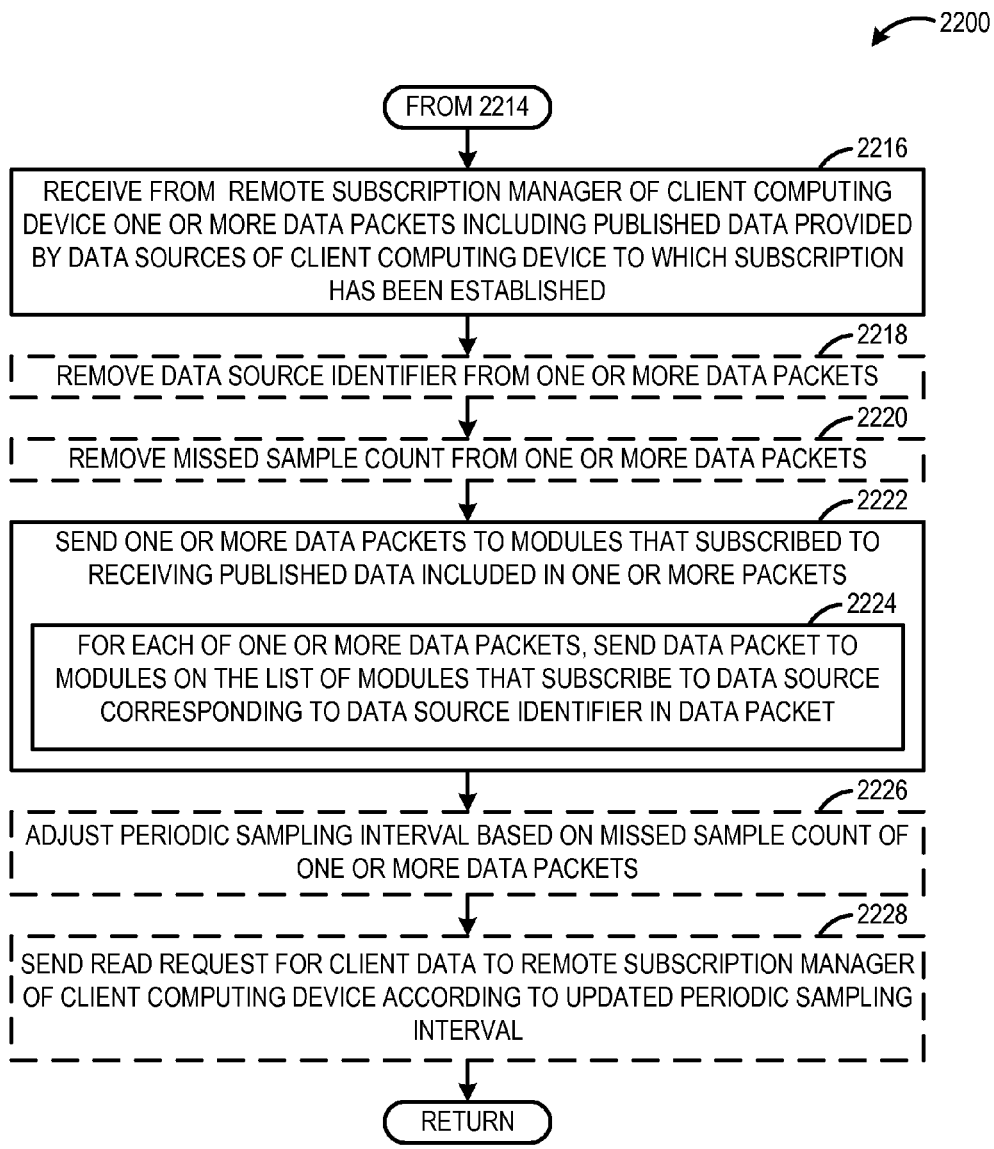

FIGS. 22 and 23 show an example method 2200 for distributing published data provided by data sources of a client computing device to modules of a host computing device in accordance with subscriptions. For example, the method 2100 may be performed by a remote subscription dispatcher, such as the remote subscription dispatcher 2020 of the host computing device 2000 shown in FIG. 20. In one particular example, the remote subscription dispatcher 2020 is located on a smartphone with modules that subscribe to data sources located on a wearable computing device. The remote subscription dispatcher 2020 communicates with the remote subscription manager 2006 of the wearable computing device to simulate a push communication protocol that allows data published by the data sources of the wearable computing device to be received by subscribing modules of the smartphone. In another example, the method 2200 may be performed by HOST COMPUTING DEVICE A shown in FIG. 2, remote computing device 1400 shown in FIGS. 13 and 14, or the computing system 2900 shown in FIG. 29. In any case, the computing device that performs the method 2100 acts as a host computing device.

At 2202, the method 2200 may include receiving, from a plurality of modules of the host computing device, a plurality of subscription requests to receive published data. In some cases, two or more of the plurality of modules may request subscriptions to receive the same published data from the same data source.

In some implementations, the requests to receive published data may include a data source identifier that explicitly identifies a data source that provides the published data. In other words, the modules may pass the data source identifier to the remote subscription dispatcher.

In other implementations, the requests to receive published data may not identify a particular data source to provide the published data. In such implementations, at 2204, the method 2200 optionally may include, for each subscription request received from the plurality of modules, identifying a data source of the client computing device that provides the published data indicated by the subscription request. Further, at 2206 the method 2200 optionally may include for each subscription request, adding a data source identifier that identifies the data source to the subscription request. In such implementations, the remote subscription dispatcher may provide proxy functionality for the module to allow the requested subscriptions to be satisfied.

At 2208, the method 2200 may include establishing, for each data source identifier, a list of modules that subscribe to receive published data provided by a corresponding data source based on the plurality of subscription requests. The various lists may be used to distribute published data provided by each data source to the appropriate subscribing modules.

At 2210, the method 2200 may include sending, to the remote subscription manager of the client computing device, a plurality of subscription requests to receive published data from data sources of the client computing device. Each subscription request may correspond to a different data source.

In some implementations, the remote subscription dispatcher may compare the received subscription requests to identify redundant requests for the same data received from different modules. Accordingly, at 2212, the method 2200 optionally may include sending, to the remote subscription manager of the client computing device, for each data source, a single subscription request to receive published data provided by the data source.

At 2214, the method 2200 may include sending, to the remote subscription manager of the client computing device, a read request for data published by data sources of the client computing device to which the plurality of subscriptions were requested. In some implementations, the read request may be a request for all published data stored as a result of subscriptions by the remote subscription manager. In some implementations, the read request may be a single command that has no awareness itself of what data is to be read. In other implementations, the read request may be a targeted read request that includes a data source identifier of a data source, and the targeted read request may be a request for published data provided by the data source.

In some implementations, the read request may be periodically sent to the remote subscription manager of the client computing device. Any suitable periodic interval may be employed. In some implementations, the periodic interval may be predetermined. In other implementations, the periodic interval may be dynamically adjusted.

At 2216, the method 2200 may include receiving, from the remote subscription manager of the client computing device, one or more data packets including data published by data sources of the client computing device in accordance with the plurality of subscription requests. In some implementations, the one or more data packets may include published data from each data source to which a subscription has been established. In one example, the published data may be a most recent instance of the published data provided by a data source. In another example, the published data may be all instances of published data provided by a data source. In some implementations, the one or more packets may include any published data stored in the subscription buffer of the client computing device.

In some implementations, each of the one or more data packets may include a data source identifier identifying a data source that provided the published data included in the data packet. In such implementations, at 2218, the method 2200 optionally may include, for each of the one or more data packets, removing the data source identifier from the data packet prior to sending the data packet to the modules.

In some implementations, each of the one or more data packets may include a missed sample count indicating a number of times the data source has published data since a last read request was received by the client computing device. In such implementations, at 2220, the method 2200 optionally may include, for each of the one or more data packets, removing the missed sample count from the data packet prior to sending the data packet to the modules.

At 2222, the method 2200 may include sending the one or more data packets to modules that subscribe to receiving the published data included in the one or more packets.

In some implementations, at 2224, the method 2200 may include, for each of the one or more data packets, sending the data packet to the modules on the subscription list of modules that subscribe to the data source corresponding to the data source identifier in the data packet. As such, at least one data packet may be sent to two or more modules that requested subscriptions to the same published data.

At 2226, the method 2200 optionally may include adjusting the periodic interval at which the read request is sent, to the remote subscription manager of the client computing device, to an updated periodic interval based on the missed sample count of the one or more data packets. For example, if the missed sample count is less than a threshold value, then the periodic interval may be increased. In another example, if the missed sample count is greater than the threshold value, then the periodic interval may be decreased.

At 2228, the method 2200 optionally may include periodically sending, to the remote subscription manager of the client computing device, a read request according to the updated periodic interval.

The above described methods may be performed to allow data published by data sources of a client computing device to be stored and sent to a host computing device in a storage resource efficient and transmission bandwidth efficient manner. The methods may be particularly useful in implementations in which the host computing device initiates all communication between the host computing device and the client computing device, because the data sources of the client computing device may have no other mechanism by which to inform the modules of the host computing device when new data becomes available.

In implementations where a publisher/subscriber-based approach is implemented on a computing device, different types of subscriptions may be employed by different data sources (e.g., a hardware component, such as a sensor or an intermediate module). In one example, a module may have an active type of subscription that specifies activation of the data source to provide the published data to the module to satisfy the subscription. For example, in the case of a wearable computing device, a module may actively subscribe to a biometric sensor that measures a physical parameter of a wearer of the wearable computing device, and the biometric sensor may turn on and/or enable output of the physical parameter responsive to activation of the subscription to provide the published data to the module.

In another example, a module may have a passive type of subscription that specifies that a data source provide published data to the module only if the data source is already activated to satisfy a function other than the passive subscription. The data source may be activated to satisfy any suitable function. For example, the data source may be activated to satisfy an active subscription for a different module. In another example, the data source may be activated responsive to a mode, event, trigger, condition, or other state of operation of the computing device.

By employing these different types of subscriptions, various data sources may be powered on and/or enabled only as much as necessary to provide published data to subscribing modules or to satisfy other functions. In other words, such data sources may be powered off and/or disabled when not needed. Accordingly, power consumption of the data sources may be intelligently reduced. Such an approach may be particularly applicable to implementations of a computing device in which power resources are restricted, such as in the case of a wearable computing device powered by a battery.

Figure 24:
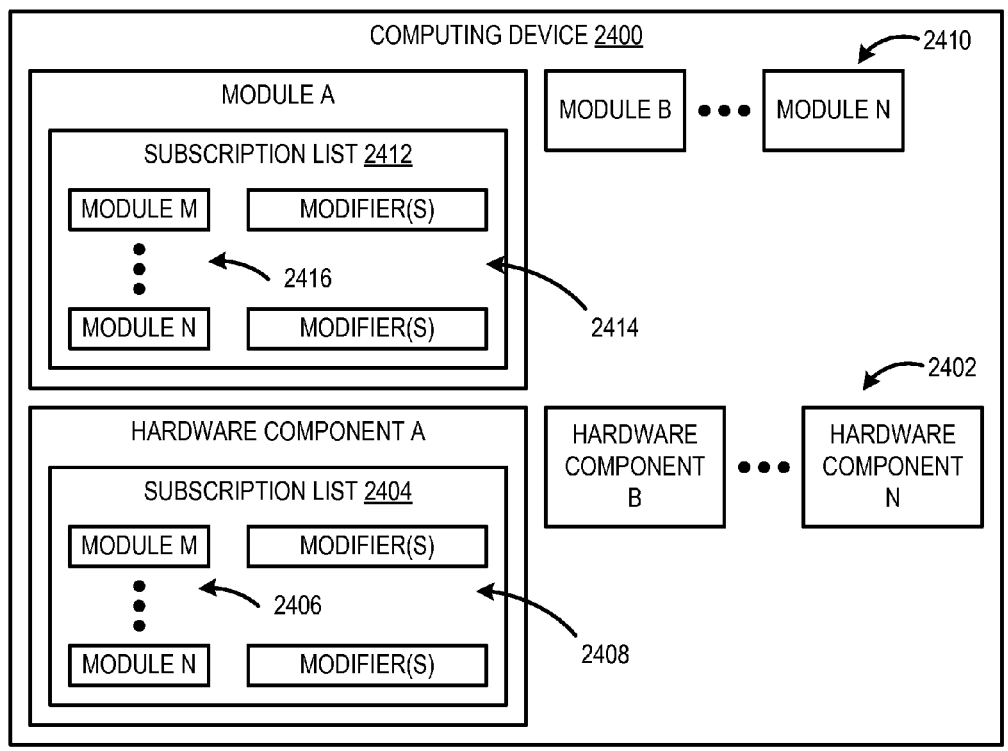
FIG. 24 shows an example computing device including a plurality of modules having different subscriptions to published data provided by data sources of the computing device.

FIG. 24 shows an example computing device 2400 that may employ a publisher/subscriber approach including different types of subscriptions and subscription hierarchies. In some implementations, the computing device 2400 may be a wearable computing device. In some implementations, the computing device 2400 may be a client computing device, such as the client computing device 2002 shown in FIG. 20 that communicates with a host computing device, such as the host computing device 2000 shown in FIG. 20.

The computing device 2400 includes a plurality of hardware components 2402 configured to publish data. For example, one or more of the plurality of hardware components 2402 may include a sensor that measures a physical parameter. In one particular example where the computing device 2400 is a wearable computing device, one or more of the plurality of hardware components 2402 includes a biometric sensor configured to measure a physical parameter of a wearer of the wearable computing device. For example, a biometric sensor may include one or more of a galvanic-skin-resistance sensor, a pulse-rate sensor, a skin-temperature sensor, an accelerometer, a magnetometer, a gyroscope, and a global-positioning sensor. The computing device 2400 may include any suitable number and/or type of hardware components configured to publish any suitable type of data.

In some implementations, each hardware component may maintain a subscription list 2404 of current subscriptions for the hardware component. Each entry in the subscription list 2404 may include a subscribing module 2406 having a subscription to the hardware component. Further, each entry optionally may include modifier(s) 2408 that define constraints of the subscription.

The computing device 2400 may include a plurality of modules 2410. Each module may be configured to perform processing on published data provided by one or more hardware components, publish data itself, and/or serve another purpose. Some of the plurality of modules 2410 may have subscriptions to receive published data from the plurality of hardware components 2402. Moreover, some of the plurality of modules 2410 may act as data sources and publish data provided to other subscribing modules. Moreover, some of the plurality of modules 2410 may act as intermediate modules that receive published data (e.g., a first parameter) from a hardware component or other module, perform processing on the published data, and subsequently output different published data (e.g., a second parameter) that is derived from the published data received from the hardware component or other module. In one particular example, some of the plurality of modules 2410 may be activity modules that provide information or parameters related to a particular activity of a wearer of a wearable computing device.

In some implementations, each module may maintain a subscription list 2412 of current subscriptions for the module. Each entry in the subscription list 2412 may include a subscribing module 2414 having a subscription to the module. Further, each entry optionally may include modifier(s) 2416 that define constraints of the subscription.

In other implementations, a subscription manager, such as the remote subscription manager 2006 shown in FIG. 20, may handle management of subscriptions for all modules and hardware components of the computing device 2400 instead of the data sources managing subscriptions on an individual basis.

In some implementations, a subscription may include one or more subscription modifiers that define one or more constraints of the subscription. For example, when a module creates a subscription to a data source, the request may be passed as a function and the modifiers may be parameters of the function. In one example, a subscription modifier may include a type of subscription (e.g., active or passive).

In another example, a subscription modifier may include a sampling frequency at which a hardware component or a module produces a parameter or publishes data. In one particular example, a data source may be configured to produce a parameter at a frequency that is a least common multiple of all sampling frequencies provided as modifiers by modules that subscribe to receive the parameter. In another example, a data source may be configured to produce a parameter at a frequency that is greater than any one frequency provided as a modifier by a module in order to meet the sampling needs of all subscribing modules.

In another example, a subscription modifier may include a sampling period over which a data source is activated to produce a parameter or publish data. In one particular example, a data source may produce a parameter or publish data over a longest sampling period of all sampling periods provided as modifiers by modules that subscribe to receive the parameter or published data. Accordingly, the sampling needs of all subscribing modules may be met.

In another example, a subscription modifier may include a subscription duration to which a module is subscribed to receive a parameter or published data. For example, a subscription duration may be set for one hour, and a subscribing module may receive published data from the publishing module for the one hour duration. At the end of the hour, the subscription ends and the previously subscribing module no longer receives data published by the publishing module until another subscription is established. The one hour duration is merely an example, and any suitable duration may be employed. In another example, a subscription modifier may include an immediate notification constraint that specifies sending a most recently sampled version of a parameter to a module in response to the module establishing a subscription to receive the parameter from the data source. Any suitable constraint may be used as a modifier of a subscription. Moreover, a subscription may have any suitable number of modifiers.

In some implementations, subscriptions may be chained together through different modules all the way down to a hardware component level to form a subscription hierarchy. In its most simple form, a subscription hierarchy may include a top-level module that indirectly subscribes to a hardware component by directly subscribing to an intermediate module that directly subscribes to the hardware component. In this example, unless the top-level module creates an active subscription to the intermediate module, the intermediate module will not create an active subscription to the hardware component, and the hardware component will not turn on.

By employing subscription hierarchies, hardware components and modules may be operated in an energy efficient manner while providing operating flexibility over changing operating conditions. In particular, combinations of active and passive subscriptions chained together may be employed to opportunistically use data published by active data sources when available, while also ensuring that data is made available when absolutely needed by a module.

Figure 25:
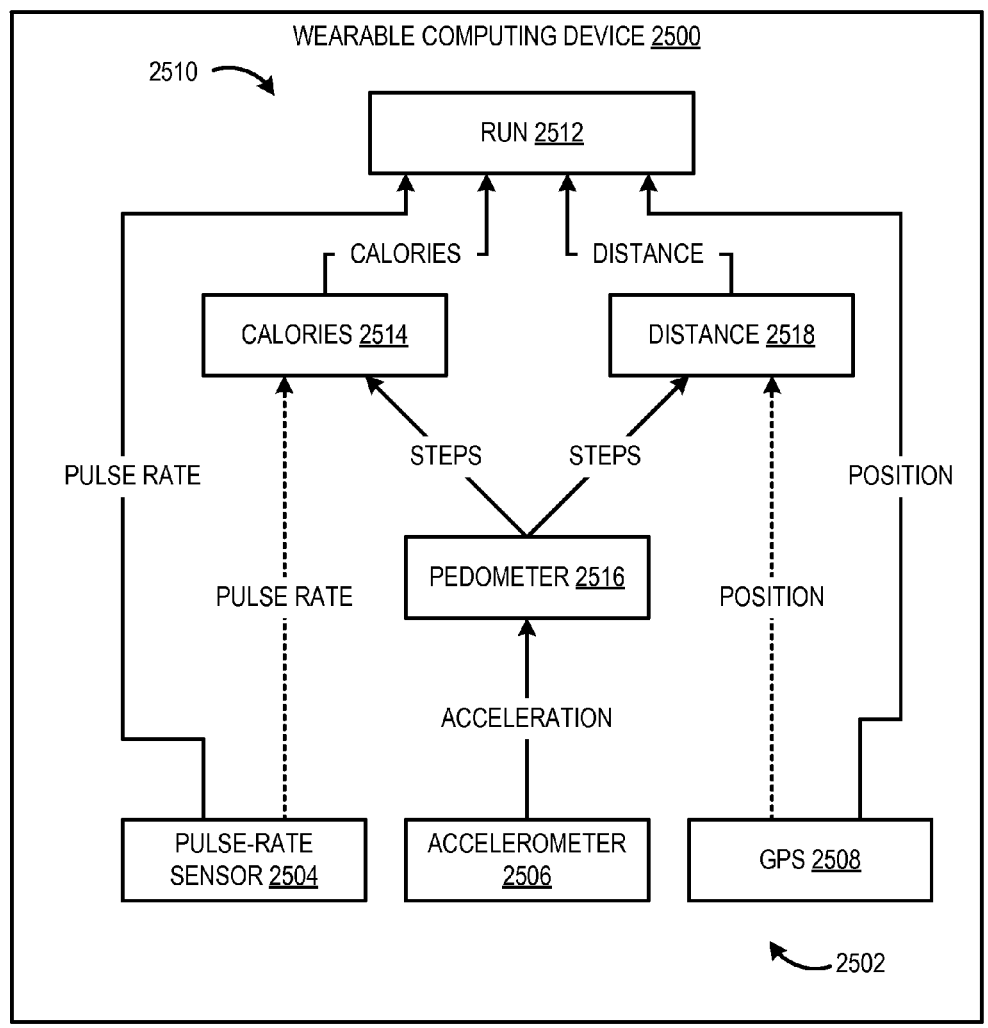
FIG. 25 shows an example subscription hierarchy that may be employed by a computing device.

FIG. 25 shows an example subscription hierarchy that may be employed by a wearable computing device 2500 that includes a plurality of hardware components 2502 (such as a pulse-rate sensor 2504, an accelerometer 2506, and a global positioning system (GPS) 2508). The pulse-rate sensor 2504 may be configured to determine a pulse rate of a wearer of the wearable computing device 2500. The accelerometer 2506 may be configured to measure an acceleration of the wearable computing device 2500. The GPS may be configured to determine a physical position or location of the wearable computing device 2500.

The wearable computing device 2500 may include a plurality of modules 2510 such as a run module 2512, a calories module 2514, a pedometer 2516, and a distance module 2518. The run module 2512 may be a top-level module configured to provide information to the wearer that may be useful while the wearer is running. For example, the run module 2512 may present biometric parameters of the wearer, such as a pulse rate of the wearer and calories burned by the wearer while running. Further, the run module 2512 may present other physical parameters (also referred to as activity parameters of the wearer) such as a distance traveled while running and a current position of the wearer. To present such information to the wearer, the run module 2512 may receive parameters from hardware components and intermediate modules via active subscriptions. In particular, the run module 2512 may have an active subscription to receive pulse rate data published by the pulse-rate sensor 2504, calorie data published by the calorie module 2514, distance data published by the distance module 2518, and position data published by the GPS 2508. These active subscriptions specify activation of the data sources as well as lower-level data sources in the subscription hierarchy to publish data to satisfy the active subscriptions of the run module 2512.

The calories module 2514 may be configured to determine a number of calories burned by the wearer over a given period. The calories module 2514 may derive the number of calories burned by the wearer differently depending on which hardware components are turned-on to publish relevant data. In particular, the calories module 2514 has a passive subscription to receive pulse rate data from the pulse-rate sensor 2504 and an active subscription to receive step data for the pedometer 2516. Further, the pedometer 2516 has an active subscription to receive acceleration data from the accelerometer 2506.

The pedometer 2516 may derive the number of steps taken by the wearer from the acceleration data received from the accelerometer 2506. Because the pedometer 2516 has an active subscription to the accelerometer 2506, the accelerometer 2506 is activated to provide the acceleration data to the pedometer 2516 as needed by the pedometer 2516 to satisfy the active subscription.

If the pulse-rate sensor 2504 is activated to satisfy another function (e.g., the run module 2512 is active), then the pulse-rate sensor 2504 may also send pulse rate data to the calories module 2514, and the calories module 2514 may derive the number of calories burned by the wearer from the pulse-rate data. If the pulse-rate sensor 2504 is not activated, then the calories module 2514 may derive the number of calories burned by the wearer using the step data provided by the pedometer 2516. In other words, because the calories module 2514 has an active subscription to the pedometer 2516, which has an active subscription to the accelerometer 2506, the accelerometer 2506 and the pedometer 2516 may be turned on to provide the step data to the calories module 2514 as needed by the calories module 2514 to satisfy the chain of active subscriptions.

In the case of the calories module 2514, the pulse-rate data may provide a more accurate determination of calories burned than the steps data. As such, the calories may be derived from the pulse rate when the pulse rate is available. However, in order to reduce power consumption, if the pulse-rate sensor 2504 is not active for other purposes, then concessions of accuracy may be made in favor of reducing power consumption, and the calories may be derived from the steps.

The distance module 2518 may be configured to determine a distance traveled by the wearer over a given period. The distance module 2518 may derive the distance traveled by the wearer differently depending on which hardware components are turned on to publish relevant data. In particular, the distance module 2518 has a passive subscription to receive position data from the GPS 2508 and an active subscription to receive step data for the pedometer 2516.

If the GPS 2508 is activated to satisfy another function (e.g., the run module 2512 is active), then the GPS 2508 may also send position data to the distance module 2518, and the distance module 2518 may derive a distance traveled by the wearer from the position data. If the GPS 2508 is not activated, then the distance module 2518 may derive the distance traveled by the wearer using the steps data provided by the pedometer 2516.

In the case of the distance module 2518, the position data may provide a more accurate determination of distance traveled than the steps data. As such, the distance may be derived from the position data when the position data is available. However, in order to reduce power consumption of the wearable computing device 2500, if the GPS 2508 is not active for other purposes, then concessions of accuracy may be made in favor of reducing power consumption, and the distance may be derived from the steps.

The above described subscription hierarchy is merely one example. A subscription hierarchy may include any suitable number of subscriptions that are chained together through different levels of modules. Moreover, a subscription hierarchy may include any suitable combination of active and passive subscriptions.

In some implementations, a subscription may be dynamically changed responsive to a change in operating state of a wearable computing device, a change in state of a wearer of the wearable computing device, or responsive to another suitable event, trigger, or condition. For example, a subscription may be changed by changing a modifier of a subscription. In some cases, a new subscription may be created responsive to a change in operating state or other suitable change. In some cases, a subscription may be ended responsive to a change in operating state or other suitable change. Moreover, a subscription hierarchy may dynamically change over time as different subscriptions are created, change type, and/or expire.

Figure 26:
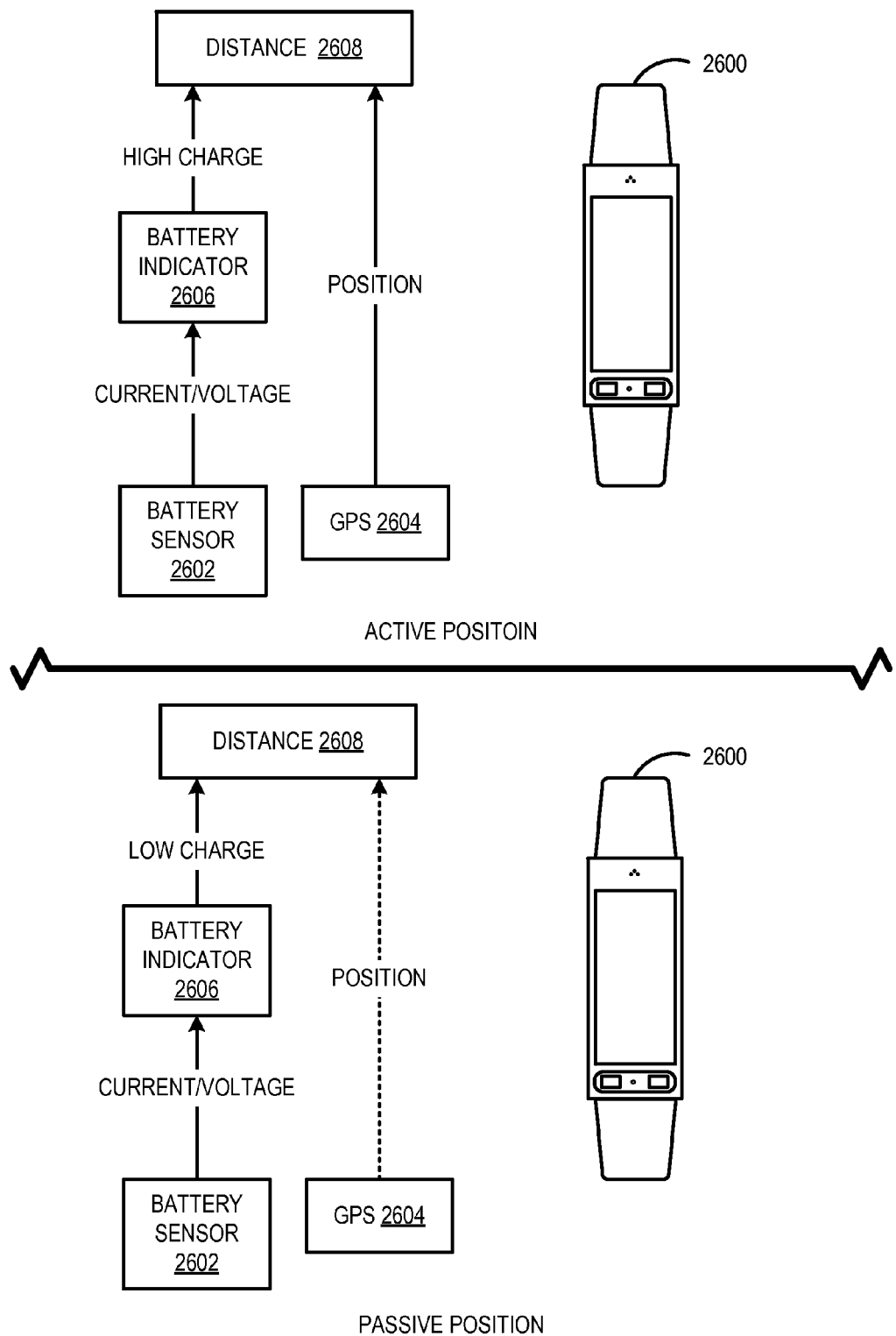
FIG. 26 shows an example scenario in which a subscription is modified responsive to a change in state of a wearable computing device.
Figure 27:
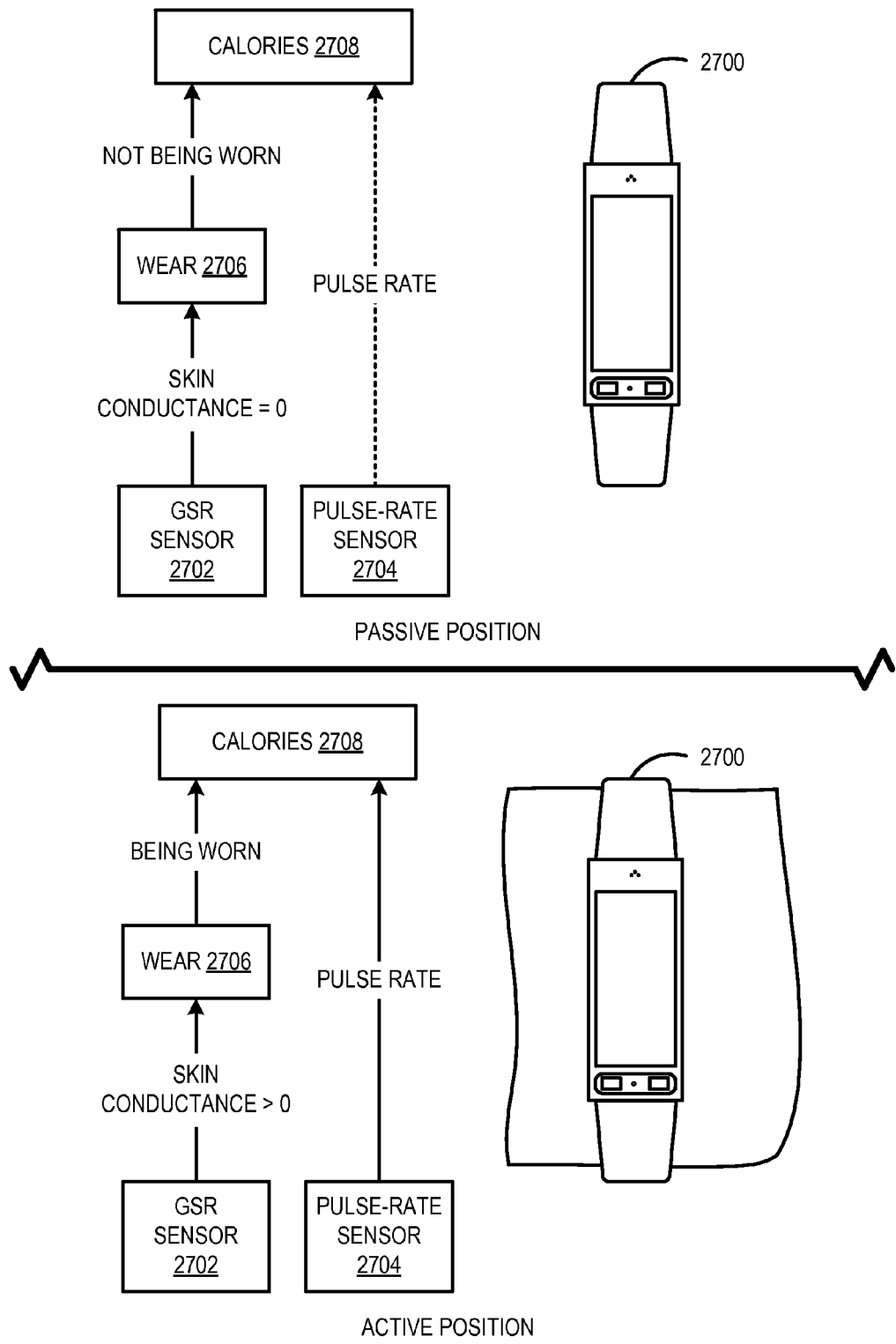
FIG. 27 shows an example scenario in which a subscription is modified responsive to a change in state of a wearable computing device relative to a wearer of the wearable computing device.
Figure 28:
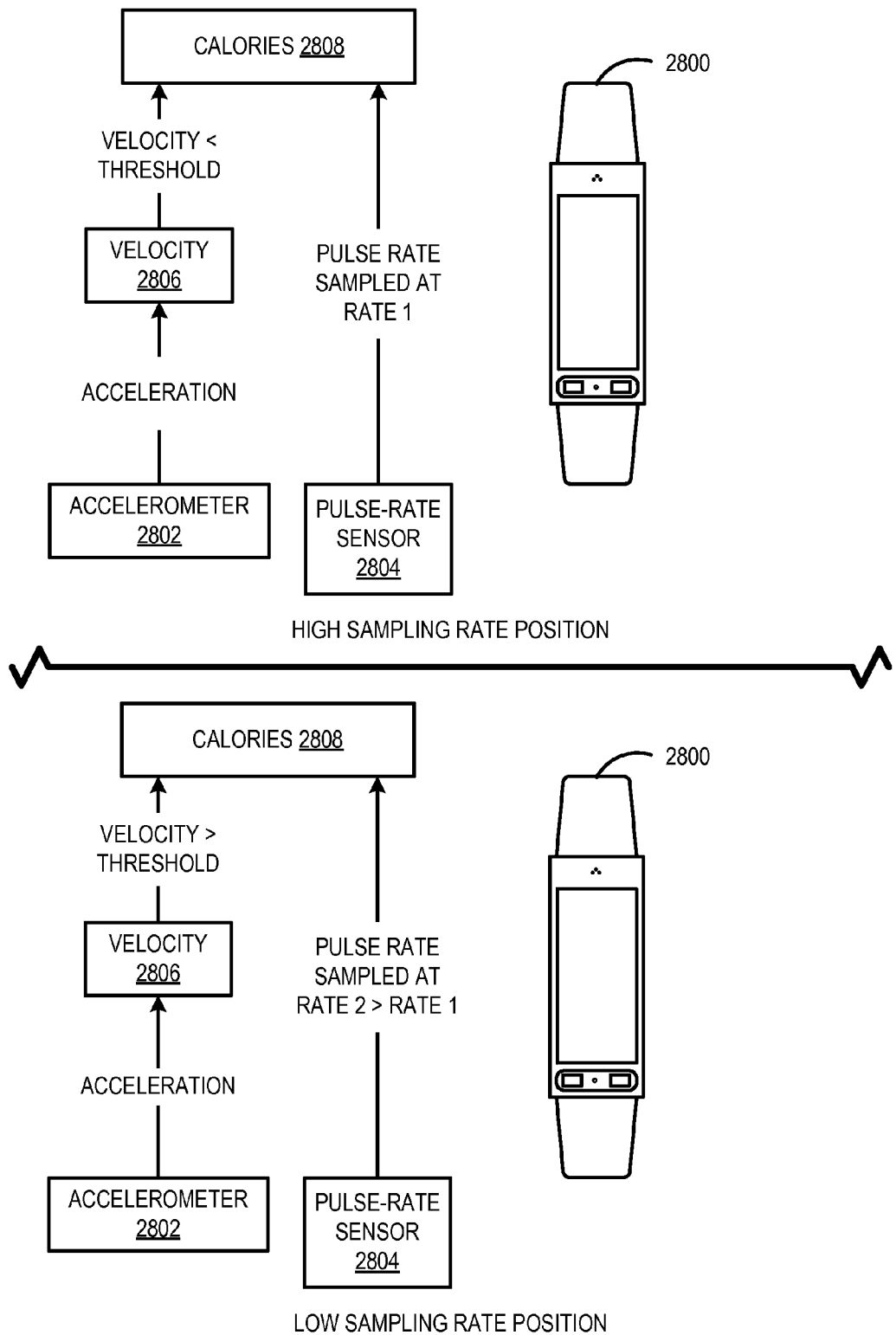
FIG. 28 shows an example scenario in which a subscription is modified responsive to a change in a state of a wearer of a wearable computing device.

FIGS. 26-28 show example scenarios that trigger changes to subscriptions. FIG. 26 shows an example scenario in which a subscription is modified responsive to a change in state of a wearable computing device 2600. The wearable computing device 2600 includes hardware components such as a battery sensor 2602 and a GPS 2604. The battery sensor 2602 may be configured to measure a current/voltage of a battery of the wearable computing device 2600. The GPS 2604 may be configured to determine a position or location of the wearable computing device 2600.

Furthermore, the wearable computing device 2600 includes modules such as a battery indicator module 2606 and a distance module 2608. The battery indicator module 2606 may be configured to provide an indication of a state of charge of the battery of the wearable computing device 2600. The distance module 2608 may be configured to determine a distance traveled by a wearer of the wearable computing device 2600.

In a first state (ACTIVE POSITION), the battery indicator module 2606 has an active subscription to receive current/voltage data from the battery sensor 2602. The battery indicator module 2606 may determine that the battery has a high state of charge from the current/voltage data received from the battery sensor 2602. For example, the high state of charge may be a state of charge that is greater than a threshold value.

Furthermore, in the first state, the distance module 2608 has an active subscription to the battery indicator module 2606 to receive charge data that, in this case, indicates the high state of charge of the battery. Additionally, the distance module 2608 has an active subscription to the GPS 2604 to receive position data. In this state, the distance module 2608 may determine a distance that the wearer has traveled based on a change in position received from the GPS 2604 over time.

In this example, the subscription that the distance module 2608 has for the GPS 2604 may be dynamically modified based on a change in state of the battery of the wearable computing device 2600. In particular, the GPS 2604 may consume a relatively high amount of power during operation, and as such the wearable computing device 2600 may be configured to activate the GPS 2604 for the purpose of providing position data to the distance module 2608 only when there is a suitable amount of charge in the battery (e.g., a high state of charge).

Accordingly, in a second state (PASSIVE POSITION), the battery indicator module 2606 indicates to the distance module 2608 that the battery has a low state of charge. For example, the low state of charge may be a state of charge that is less than a threshold value. The change in state of the battery from the high state to the low state triggers a dynamic modification of the subscription that the distance module 2608 has for the GPS 2604 from an active subscription to a passive subscription, as indicated by the dashed line. Responsive to the dynamic modification of the subscription, the distance module 2608 may only determine a distance that the wearer has traveled over time using position data received from the GPS when the GPS is activated to provide another function. Otherwise, in this state, the distance module 2608 determines distance that the wearer has traveled over time using a parameter other than position, such as using steps data received from a pedometer. Correspondingly, if the battery state of charge were to switch from the low state to the high state, then the subscription that the distance module 2608 has for the GPS 2604 would be dynamically modified from a passive subscription to an active subscription. Any subscription may be dynamically modified responsive to any suitable change in state of the wearable computing device 2600.

FIG. 27 shows an example scenario in which a subscription is modified responsive to a change in state of a wearable computing device 2700 relative to a wearer of the wearable computing device 2700. The wearable computing device 2700 includes hardware components such as a galvanic skin response (GSR) sensor 2702 and a pulse-rate sensor 2704. The GSR sensor 2702 may be configured to measure a skin conductance of the wearer of the wearable computing device 2700. The pulse-rate sensor 2704 may be configured to determine a pulse rate of the wearer of the wearable computing device 2700.

Furthermore, the wearable computing device 2700 includes modules such as a wear indicator module 2706 and a calories module 2708. The wear indicator module 2706 may be configured to provide an indication of whether the wearable computing device 2700 is currently being worn by a wearer. The calories module 2708 may be configured to determine a number of calories burned by a wearer of the wearable computing device 2700 over a given period.

In a first state (ACTIVE POSITION), the wear indicator module 2706 has an active subscription to receive the skin conductance data from the GSR sensor 2702. The wear indicator module 2706 may determine that the wearable computing device 2700 is currently not being worn by a wearer based on the skin conductance data indicating a measurement of substantially zero skin conductance.

Furthermore, in the first state, the calories module 2708 has an active subscription to the wear indicator module 2706 to receive the indication that the wearable computing device 2700 is currently not being worn. Additionally, the calories module 2708 has a passive subscription to the pulse-rate sensor 2704 to receive pulse-rate data. In this state, the calories module 2708 may determine a number of calories burned by a wearer over a given period using pulse-rate data only if the pulse-rate sensor 2704 is activated to satisfy another function. In another example, the calories module 2708 may not determine a number of calories and the subscription to the pulse-rate sensor 2704 may be cancelled while the wear indicator module 2706 provides an indication that the wearable computing device 2700 is currently not being worn.

In this example, the subscription that the calories module 2708 has for the pulse-rate sensor 2704 may be dynamically modified responsive to a change in state of wearable computing device 2700 relative to a wearer. In particular, the pulse-rate sensor 2704 and/or the calories module 2708 may be deactivated while the wearable computing device 2700 is not being worn in order reduce power consumption.

Accordingly, in a second state (PASSIVE POSITION), the wear indicator module 2706 indicates to the calories module 2708 that the wearable computing device 2700 is currently being worn by a wearer. For example, this indication may be determined based on the skin conductance provided by the GSR sensor 2702 indicting a skin conductance greater than a threshold value. The change in state of the wearable computing device 2700 relative to the wearer triggers a dynamic modification of the subscription that the calories module 2708 has for the pulse-rate sensor 2704 from a passive subscription to an active subscription, as indicated by the solid line. Responsive to modification of the subscription, the pulse-rate sensor 2704 may activate to measure the pulse-rate of the wearer and provide pulse-rate data to the calories module 2708. Further, the calories module 2708 may derive a number of calories burned by the wearer over a given period using the pulse-rate data. Correspondingly, if the state of the wearable computing device 2700 were to switch from being worn to not being worn, then the subscription that the calories module 2708 has for the pulse-rate sensor 2704 would be dynamically modified from an active subscription to a passive subscription (or the subscription would be ended).

FIG. 28 shows an example scenario in which a subscription is modified responsive to a change in a state of a wearer of a wearable computing device 2800. The wearable computing device 2800 includes hardware components such as an accelerometer 2802 and a pulse-rate sensor 2804. The accelerometer 2802 may be configured to measure an acceleration of the wearable computing device 2800. The pulse-rate sensor 2804 may be configured to determine a pulse rate of the wearer of the wearable computing device 2800.

Furthermore, the wearable computing device 2800 includes modules such as a velocity module 2806 and a calories module 2808. The velocity module 2806 may be configured to determine a velocity of the wearable computing device 2800. The calories module 2808 may be configured to determine a number of calories burned by a wearer of the wearable computing device 2800 over a given period.

In a first state (LOW SAMPLING RATE POSITION), the velocity module 2806 has an active subscription to receive the acceleration data from the accelerometer 2802. The velocity module 2806 may derive a velocity from acceleration data provided by the accelerometer 2802. In particular, the velocity module 2806 may determine that the wearable computing device 2800 has a velocity that is less than a threshold value. For example, the threshold value may indicate a minimum velocity at which the wearer of the wearable computing device 2800 may be assumed to be running.

Furthermore, in the first state, the calories module 2808 has an active subscription to the velocity module 2806 to receive velocity data indicating that the velocity is less than the threshold value. Additionally, the calories module 2808 has an active subscription to the pulse-rate sensor 2804 to receive pulse-rate data. The active subscription includes a modifier specifying that the pulse-rate be sampled by the pulse-rate sensor 2804 at a first sampling rate. In this state, the calories module 2808 may determine a number of calories burned by the wearer over a given period using the pulse-rate data sampled at the first sampling rate.

In this example, the sampling rate modifier of the subscription that the calories module 2808 has for the pulse-rate sensor 2804 may be dynamically modified responsive to the velocity becoming greater than the threshold value. For example, in the first state, the wearer may be moving slowly, and correspondingly the pulse rate of the wearer may be assumed to be lower. As such, the sampling rate of the pulse rate may be set to a relative slower sampling rate.

In a second state (HIGH SAMPLING RATE POSITION), the velocity module 2806 indicates to the calories module 2808 that a velocity of the wearable computing device 2800 is greater than the threshold value. The change in state of the wearable computing device 2800, which is a proxy for a change in state of the wearer, triggers a dynamic modification of the sampling rate modifier of the subscription that the calories module 2808 has for the pulse-rate sensor 2804. In particular, the sampling rate modifier of the subscription may be updated from the first sampling rate to a second sampling rate that is greater than the first sampling rate. In other words, when the velocity becomes greater than the threshold value, it is assumed that the wearer is running, and running will cause the pulse rate to increase. As such, the sampling rate may be dynamically increased to accurately measure the pulse rate. Correspondingly, if the velocity of the wearable computing device 2800 were to become less than the threshold value, then the subscription that the calories module 2808 has for the pulse-rate sensor 2804 would be dynamically modified to reduce the sampling rate in order to reduce power consumption.

In the above described example, the output of a module may trigger a change in subscription for a different data source. Output from any suitable data source may be used to trigger a dynamic change in a subscription. Moreover, a plurality of outputs of data sources may be contemplated in combination to trigger a dynamic change in a subscription.

In some embodiments, the methods and processes described herein may be tied to a computing system of one or more computing devices. In particular, such methods and processes may be implemented as a computer-application program or service, an application-programming interface (API), a library, and/or other computer-program product.

Figure 29:
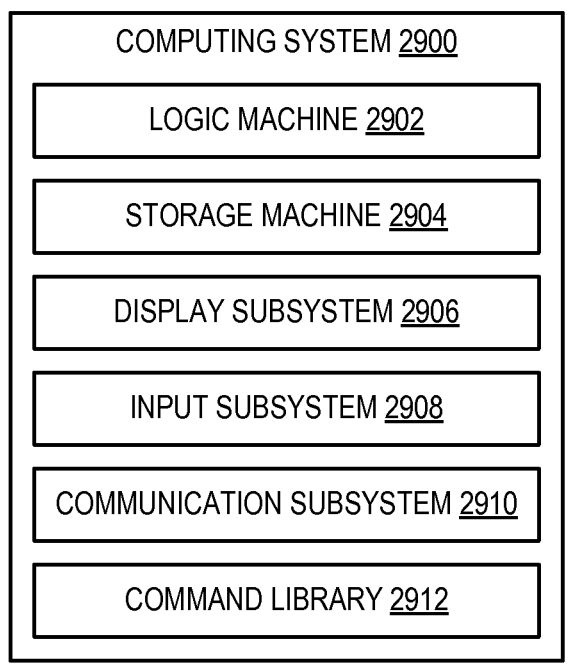
FIG. 29 shows an example computing system.

FIG. 29 schematically shows a non-limiting embodiment of a computing system 2900 that can enact one or more of the methods and processes described above. Computing system 2900 is shown in simplified form. Computing system 2900 may take the form of one or more personal computers, server computers, tablet computers, home-entertainment computers, network computing devices, gaming devices, mobile computing devices, mobile communication devices (e.g., smart phone), and/or other computing devices. For example, the computing system 2900 may be representative of a service computing device, a host computing device, a client computing device, a third-party computing device, a network-connected computing device, a non-network-connected computing device, or another suitable computing device. In one example, the computing system 2900 may be representative of the client computing devices A-N, the host computing device A and B, the service computing device 202, and the third-party computing device 210 shown in FIG. 2. Moreover, the computing system 2900 may be representative of any other computing devices discussed in the present disclosure.

Computing system 2900 includes a logic machine 2902 and a storage machine 2904. Computing system 2900 may optionally include a display subsystem 2906, input subsystem 2908, communication subsystem 2910, a command library 2912, and/or other components not shown in FIG. 29.

Logic machine 2902 includes one or more physical devices configured to execute instructions. For example, the logic machine 2902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 2902 may include one or more processors configured to execute software instructions. Additionally or alternatively, the logic machine 2902 may include one or more hardware or firmware logic machines configured to execute hardware or firmware instructions. Processors of the logic machine 2902 may be single-core or multi-core, and the instructions executed thereon may be configured for sequential, parallel, and/or distributed processing. Individual components of the logic machine 2902 optionally may be distributed among two or more separate devices, which may be remotely located and/or configured for coordinated processing. Aspects of the logic machine 2902 may be virtualized and executed by remotely accessible, networked computing devices configured in a cloud-computing configuration.

Storage machine 2904 includes one or more physical devices configured to hold instructions executable by the logic machine 2902 to implement the methods and processes described herein. When such methods and processes are implemented, the state of storage machine 2904 may be transformed—e.g., to hold different data.

Storage machine 2904 may include removable and/or built-in devices. Storage machine 2904 may include optical memory (e.g., CD, DVD, HD-DVD, Blu-Ray Disc), semiconductor memory (e.g., RAM, EPROM, EEPROM), and/or magnetic memory (e.g., hard-disk drive, floppy-disk drive, tape drive, MRAM), among others. Storage machine 2904 may include volatile, nonvolatile, dynamic, static, read/write, read-only, random-access, sequential-access, location-addressable, file-addressable, and/or content-addressable devices.

It will be appreciated that storage machine 2904 includes one or more physical devices. However, aspects of the instructions described herein alternatively may be propagated by a communication medium (e.g., an electromagnetic signal, an optical signal) that is not held by a physical device for a finite duration.

Aspects of logic machine 2902 and storage machine 2904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2900 implemented to perform a particular function. In some cases, a module, program, or engine may be instantiated via logic machine 2902 executing instructions held by storage machine 2904. It will be understood that different modules, programs, and/or engines may be instantiated from the same application, service, code block, object, library, routine, API, or function. Likewise, the same module, program, and/or engine may be instantiated by different applications, services, code blocks, objects, routines, APIs, or functions. The terms "module," "program," and "engine" may encompass individual or groups of executable files, data files, libraries, drivers, scripts, or database records.

It will be appreciated that a "service", as used herein, is an application program executable across multiple user sessions. A service may be available to one or more system components, programs, and/or other services. In some implementations, a service may run on one or more server-computing devices.

When included, display subsystem 2906 may be used to present a visual representation of data held by storage machine 2904. This visual representation may take the form of a graphical user interface (GUI). As the herein described methods and processes change the data held by the storage machine, and thus transform the state of the storage machine, the state of display subsystem 2906 may likewise be transformed to visually represent changes in the underlying data. Display subsystem 2906 may include one or more display devices utilizing virtually any type of technology. Such display devices may be combined with logic machine 2902 and/or storage machine 2904 in a shared enclosure, or such display devices may be peripheral display devices.

When included, input subsystem 2908 may comprise or interface with one or more user-input devices such as a keyboard, mouse, touch screen, or game controller. In some embodiments, the input subsystem 2908 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2910 may be configured to communicatively couple computing system 2900 with one or more other computing devices. Communication subsystem 2910 may include wired and/or wireless communication devices compatible with one or more different communication protocols. As non-limiting examples, the communication subsystem 2910 may be configured for communication via a wireless telephone network, or a wired or wireless local- or wide-area network. In some embodiments, the communication subsystem may allow computing system 2900 to send and/or receive messages to and/or from other devices via a network such as the Internet.

The command library 2912 may be provided to enable communication over different communication I/O interfaces using the same protocol. For example, the command library 2912 may be provided for building tools that communicate with a client computing device over USB, BT, or BTLE transfer layers. The command library 2912 may include any suitable command.

One example provides a client computing device comprising a logic machine, and a storage machine holding instructions executable by the logic machine to establish a plurality of subscriptions to receive data published by a plurality of data sources of the client computing device, each subscription corresponding to a different data source, in response to receiving published data from any data source of the client computing device via a subscription, store the published data in a subscription buffer, and in response to receiving, from a remote subscription dispatcher of a host computing device, a read request for data published by data sources of the client computing device in accordance with the plurality of subscriptions, send to the host computing device one or more data packets including published data stored in the subscription buffer. In such an example, published data provided by all data sources to which a subscription has been established optionally is sent in response to receiving the read request for client data from the remote subscription dispatcher of the host computing device. In such an example, the storage machine optionally further holds instructions executable by the logic machine to receive, from the remote subscription dispatcher of the host computing device, a plurality of subscription requests, each subscription request including a data source identifier that identifies a data source of the client computing device, and wherein the plurality of subscriptions are established responsive to receiving the plurality of subscription requests. In such an example, the subscription buffer optionally includes a data slot corresponding to each subscription, and the storage machine optionally further holds instructions executable by the logic machine to in response to receiving published data, from a data source via a subscription, store the published data in the data slot corresponding to the subscription. In such an example, the one or more data packets optionally include published data stored in the data slots corresponding to the plurality of subscriptions. In such an example, each of the one or more data packets optionally includes a data source identifier that identifies a data source that provided the published data included in the data packet. In such an example, the one or more data packets optionally include a missed sample count indicating a number of times the data source has published data since a last read request was received from the remote subscription dispatcher of the host computing device. In such an example, the client computing device optionally further comprises a wired communication I/O interface configured to communicate with the host computing device, a wireless communication I/O interface configured to communicate with the host computing device, and wherein the storage machine optionally holds instructions executable by the logic machine to communicate with the host computing device via both the wired communication I/O interface and the wireless communication I/O interface using a host-mediated transport layer protocol in which only the remote computing device initiates communication between the client computing device and the host computing device. Any or all of the above-described examples may be combined in any suitable manner in various implementations.

Another example provides a host computing device comprising a logic machine, and a storage machine holding instructions executable by the logic machine to receive, from a plurality of modules of the host computing device, a plurality of subscription requests to receive published data, wherein two or more of the plurality of modules request subscriptions for the same published data, send, to a remote subscription manager of a client computing device, a plurality of subscription requests to receive published data from data sources of the client computing device, each subscription request corresponding to a different data source, send, to the remote subscription manager of the client computing device, a read request for data published by data sources of the client computing device to which the plurality of subscriptions were requested, receive, from the remote subscription manager of the client computing device, one or more data packets including data published by data sources of the client computing device in accordance with the plurality of subscription requests, and send the one or more data packets to modules that subscribed to receiving the published data included in the one or more packets, wherein at least one data packet is sent to two or more modules that requested subscriptions to the same published data. In such an example, the storage machine optionally holds instructions executable by the logic machine to send, to the remote subscription manager of the client computing device, for each data source a single subscription request to receive published data provided by the data source. In such an example, the storage machine optionally holds instructions executable by the logic machine to for each subscription request received from the plurality of modules, identify a data source of the client computing device that provides the published data indicated by the subscription request, and for each subscription request, add a data source identifier that identifies the data source to the subscription request. In such an example, each of the one or more data packets optionally includes a data source identifier identifying a data source that provided the published data included in the data packet, and the storage machine optionally holds instructions executable by the logic machine to establish for each data source identifier a list of modules that subscribe to receive published data provided by a corresponding data source based on the plurality of subscription requests, and in response to receiving the one or more data packets, for each of the one or more data packets send the data packet to the modules on the list of modules that subscribe to the data source corresponding to the data source identifier in the data packet. In such an example, the storage machine optionally holds instructions executable by the logic machine to for each of the one or more data packets, remove the data source identifier from the data packet prior to sending the data packet to the modules. In such an example, the read request optionally is periodically sent to the remote subscription manager of the client computing device according to a periodic interval. In such an example, each of the one or more data packets optionally includes a missed sample count indicating a number of times the data source has published data since a last read request was received by the client computing device, and the storage machine optionally holds instructions executable by the logic machine to adjust the periodic interval to an updated periodic interval based on the missed sample count of the one or more data packets, and periodically send, to the remote subscription manager of the client computing device, a read request for data published by data sources of the client computing device according to the updated periodic interval. In such an example, the storage machine optionally holds instructions executable by the logic machine to for each of the one or more data packets, remove the missed sample count from the data packet prior to sending the data packet to the modules. Any or all of the above-described examples may be combined in any suitable manner in various implementations.

Another example provides on a host computing device, a method for subscribing to published data, the method comprising sending, to a remote subscription manager of a client computing device, a plurality of subscription requests to receive data published by data sources of the client computing device, periodically sending, to the remote subscription manager of the client computing device, a read request for data published by data sources to which the plurality of subscriptions were requested, the read request being sent according to a periodic interval, receiving from the remote subscription manager of the client computing device a plurality of data packets including published data provided by data sources of the client computing device to which the plurality of subscriptions were requested, each of the plurality of data packets including a data source identifier and a missed sample count, the data source identifier identifying a data source that provided the published data included in the data packet, and the missed sample count indicating a number of times the data source has published data since a last read request was received by the remote subscription manager of the client computing device, adjusting the periodic interval to an updated periodic interval based on the missed sample count of the plurality of data packets, and sending a read request for published data to the remote subscription manager of the client computing device in accordance with the updated periodic interval. In such an example, the method optionally further comprises receiving, from a plurality of modules of the host computing device, a plurality of subscription requests to receive published data, establishing, for each data source to which a subscription was requested, a list of modules that subscribe to receive data published by the data source, and in response to receiving the plurality of data packets, from the remote subscription manager of the client computing device, for each of the plurality of data packets, sending the data packet to the modules on the list of modules that subscribe to the data source corresponding to the data source identifier in the data packet. In such an example, the method optionally further comprises for each of the plurality of data packets, removing the data source identifier and the missed sample count from the data packet prior to sending the data packet to the modules. In such an example, adjusting the periodic interval optionally includes decreasing the periodic interval if a missed sample count of any of the plurality of data packets is greater than a threshold value, and increasing the periodic interval if a missed sample count of each of the plurality of data packets is zero. Any or all of the above-described examples may be combined in any suitable manner in various implementations.

Another example provides a wearable computing device comprising a plurality of biometric sensors configured to determine biometric parameters of a wearer of the wearable computing device, and a plurality of modules configured to determine activity parameters of the wearer of the wearable computing device, wherein a first module of the plurality of modules directly subscribes to receive a first biometric parameter from a first biometric sensor of the plurality of biometric sensors, wherein a subscription of the first module to the first biometric sensor specifies activation of the first biometric sensor to provide the first biometric parameter to the first module to satisfy the subscription, and wherein the first module is configured to derive a first activity parameter from the first biometric parameter, and wherein a second module of the plurality of modules indirectly subscribes to the first biometric sensor by directly subscribing to receive the first activity parameter from the first module, and wherein a subscription of the second module to the first module specifies activation of the first module to provide the first activity parameter to the second module to satisfy the subscription. In such an example, the second module optionally directly subscribes to a second biometric sensor of the plurality of biometric sensors via a passive subscription, wherein the passive subscription specifies that the second biometric sensor provide a second biometric parameter to the second module if the second biometric sensor is already activated to satisfy a function other than the passive subscription, and wherein the second module is configured to derive a second activity parameter from the second biometric parameter if the second biometric sensor is activated and to derive the second activity parameter from the first activity parameter if the second biometric sensor is not activated. In such an example, the first module optionally is configured to determine a state of the wearer based on the first biometric parameter, and wherein the passive subscription of the second module to the second biometric sensor is modified in response to the second parameter indicating a change in state of the wearer. In such an example, the plurality of biometric sensors optionally includes one or more of a galvanic-skin-resistance sensor, a pulse-rate sensor, a skin-temperature sensor, an accelerometer, a magnetometer, a gyroscope, and a global-positioning sensor. In such an example, the plurality of activity modules optionally includes one or more of a pedometer module, a calorie-counting module, a distance module, and a running module. Any or all of the above-described examples may be combined in any suitable manner in various implementations.

Another example provides a computing device comprising a plurality of hardware components, and a plurality of modules, wherein a first module of the plurality of modules directly subscribes to receive a first parameter from a first hardware component of the plurality of hardware components, wherein a subscription of the first module to the first hardware component specifies activation of the first hardware component to provide the first parameter to the first module to satisfy the subscription, and wherein the first module is configured to derive a second parameter from the first parameter, and wherein a second module of the plurality of modules indirectly subscribes to the first hardware component by directly subscribing to receive the second parameter from the first module, and wherein a subscription of the second module to the first module specifies activation of the first module to provide the second parameter to the second module to satisfy the subscription. In such an example, the computing device optionally is a wearable device, and wherein the first hardware component is a biometric sensor configured to determine a biometric parameter of a wearer of the wearable device. In such an example, the second module optionally directly subscribes to a second hardware component of the plurality of hardware components via a passive subscription, wherein the passive subscription specifies that the second hardware component provide a third parameter to the second module if the second hardware component is already activated to satisfy a function other than the passive subscription, and wherein the second module is configured to derive a fourth parameter from the third parameter if the second hardware component is activated and to derive the fourth parameter from the second parameter if the second hardware component is not activated. In such an example, the passive subscription of the second module to the second hardware component optionally is modified in response to the second parameter indicating a trigger. In such an example, the subscription optionally is modified in response to the trigger by adjusting a sample frequency at which the second hardware component produces the third parameter. In such an example, the subscription optionally is modified in response to the trigger by switching from the passive subscription to an active subscription that specifies activation of the second hardware component to provide the third parameter to the second module to satisfy the subscription. In such an example, the computing device optionally is a wearable device, wherein the first hardware component is a biometric sensor configured to determine a first biometric parameter of a wearer of the wearable device, wherein the first module is configured to determine a state of the wearer based on the first biometric parameter, and wherein the trigger includes a change in a state of the wearer. In such an example, a subscription with the first hardware component optionally includes one or more subscription modifiers that define one or more constraints of the subscription. In such an example, the one or more subscription modifiers optionally includes a sampling frequency at which the first hardware component produces the first parameter, and wherein the first hardware component produces the first parameter at a frequency that is a least common multiple of sampling frequencies indicated by modules that subscribe to receive the first parameter. In such an example, the one or more subscription modifiers optionally includes a sampling period over which the first hardware component is activated to produce the first parameter, and wherein the first hardware component produces the first parameter over a longest sampling period of sampling periods indicated by modules that subscribe to receive the first parameter. In such an example, the one or more subscription modifiers optionally includes a subscription duration to which a module is subscribed to receive the first parameter. In such an example, the one or more subscription modifiers optionally includes an immediate notification constraint that specifies sending a most recently sampled version of the first parameter to a module in response to the module establishing a subscription to receive the first parameter from the first hardware component. Any or all of the above-described examples may be combined in any suitable manner in various implementations.

Another example provides a computing device comprising a first hardware component configured to produce a first parameter, a second hardware component configured to produce a second parameter, a first module having an active subscription to receive the first parameter from the first hardware component, the active subscription requiring periodic activation of the first hardware component to provide the first parameter to the first module, the first module being configured to determine a third parameter based on the first parameter, and a second module having an active subscription to receive the third parameter from the first module, the active subscription requiring periodic activation of the first module to provide the third parameter to the second module, the second module having a passive subscription to receive the second parameter from the second hardware component, the passive subscription requiring that the second hardware component provide the second parameter to the second module if the second hardware component is already activated to satisfy a function other than the passive subscription, the second module being configured to determine a fourth parameter based on the second parameter if the second hardware component is activated, and determine the fourth parameter based on the third parameter provided by the first module if the second hardware component is not activated. In such an example, the passive subscription of the second module to the second hardware component optionally is modified in response to the second parameter indicating a trigger. In such an example, a subscription with the first hardware component optionally includes one or more subscription modifiers that define one or more constraints of the subscription. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A battery-powered client computing device comprising:
a battery configured to power the client computing device;
a wireless communication interface configured to establish a wireless communication channel with a host computing device;
a logic machine; and
a storage machine holding instructions executable by the logic machine to:
communicate, via the wireless communication interface, with the host computing device using a host-mediated transport layer protocol in which only the host computing device initiates communication between the battery-powered client computing device and the host computing device;
establish a plurality of subscriptions to receive data published by a plurality of data sources of the battery-powered client computing device, each subscription corresponding to a different data source;
in response to receiving published data from any data source of the battery-powered client computing device via a subscription, store the published data in a subscription buffer; and in response to receiving, from a remote subscription dispatcher of the host computing device via the host-mediated transport layer protocol, a read request for data published by data sources of the battery-powered client computing device in accordance with the plurality of subscriptions, send, via the wireless communication interface, to the host computing device one or more data packets including published data stored in the subscription buffer.

2. The battery-powered client computing device of claim 1, wherein published data provided by all data sources to which a subscription has been established is sent in response to receiving the read request for client data from the remote subscription dispatcher of the host computing device.

3. The battery-powered client computing device of claim 1, wherein the storage machine further holds instructions executable by the logic machine to:

receive, from the remote subscription dispatcher of the host computing device, a plurality of subscription requests, each subscription request including a data source identifier that identifies a data source of the battery-powered client computing device, and wherein the plurality of subscriptions are established responsive to receiving the plurality of subscription requests.

4. The battery-powered client computing device of claim 1, wherein the subscription buffer includes a data slot corresponding to each subscription, and wherein the storage machine further holds instructions executable by the logic machine to:

in response to receiving published data, from a data source via a subscription, store the published data in the data slot corresponding to the subscription.

5. The battery-powered client computing device of claim 4, wherein the one or more data packets include published data stored in the data slots corresponding to the plurality of subscriptions.

6. The battery-powered client computing device of claim 1, wherein each of the one or more data packets includes a data source identifier that identifies a data source that provided the published data included in the data packet.

7. The battery-powered client computing device of claim 6, wherein the one or more data packets include a missed sample count indicating a number of times the data source has published data to the subscription buffer since a last read request was received from the remote subscription dispatcher of the host computing device.

8. The battery-powered client computing device of claim 1, further comprising:

a wired communication interface configured to communicate with the host computing device; and wherein the storage machine holds instructions executable by the logic machine to:

communicate with the host computing device via both the wired communication interface and the wireless communication interface using the same host-mediated transport layer protocol.

9. A method for subscribing to published data with a host computing device, the method comprising:

sending, to a remote subscription manager of a client computing device, a plurality of subscription requests to receive data published by data sources of the client computing device;

periodically sending, to the remote subscription manager of the client computing device, a read request for data published by data sources to which the plurality of subscriptions were requested, the read request being sent according to a periodic interval;

receiving from the remote subscription manager of the client computing device a plurality of data packets including published data provided by data sources of the client computing device to which the plurality of subscriptions were requested, each of the plurality of data packets including a data source identifier and a missed sample count, the data source identifier identifying a data source that provided the published data included in the data packet, and the missed sample count indicating a number of times the data source has published data to a subscription buffer of the client computing device since a last read request was received by the remote subscription manager of the client computing device;

adjusting the periodic interval to an updated periodic interval based on the missed sample count of the plurality of data packets; and sending a read request for published data to the remote subscription manager of the client computing device in accordance with the updated periodic interval.

10. The method of claim 9, further comprising:

receiving, from a plurality of modules of the host computing device, a plurality of subscription requests to receive published data;

establishing, for each data source to which a subscription was requested, a list of modules that subscribe to receive data published by the data source; and in response to receiving the plurality of data packets, from the remote subscription manager of the client computing device, for each of the plurality of data packets, sending the data packet to the modules on the list of modules that subscribe to the data source corresponding to the data source identifier in the data packet.

11. The method of claim 10, further comprising:

for each of the plurality of data packets, removing the data source identifier and the missed sample count from the data packet prior to sending the data packet to the modules.

12. The method of claim 9, wherein adjusting the periodic interval includes decreasing the periodic interval if a missed sample count of any of the plurality of data packets is greater than a threshold value, and increasing the periodic interval if a missed sample count of each of the plurality of data packets is zero.

13. A battery-powered, wearable client computing device comprising:

a battery configured to power the battery-powered, wearable client computing device;

a plurality of sensors configured to measure physical parameters of a wearer of the battery-powered, wearable client computing device;

a wireless communication interface configured to establish a wireless communication channel with a mobile telephone;

a logic machine; and a storage machine holding instructions executable by the logic machine to:

communicate, via the wireless communication interface, with the mobile telephone using a host-mediated transport layer protocol in which only the mobile telephone initiates communication between the battery-powered, wearable client computing device and the mobile telephone;

establish a plurality of subscriptions to receive data published by the plurality of sensors, each subscription corresponding to a different sensor;

in response to receiving published data from any sensor of the battery-powered, wearable client computing device via a subscription, store the published data in a subscription buffer;

receive, from a remote subscription dispatcher of the mobile telephone via the host-mediated transport layer protocol, a read request for data published by sensors of the battery-powered, wearable client computing device; and send, to the mobile telephone via the wireless communication interface, one or more data packets including published data stored in the subscription buffer.

14. The battery-powered, wearable client computing device of claim 13, wherein published data provided by all sensors to which a subscription has been established is sent in response to receiving the read request for client data from the remote subscription dispatcher of the mobile telephone.

15. The battery-powered, wearable client computing device of claim 13, wherein the storage machine further holds instructions executable by the logic machine to:

receive, from the remote subscription dispatcher of the mobile telephone, a plurality of subscription requests, each subscription request including a sensor identifier that identifies a sensor of the battery-powered, wearable client computing device, and wherein the plurality of subscriptions are established responsive to receiving the plurality of subscription requests.

16. The battery-powered, wearable client computing device of claim 13, wherein the subscription buffer includes a data slot corresponding to each subscription, and wherein the storage machine further holds instructions executable by the logic machine to:

in response to receiving published data, from a sensor via a subscription, store the published data in the data slot corresponding to the subscription.

17. The battery-powered, wearable client computing device of claim 16, wherein the one or more data packets include published data stored in the data slots corresponding to the plurality of subscriptions.

18. The battery-powered, wearable client computing device of claim 13, wherein each of the one or more data packets includes a sensor identifier that identifies a sensor that provided the published data included in the data packet.

19. The battery-powered, wearable client computing device of claim 18, wherein the one or more data packets include a missed sample count indicating a number of times the sensor has published data since a last read request was received from the remote subscription dispatcher of the mobile telephone.

20. The battery-powered, wearable client computing device of claim 13, further comprising:

a wired communication interface configured to communicate with the mobile telephone; and wherein the storage machine holds instructions executable by the logic machine to:

communicate with the mobile telephone via both the wired communication interface and the wireless communication interface using the same host-mediated transport layer protocol.

* * * * *